(12) United States Patent
Valin

(10) Patent No.: US 8,369,997 B2
(45) Date of Patent: Feb. 5, 2013

(54) SOLAR PANEL WIND TURBINE COMMUNICATION SERVER NETWORK APPARATUS METHOD AND MECHANISM

(76) Inventor: David Valin, Flushing, NY (US)

( * ) Notice: Subject to any disclaimer, the term of this patent is extended or adjusted under 35 U.S.C. 154(b) by 271 days.

(21) Appl. No.: 12/768,981

(22) Filed: Apr. 28, 2010

(65) Prior Publication Data

US 2011/0270682 A1 Nov. 3, 2011

(51) Int. Cl.
*H02P 9/00* (2006.01)
(52) U.S. Cl. ............................ 700/286; 700/287; 290/44
(58) Field of Classification Search .................... 700/22, 700/275, 276, 286, 291, 295, 300, 287; 290/44, 290/55; 705/14.64, 572.1; 310/152; 348/46, 348/745, E3.048, E13.074; 398/115; 415/916; 706/46; 709/203; 901/1
See application file for complete search history.

(56) References Cited

U.S. PATENT DOCUMENTS

| | | | | |
|---|---|---|---|---|
| 6,433,867 B1* | 8/2002 | Esquivel | ................... | 356/237.2 |
| 7,162,833 B2* | 1/2007 | Faris | ...................... | 47/58.1 LS |
| 7,245,039 B2* | 7/2007 | DuHamel | ...................... | 290/44 |
| 7,274,975 B2* | 9/2007 | Miller | .......................... | 700/295 |
| 7,293,960 B2* | 11/2007 | Yamamoto et al. | ............. | 416/85 |
| 7,339,286 B1* | 3/2008 | Chen | ................................ | 290/55 |
| 7,444,189 B1* | 10/2008 | Marhoefer | ......................... | 700/26 |
| 7,462,955 B2* | 12/2008 | McNamara et al. | ............. | 307/64 |
| 7,738,612 B2* | 6/2010 | Rafaeli | ......................... | 375/354 |
| 7,783,390 B2* | 8/2010 | Miller | .......................... | 700/291 |
| 7,819,114 B2* | 10/2010 | Augenbraun et al. | ........ | 126/623 |
| 7,884,727 B2* | 2/2011 | Tran | ........................... | 340/573.1 |
| 7,888,590 B2* | 2/2011 | Niederer | ........................ | 136/251 |
| 7,958,229 B2* | 6/2011 | Conway | ......................... | 709/224 |
| 8,019,445 B2* | 9/2011 | Marhoefer | ..................... | 700/26 |
| 2002/0066473 A1* | 6/2002 | Levy et al. | ...................... | 134/34 |
| 2005/0076563 A1* | 4/2005 | Faris | ........................ | 47/58.1 LS |
| 2005/0165511 A1* | 7/2005 | Fairlie | ........................... | 700/286 |
| 2006/0260672 A1* | 11/2006 | Niederer | ........................ | 136/251 |
| 2008/0278000 A1* | 11/2008 | Capp et al. | ...................... | 307/21 |
| 2009/0062969 A1* | 3/2009 | Chandra et al. | ............... | 700/291 |
| 2009/0072771 A1* | 3/2009 | McCulley | ...................... | 318/150 |
| 2009/0079161 A1* | 3/2009 | Muchow et al. | ............. | 280/400 |
| 2009/0151769 A1* | 6/2009 | Corbin | .......................... | 136/246 |
| 2009/0195349 A1* | 8/2009 | Frader-Thompson et al. | | 340/3.1 |
| 2009/0293932 A1* | 12/2009 | Augenbraun et al. | ........ | 136/244 |
| 2010/0029268 A1* | 2/2010 | Myer et al. | ................. | 455/426.1 |
| 2010/0070097 A1* | 3/2010 | Morgenstern et al. | ........ | 700/284 |
| 2010/0170293 A1* | 7/2010 | Tsarev et al. | ................... | 290/44 |
| 2010/0172759 A1* | 7/2010 | Sullivan | .......................... | 416/41 |

* cited by examiner

*Primary Examiner* — Charles Kasenge
(74) *Attorney, Agent, or Firm* — White-Welker & Welker, LLC; Matthew T Welker, Esq.

(57) ABSTRACT

The method included herein is an alternative energy wireless solar panel wind turbine communication server appliance node mechanism with built in communications server array, wireless energy and communications mechanism with protection, sharing, storage, accessing, authentication, battery management, certification, processing attachment and tracking mechanisms. The method and mechanism is utilized via networked servers, solar panels, and wireless electronic devices (online and offline) as well as mobile (wireless) communications devices built into one waterproof, temperature, controlled self sensing hardware package. The method and mechanism also works as part of a kilowatt hour banking system, and thermal passive solar control mechanism for living spaces.

12 Claims, 39 Drawing Sheets

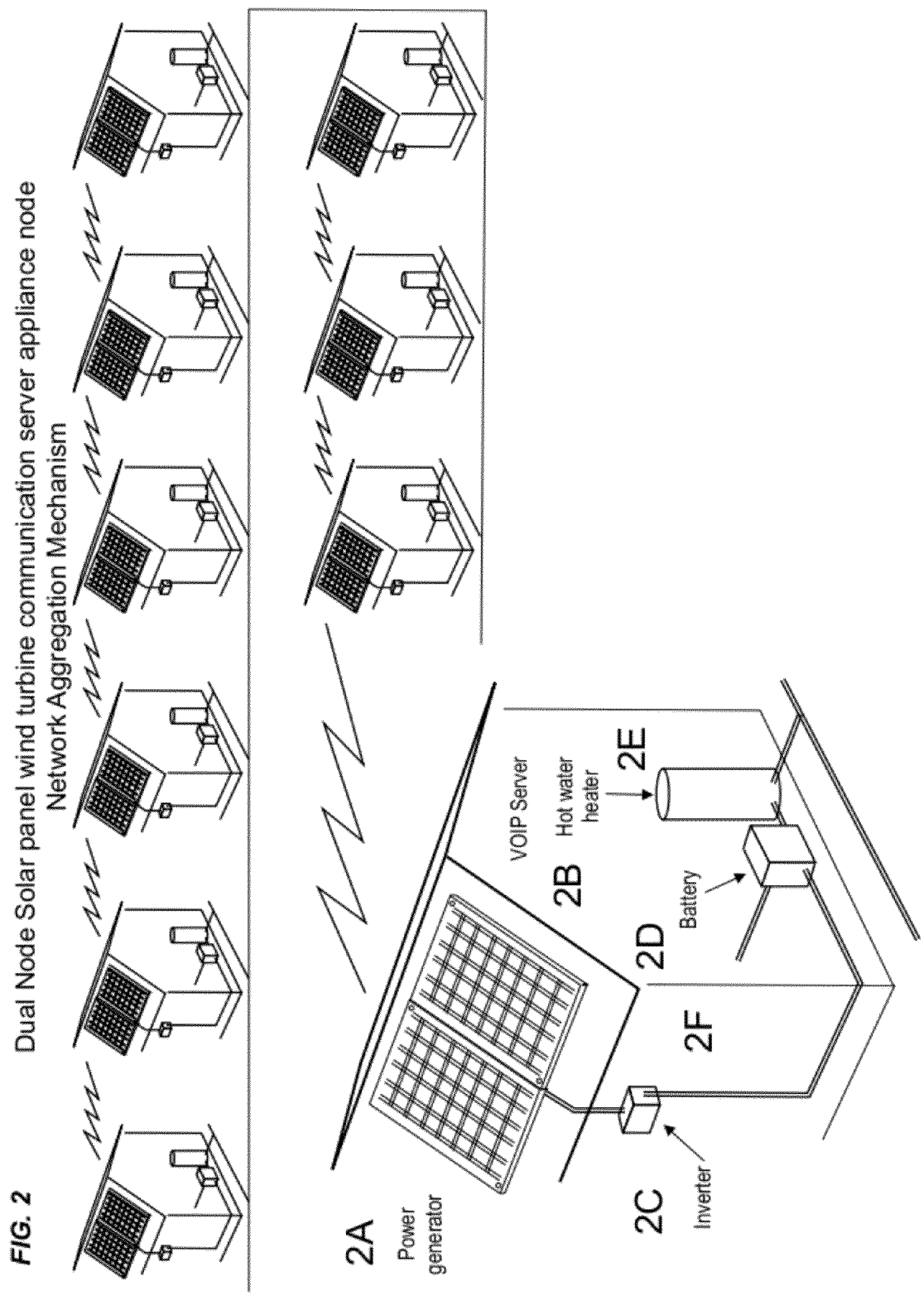

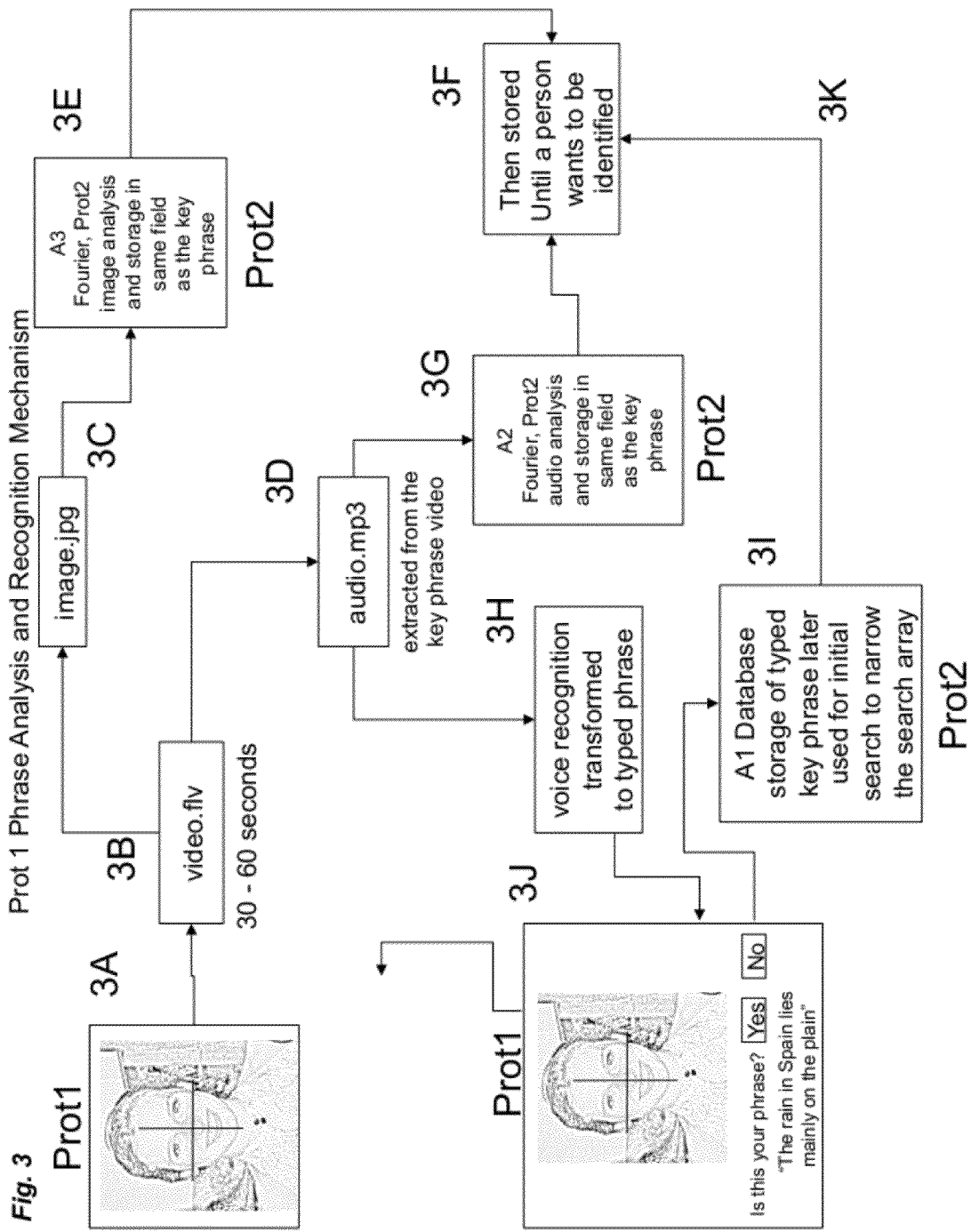

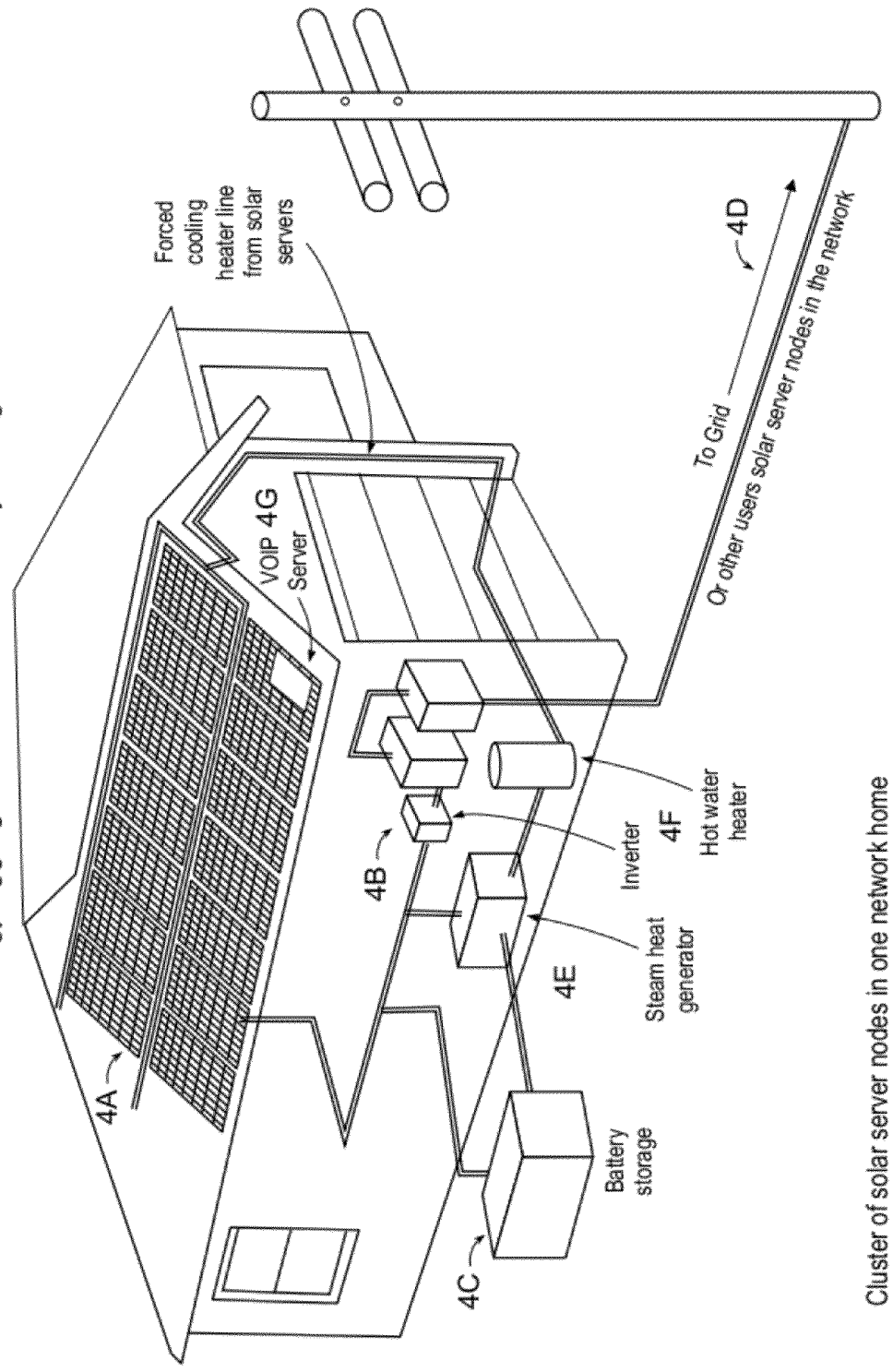

FIG. 5   Solar panel wind turbine communication server appliance node Winter Heating Apparatus with Cleaner Mechanism
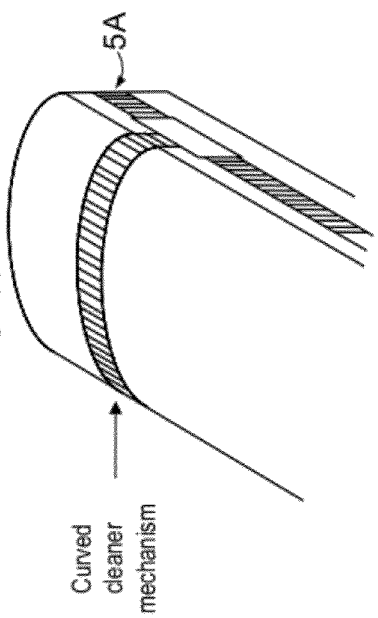
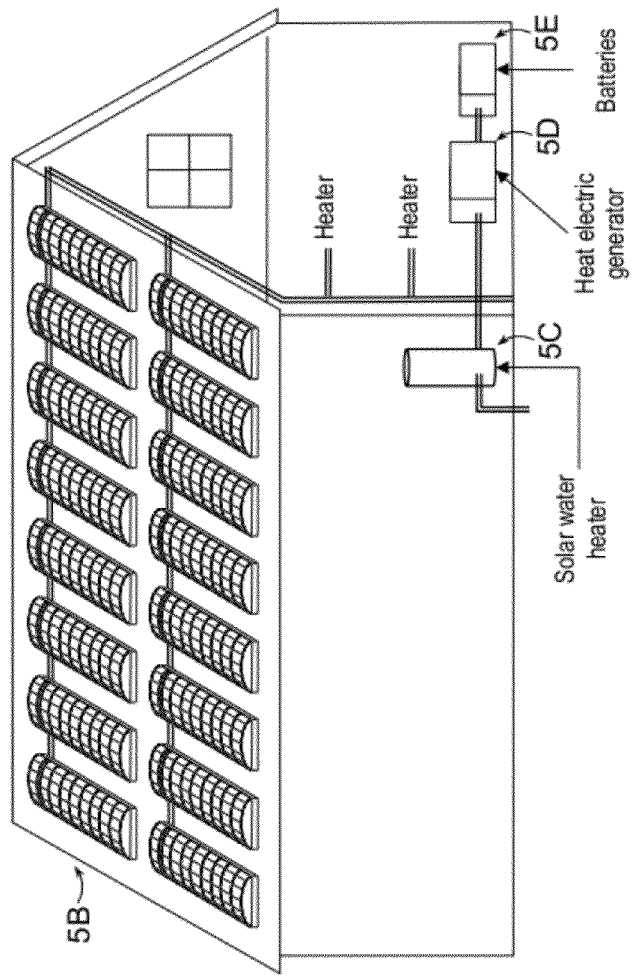

FIG. 22   Solar panel wind turbine communication server appliance node
Retractable Cleaner Mechanism Fig. 25 Solar panel wind turbine communication server appliance node network cooling and super heating magnetic motor fan mechanism FIG. 30 Solar panel wind turbine communication server appliance node network infrared laser light waves transformed to audio sound waves at spatial point target zone

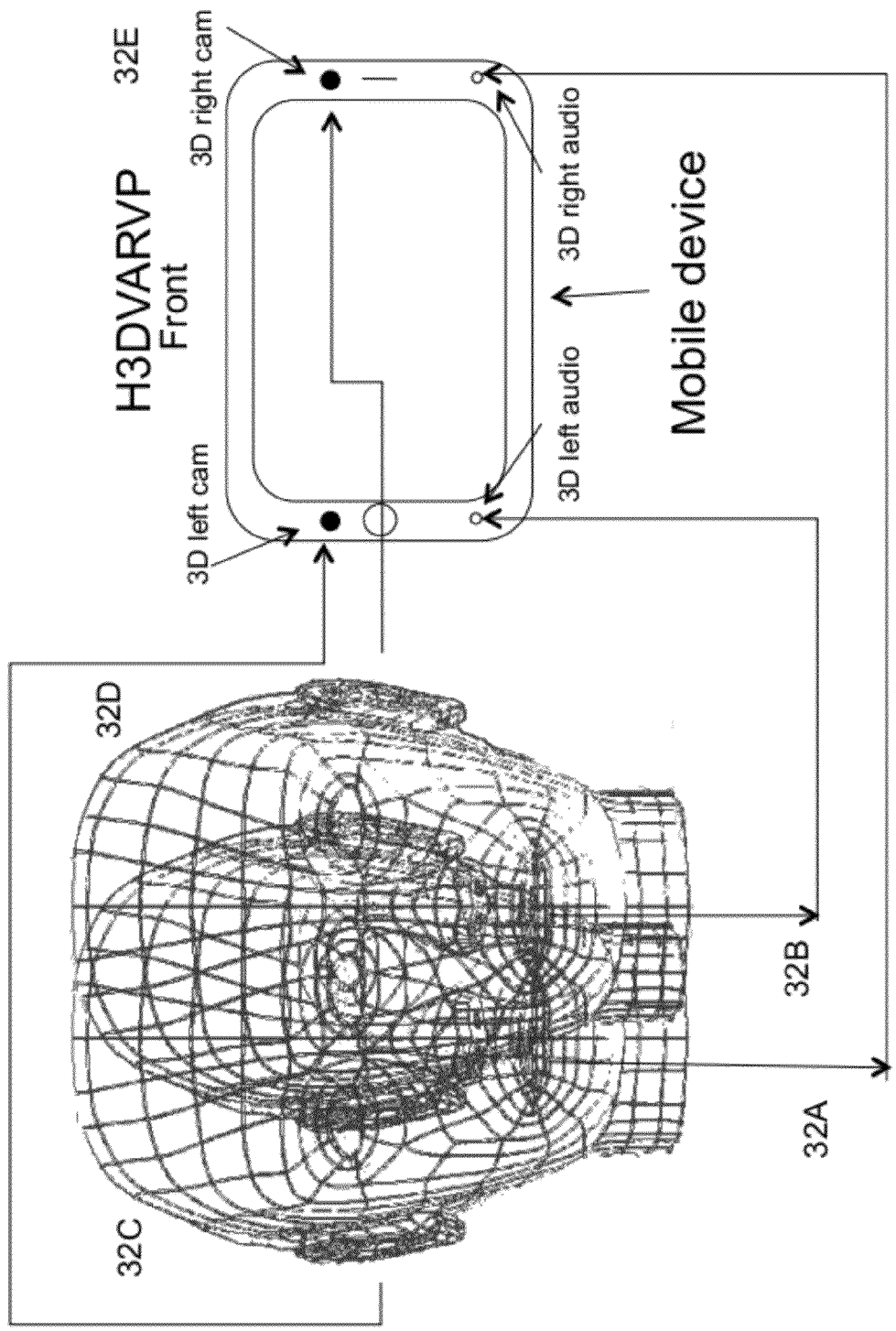
FIG. 32  Solar panel wind turbine communication server appliance node
H3DVARVP Protect Anything Human Key Identification Mechanism

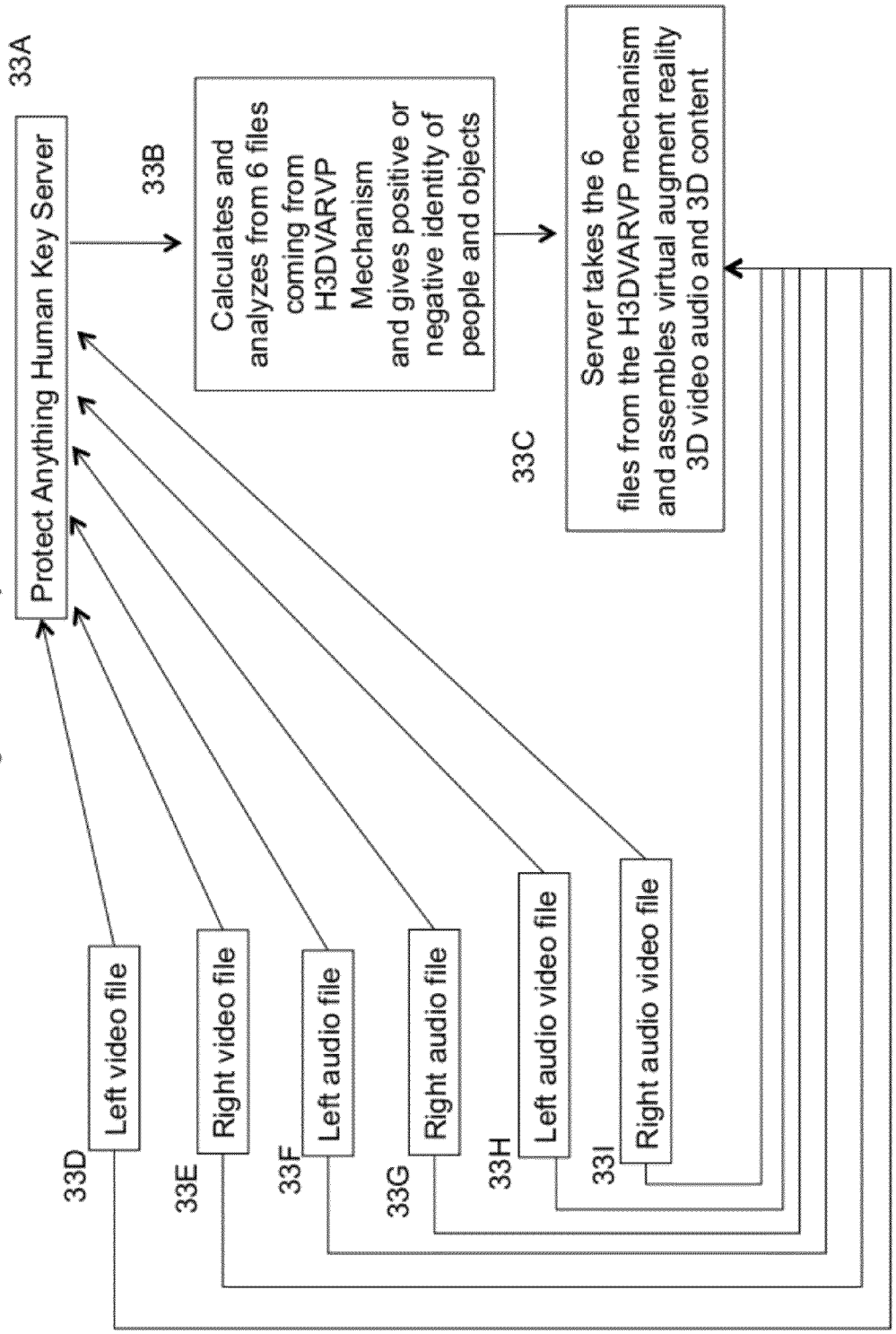

*FIG. 34*

Solar panel wind turbine communication server appliance node
Protect Anything Human Key 3D Human Video Audio Stereo
Viewing and Recording Internal Mechanism

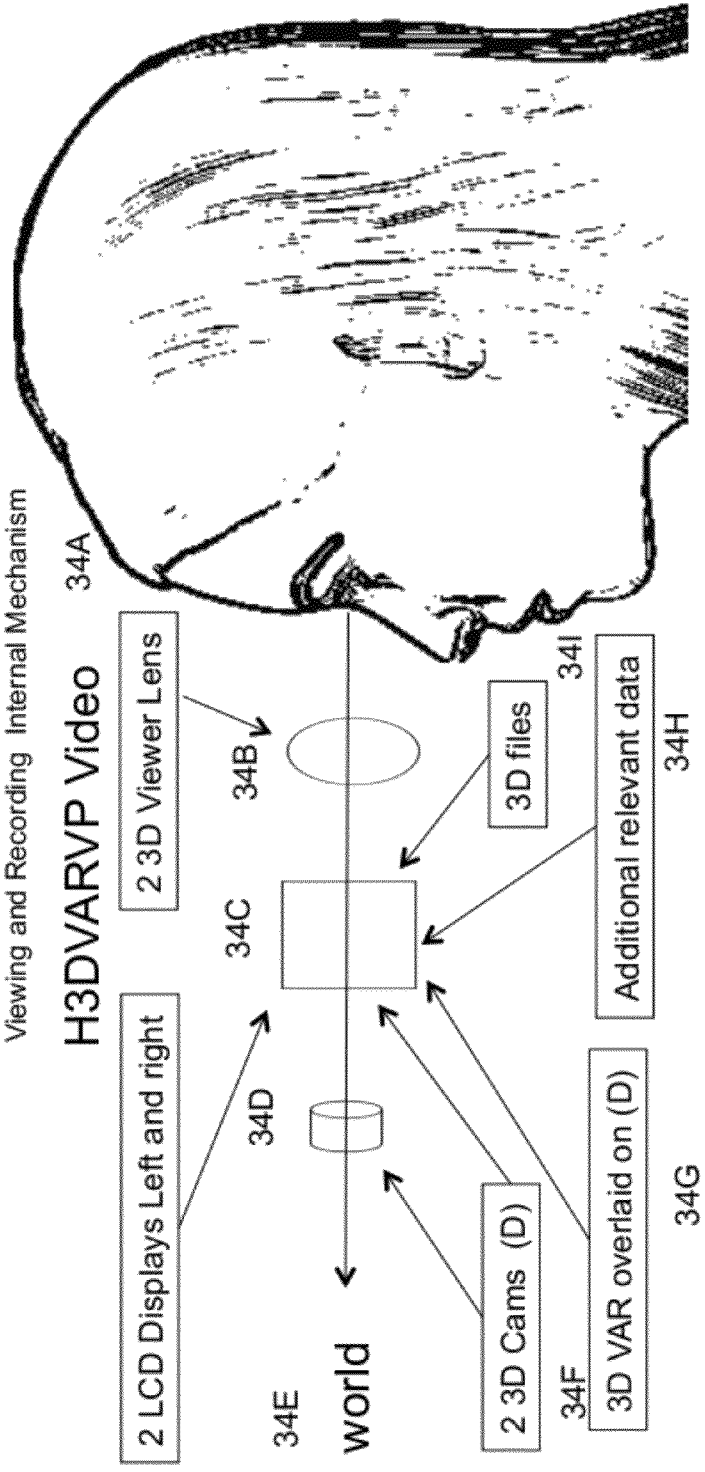
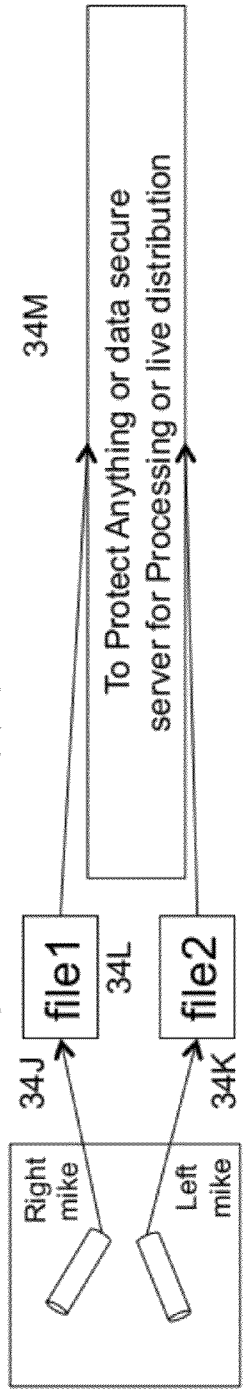

H3DVARVP Video

- 34A
- 2 3D Viewer Lens — 34B
- 34C
- 2 LCD Displays Left and right — 34D
- 34E — world
- 2 3D Cams (D) — 34F
- 3D VAR overlaid on (D) — 34G
- 3D files — 34I
- Additional relevant data — 34H

H3DVARVP Audio

- file1 — 34J, 34L
- file2 — 34K
- Right mike
- Left mike
- To Protect Anything or data secure server for Processing or live distribution — 34M

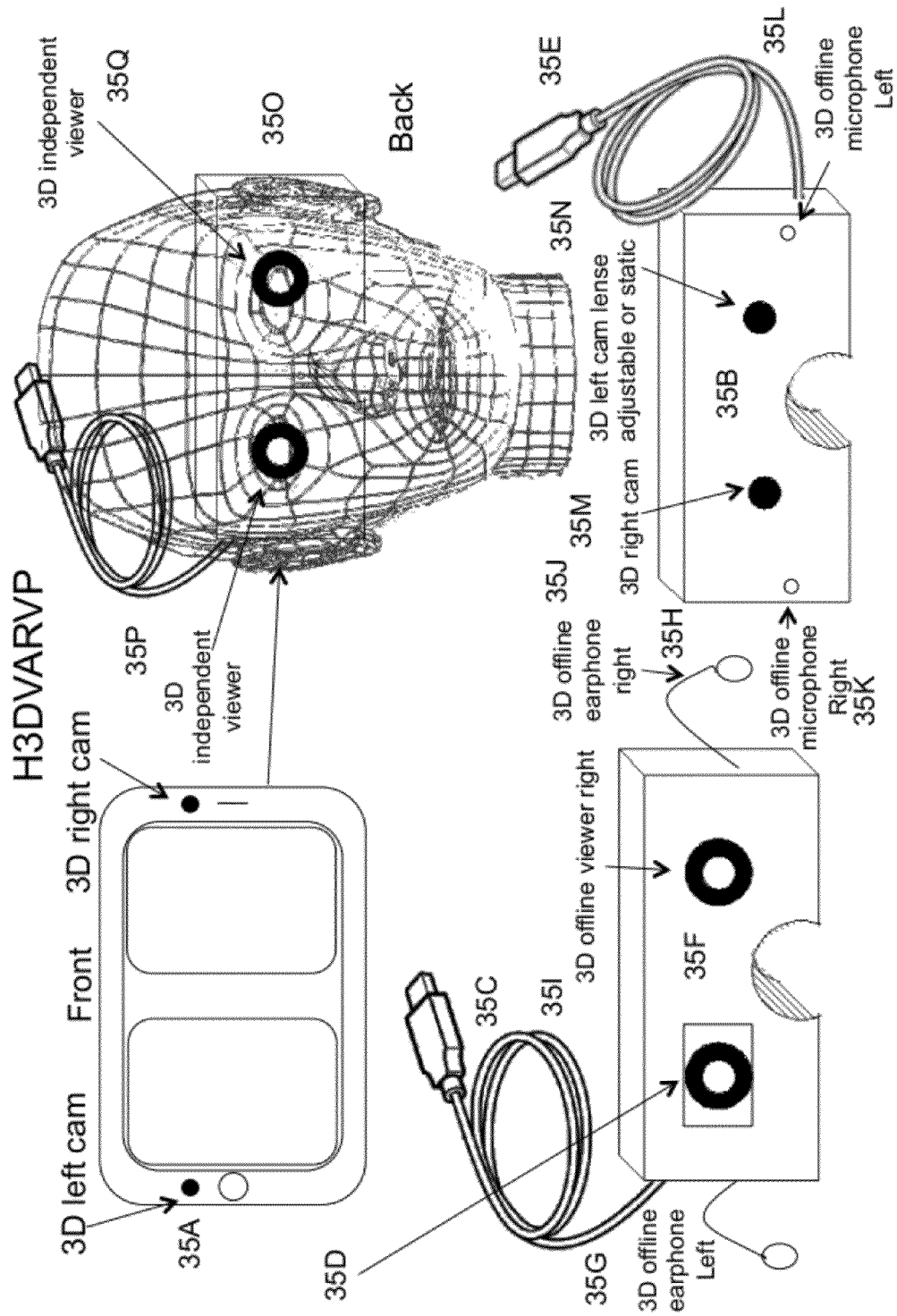

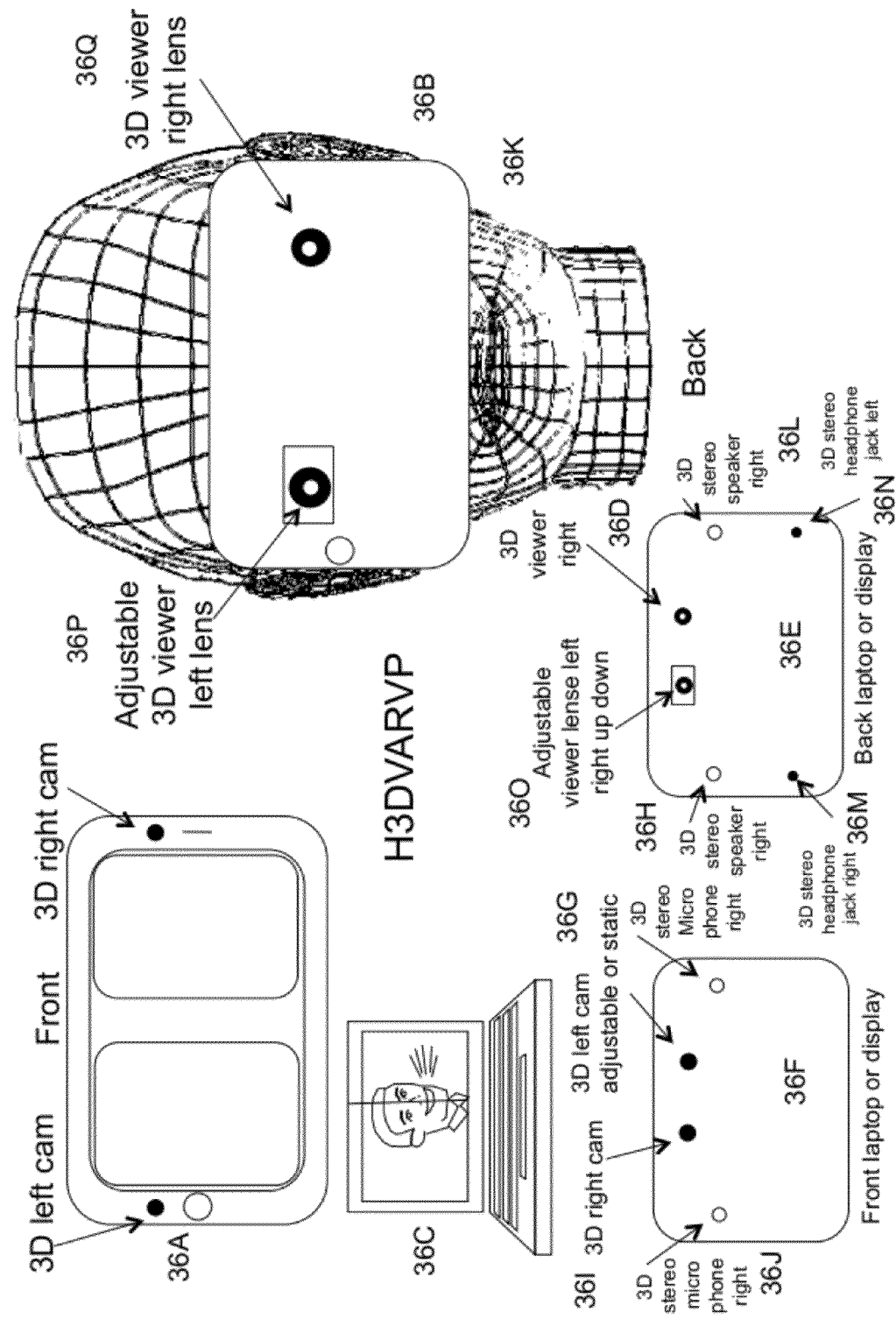
FIG. 36  Protect Anything Human Key 3D Human Video Audio Stereo Viewing and Recording Mechanism

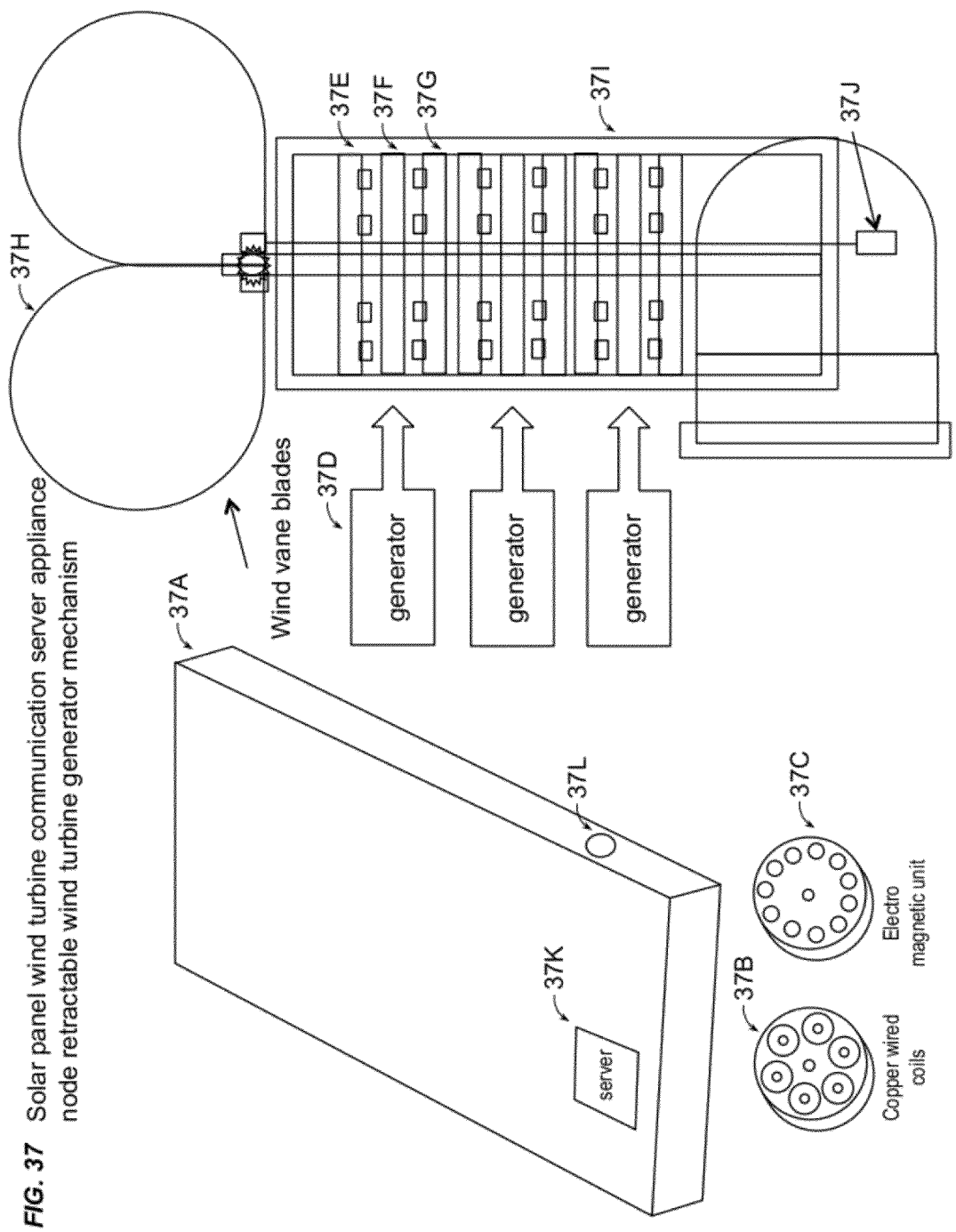
FIG. 37 Solar panel wind turbine communication server appliance node retractable wind turbine generator mechanism

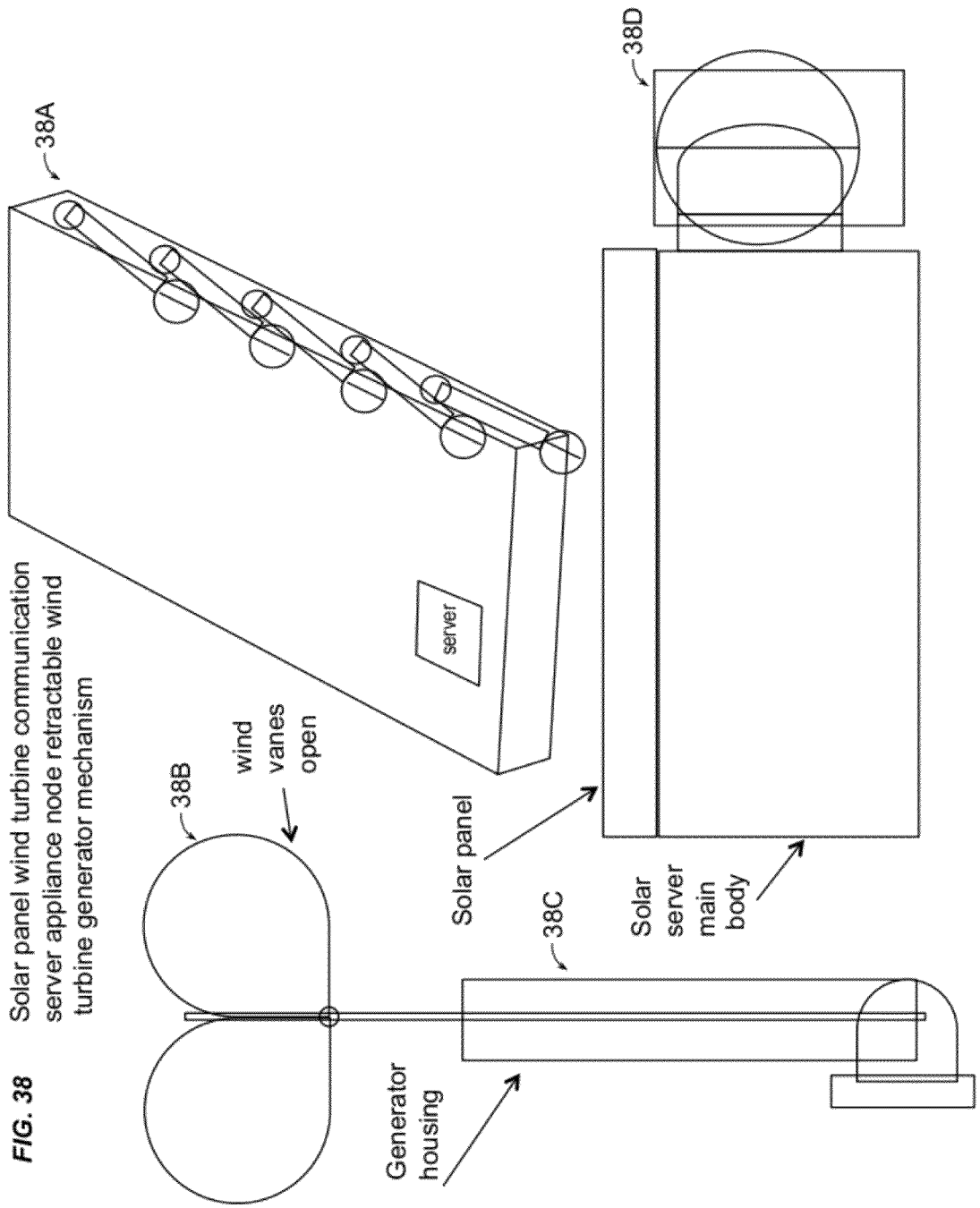

SOLAR PANEL WIND TURBINE COMMUNICATION SERVER NETWORK APPARATUS METHOD AND MECHANISM

FIELD OF THE INVENTION

The present invention relates to an independent solar panel wind turbine communication server appliance network of nodes connected together to form a powerful energy network for communications and energy needs. The method and mechanism system has several remote management aspects plus a special metering system for kilowatt hours and thermal temperatures.

DESCRIPTION OF THE PRIOR ART

The use of solar panels for daylight energy creation is very wide spread, and has limited intelligence included into the solar panel design; if inclement weather is presented the energy creation is limited and can limit power generation for long periods of time.

SUMMARY OF THE INVENTION

The present method and mechanism of this invention, the solar panel wind turbine communication server appliance network nodes presented here meets the needs of the alternative energy user by providing many additional positive features, to reduce the energy cost for the user and reduce drain on the conventional energy grid by the user, plus added features for the user to be able to have an additional source of power, and communication just in case the traditional energy grid goes down. Some of the features include heat generation cover for cooling or heating the solar server node, and in combination with many nodes, the average amount per home would be 16 to 48 for homes and more for open spaces and commercial properties, the method and mechanism can heat a whole structure, generate energy for cooling, and has low energy solar server units that can be used for communications, data processing, entertainment, and anything else a family might want major supercomputing parallel processing power for. The user can have a plurality of devices in their structure connected into the solar server node system and they can have the power of a supercomputer at their disposal. The communication mechanism has a voice over internet protocol server, where a special wireless handheld device, or mobile phone can be used with each structure solar server cluster of nodes, and can be connected to the main backbone of the internet, as well as connected locally to neighbors solar server clusters in a local network. The business method for the distribution of the mechanism is flexible and is built around either a no cost setup and installation with payments balanced with the amount of energy consumed as time goes by on the contract, or combination lease purchase or installment method.

A solar server automatic cleaner mechanism is included, to automatically remove snow, and rain from the surface of the solar cells to keep them running in inclement weather, also there is a plurality of retractable wind turbines that generate energy at night and during inclement weather when the solar panels cannot generate energy.

A wireless energy transference method and mechanism is used to boost the collective energy of the cluster grid, and ultimately pass it along even in inclement weather for use by the user or other network users, store it, and/or send it along to the traditional grid, or grid network for kilowatt hour storage in a banking system.

A metering system is connected to a kilowatt hour bank that keeps track of users kilowatt hours used, and the excess energy used by a user or group of users, energy used by individual mechanisms, and energy sent to storage or the power grid, and whenever energy is stored and/or banked, the excess energy can be traded for tangible assets, including goods and services.

The present invention also has a triple solar, wind, magnetic electricity generation system that has the capability to be automatically adjusted for optimum energy generation.

The present invention includes special heat thermal sensors that detect, bad components, and heat pockets for the automatic cooling mechanism to address and cool down those areas included in this comprehensive energy solar server node mechanism.

Each solar server node has its own independent wireless router for communications transfers or to each node in the cluster, and to the outside network, in addition the plurality of routers allow for connectivity to any space including living spaces, and provide fast connections for resource intensive uses, such as VOIP video conferences that run better due to the parallel processing of the data flow through the independent wireless router cluster network.

In addition the present invention includes passive heat generated from the winter cover system mechanism for protection of each solar server node, for heating and melting snow, and generating additional energy in the form of heat, and electricity, utilizing the double redundancy magnetic motor fan engine mechanism, and food can be cooked in a specially developed solar forced air convection oven, and mechanism can also heat a space, and at night with the wind turbines electricity generator mechanism can keep an ambient temperature throughout the night, while generating energy to keep batteries charged, and depositing surplus amounts of kilowatt hours into an energy bank, or charging any electric, and/or mobile device automatically.

The present invention also provides for an alarm system mechanism that never stops as its power lines cannot be cut.

Also the present invention provides for a magnetic tagging system for managing every square inch of a building structure, or contents in building structure through the solar server node network, so that when an object is moved or transported the system can track the object as long as it stays within the solar server communication network grid, and it also can be connected to external camera systems to track an object within network system range, and actually track the object through the area of the local network of user structures, until the object leaves the network area.

Also the present invention provides for a multiple redundant solar panel wind turbine communication server appliance node, and cluster networks with backup and storage method, and mechanism, used for important data storage, and events management, and when clustered in a parallel processing network creates high speed data processing and supercomputer access at each location.

SPECIFICATIONS

FIG. 1A is a conceptual diagram representative of wireless electricity transmitter apparatus.

FIG. 1B is a conceptual diagram representative of wireless electricity receiver apparatus.

FIG. 1C is a conceptual diagram representative of wireless electricity energy bank meter apparatus.

FIG. 1D is a conceptual diagram representative of wireless electricity transformer apparatus.

FIG. 1E is a conceptual diagram representative of wireless electricity flow from receiver to transformer apparatus.

FIG. 1F is a conceptual diagram representative of wireless electricity flow from transformer to transmitter apparatus.

FIG. 1G is a conceptual diagram representative of wireless electricity flow from other server nodes to transmitter apparatus.

FIG. 1H is a conceptual diagram representative of electricity from mini wind turbines approximately 10 kilowatt hours per day.

FIG. 1I is a conceptual diagram representative of electricity from solar panel approximately 15 kilowatt hours per day.

FIG. 1J is a conceptual diagram representative of electricity from magnetic generator approximately 1 kilowatt hours per day.

FIG. 1K is a conceptual diagram representative of electricity flow to other solar panel wind turbine communication server appliance nodes, and/or lower living zones for use of electricity or storage in batteries, or sold to conventional grid, or added to the energy bank for use later.

FIG. 2 is an illustration representative of the dual node solar server network aggregation mechanism demonstrating a plurality of nodes that are a cluster and that if the power and communication grid go down the system can communicate and get power from the other members of the solar server network grid wirelessly.

FIG. 2A is an illustration representative of the power generator terrestrial based solar panel wind turbine communication server appliance node.

FIG. 2B is an illustration representative of the power solar server with the VoIP server.

FIG. 2C is an illustration representative of the inverter connected to the terrestrial based solar panel wind turbine communication server appliance node panels alternating current.

FIG. 2D is an illustration representative of the battery connected to the inverter unit of the terrestrial based solar panel wind turbine communication server appliance node panels.

FIG. 2E is an illustration representative of the hot water heater connected to the passive terrestrial based solar panel wind turbine communication server appliance node cooling venting mechanism.

FIG. 2F is an illustration representative of the direct current connection to the battery from the terrestrial based solar panel wind turbine communication server appliance node panels.

FIG. 3 is a block diagram illustrating a method and mechanism and mechanism for phrase analysis and human recognition as part of an embodiment of the present invention.

FIG. 3A is a block diagram illustrating an enrollment method and mechanism with Prot1, saying favorite key phrase while nose is on target cross hair of screen from cam.

FIG. 3B is a block diagram illustrating an extraction of a video.flv that is the length of 30 to 60 seconds.

FIG. 3C is a block diagram illustrating an extraction of 300 images for analysis from the key phrase video.

FIG. 3D is a block diagram illustrating an extraction of audio from the key phrase video.

FIG. 3E is a block diagram illustrating a Fourier, Prot2, transformation from image.jpg file for analysis and storage in the same field as the key phrase for further processing.

FIG. 3F is a block diagram illustrating that the data is then stored in a database until a person wants to be identified.

FIG. 3G is a block diagram illustrating a Fourier, Prot2, transformation from audio.mp3 file for analysis and storage in the same field as the key phrase for further processing.

FIG. 3H is a block diagram illustrating a voice recognition mechanism that takes voice and converts it to typed phrase.

FIG. 3I is a block diagram illustrating a database storage mechanism of typed key phrase that is later used for the initial search, to narrow the search array.

FIG. 3J is a block diagram illustrating the Prot1 mechanism where a user is asked to say a phrase then verify that the typed phrase is the one that was said by the user yes or no and enrollment begins when the user presses yes and all of the audio, video, image, transformations of data, and the text data is stored for future comparison and identification.

FIG. 3K is a block diagram illustrating the enrollment and verification with other verification method and mechanisms that can be added to the enrollment mechanism like driver's license, credit card data, birth certificate, and social security number.

FIG. 4 is conceptual diagram illustrating a method and mechanism for the wireless energy aggregation mechanism battery storage mechanism an embodiment of the present invention.

FIG. 4A is conceptual diagram illustrating a method and mechanism that shows terrestrial based solar panel wind turbine communication server appliance node cluster with cooling vent clear top black pipe heat transformation system which is an embodiment of the present invention.

FIG. 4B is conceptual diagram illustrating a method and mechanism that shows DC voltage converted to AC with inverter in an embodiment of the present invention.

FIG. 4C is conceptual diagram illustrating a method and mechanism that shows the battery storage system in an embodiment of the present invention.

FIG. 4D is conceptual diagram illustrating a method and mechanism that shows the extra energy passing to the traditional power grid or to other user's terrestrial based solar panel wind turbine communication server appliance nodes in the network in an embodiment of the present invention.

FIG. 4E is conceptual diagram illustrating a method and mechanism that shows the passive solar heat venting tube from the terrestrial based solar panel wind turbine communication server appliance nodes connecting to the steam heat generator in an embodiment of the present invention.

FIG. 4F is conceptual diagram illustrating a method and mechanism that shows the passive solar heat venting tube from the terrestrial based solar panel wind turbine communication server appliance nodes connecting to the solar hot water heater in an embodiment of the present invention.

FIG. 4G is conceptual diagram illustrating a method and mechanism that shows the terrestrial based solar panel wind turbine communication server appliance node voice over internet protocol server in an embodiment of the present invention.

FIG. 5 is a conceptual diagram illustrating a method and mechanism that shows the solar server winter heating apparatus with cleaner mechanism in another embodiment of the present invention FIG. 5A is a conceptual diagram illustrating a method and mechanism that shows the curved cleaner mechanism according to another embodiment of the present invention.

FIG. 5B is a conceptual diagram illustrating a method and mechanism that shows the clear dome winter attachments attached to the solar panel wind turbine communication server appliance node cluster and connected to the passive solar heating pipes according to another embodiment of the present invention FIG. 5C is a conceptual diagram illustrating a method and mechanism that shows the passive solar heating pipes connected to the solar water heater according to another embodiment of the present invention FIG. 5D is a conceptual diagram illustrating a method and mechanism that shows the passive solar heating pipes connected to heat electric generator according to another embodiment of the present invention.

Figure 1:
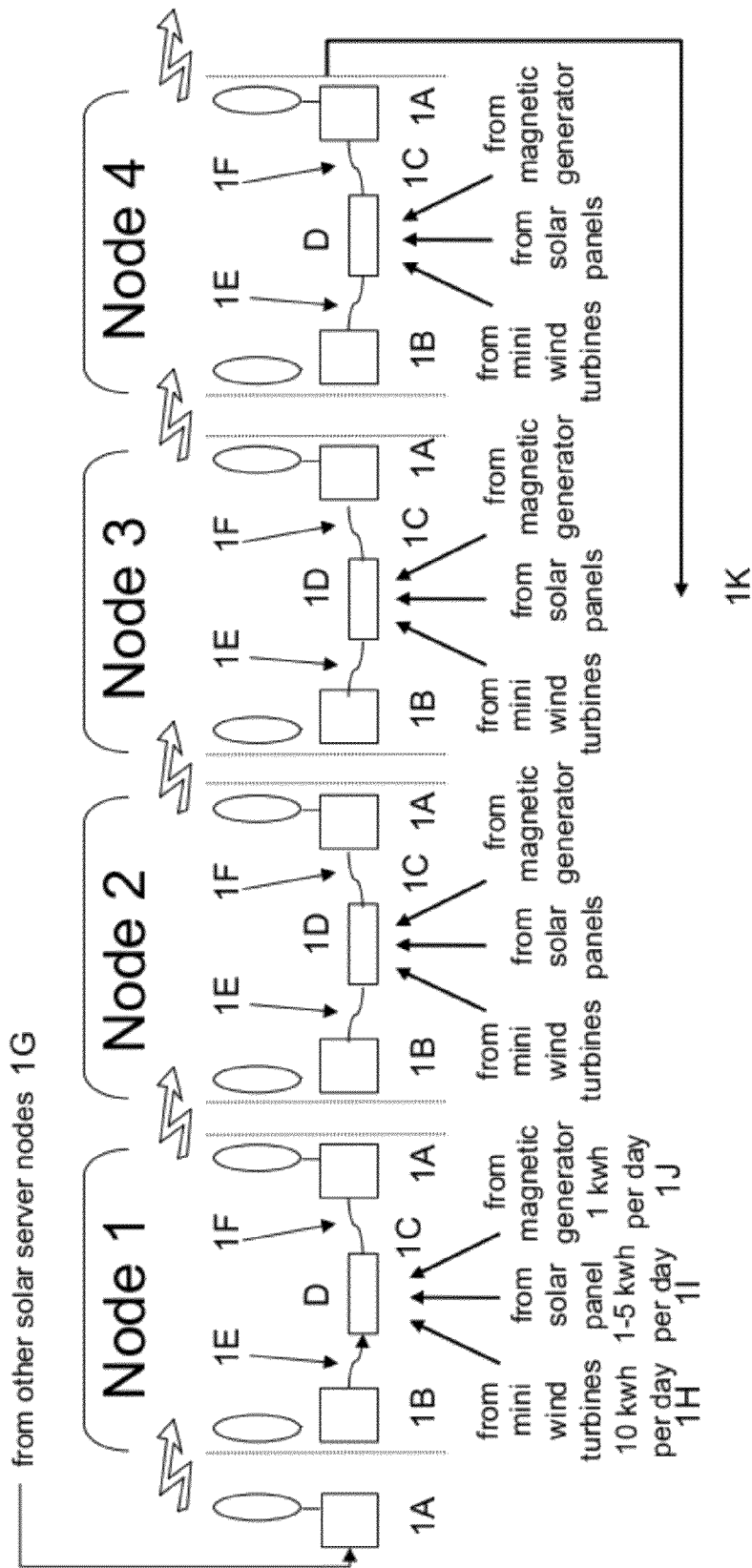
FIG. 1 is a conceptual diagram representative of wireless energy aggregation method and mechanism.
Figure 6:
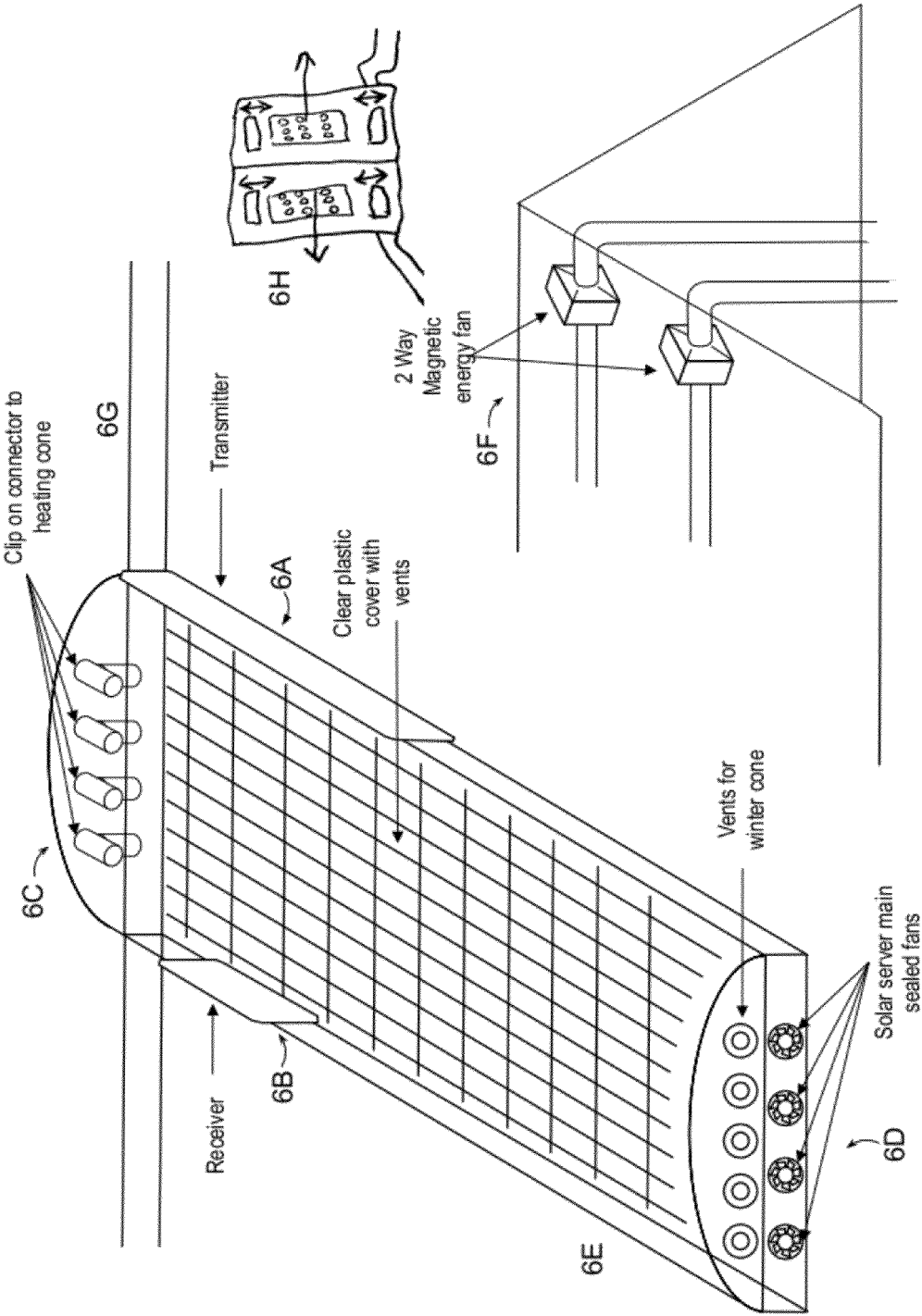

FIG. 5E is a conceptual diagram illustrating a method and mechanism that shows the batteries connected to the heat electric generator according to another embodiment of the present invention FIG. 6 is a conceptual diagram illustrating a method and mechanism that shows the terrestrial based solar panel wind turbine communication server appliance node winter heating unit mechanism in another embodiment of the present invention.

FIG. 6A is a conceptual diagram illustrating a method and mechanism that shows the wireless energy transmitter in another embodiment of the present invention.

FIG. 6B is a conceptual diagram illustrating a method and mechanism that shows the wireless energy receiver in another embodiment of the present invention.

FIG. 6C is a conceptual diagram illustrating a method and mechanism that shows the venting unit mechanism of the terrestrial based solar panel wind turbine communication server appliance node clear winter cone cover apparatus in another embodiment of the present invention.

FIG. 6D is a conceptual diagram illustrating a method and mechanism that shows the terrestrial based solar panel wind turbine communication server appliance node main sealed air input fans in another embodiment of the present invention.

FIG. 6E is a conceptual diagram illustrating a method and mechanism that shows the intake vents for the winter cone cover in another embodiment of the present invention.

FIG. 6F is a conceptual diagram illustrating a method and mechanism that shows the terrestrial based solar panel wind turbine communication server appliance node vent pipe connected to the passive solar 2 way magnetic energy fan in another embodiment of the present invention.

FIG. 6G is a conceptual diagram illustrating a method and mechanism that shows the vent pipe from the terrestrial based solar panel wind turbine communication server appliance nodes in another embodiment of the present invention.

FIG. 6H is a conceptual diagram illustrating a method and mechanism that shows the 2 way magnetic motor with stator turn offs and electric override mechanism from the terrestrial based solar panel wind turbine communication server appliance nodes in another embodiment of the present invention.

Figure 7:
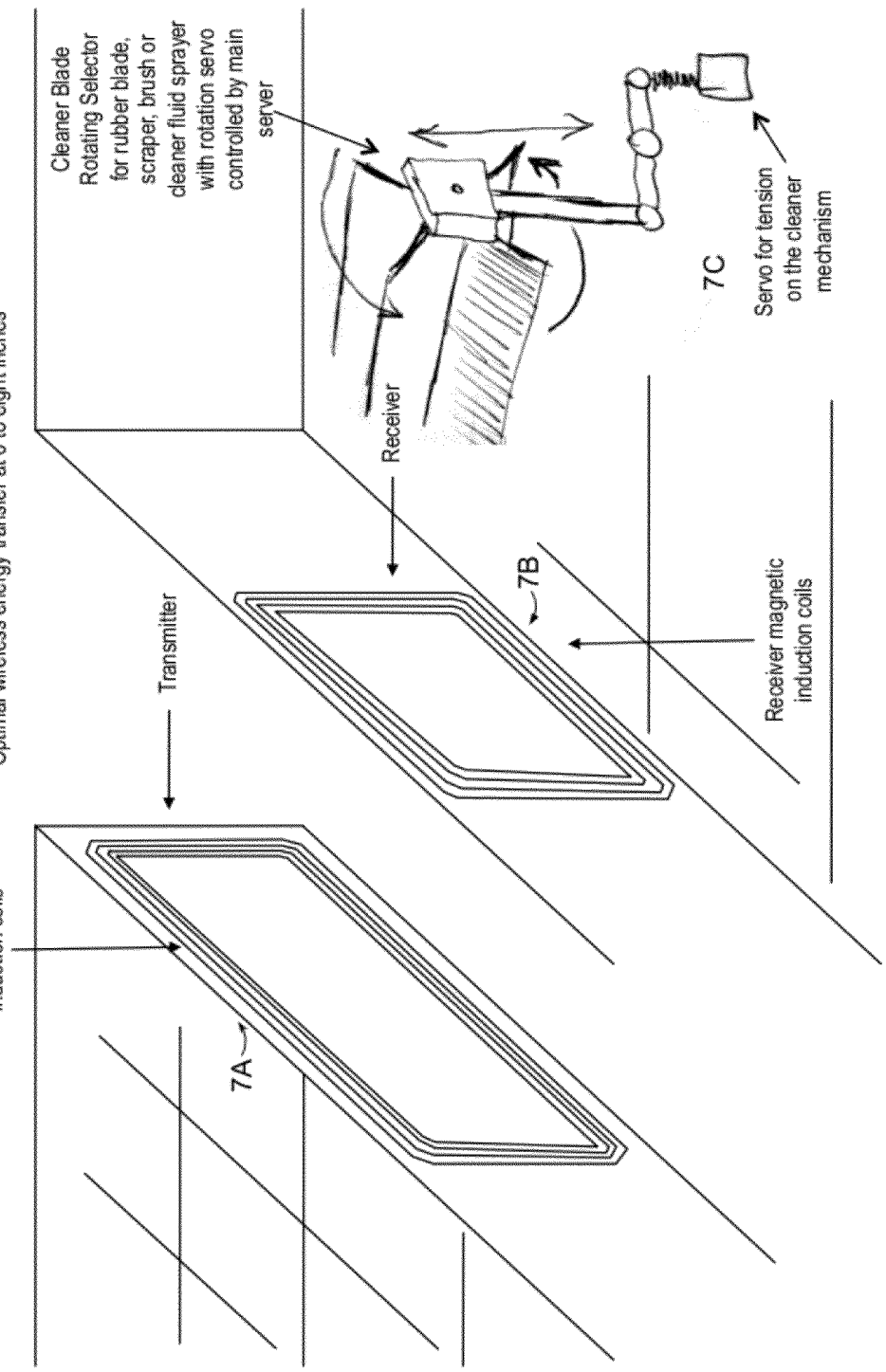

FIG. 7 is a cross sectional diagram of apparatus according to one embodiment of the present terrestrial based solar panel wind turbine communication server appliance node invention having a wireless energy transfer mechanism.

FIG. 7A is a cross sectional diagram of transmitter magnetic induction coil apparatus according to one embodiment of the present invention having a FIG. 7B is a cross sectional diagram of receiver magnetic induction coil apparatus according to one embodiment of the present invention having a FIG. 7C is a cross sectional diagram of solar panel wind turbine communication server appliance node tension and rotational blade apparatus for cleaner unit in one embodiment of the present invention having an electronic method for selecting which blade is necessary for the specific task and applying the right tension for effectiveness in cleaning.

Figure 8:
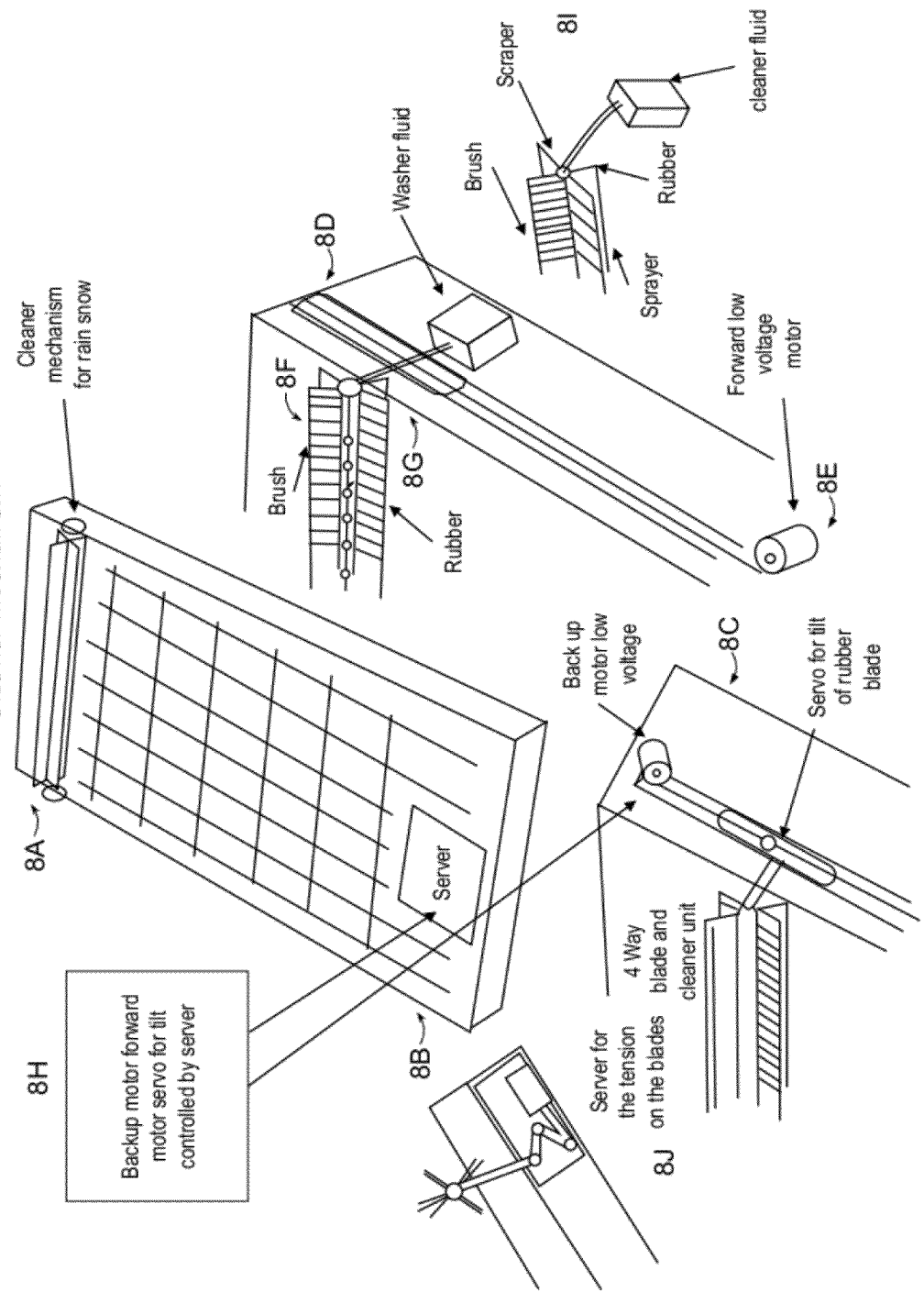

FIG. 8 is a conceptual diagram illustrating the terrestrial based solar panel wind turbine communication server appliance node cleaner mechanism FIG. 8A is a conceptual diagram illustrating cleaner mechanism for rain and snow.

FIG. 8B is a conceptual diagram illustrating main terrestrial solar panel wind turbine communication server appliance node server for control of the backup motor and forward motor servo for tilt controller.

FIG. 8C is a conceptual diagram illustrating low voltage backup motor and servo for rotation and tilt of 4 way blade and sprayer unit.

FIG. 8D is a conceptual diagram illustrating sliding track for the movement up and down of the cleaner mechanism.

FIG. 8E is a conceptual diagram illustrating forward low voltage motor.

FIG. 8F is a conceptual diagram illustrating brush blade of 4 way cleaner unit.

FIG. 8G is a conceptual diagram illustrating rubber blade of 4 way cleaner unit.

FIG. 8H is a conceptual diagram illustrating backup motor forward motor servo for tilt controlled by server.

FIG. 8I is a conceptual diagram illustrating connection of tubing for cleaner fluid to sprayer blade.

FIG. 8J is a conceptual diagram illustrating the servo to apply tension on the cleaner blades.

Figure 9:
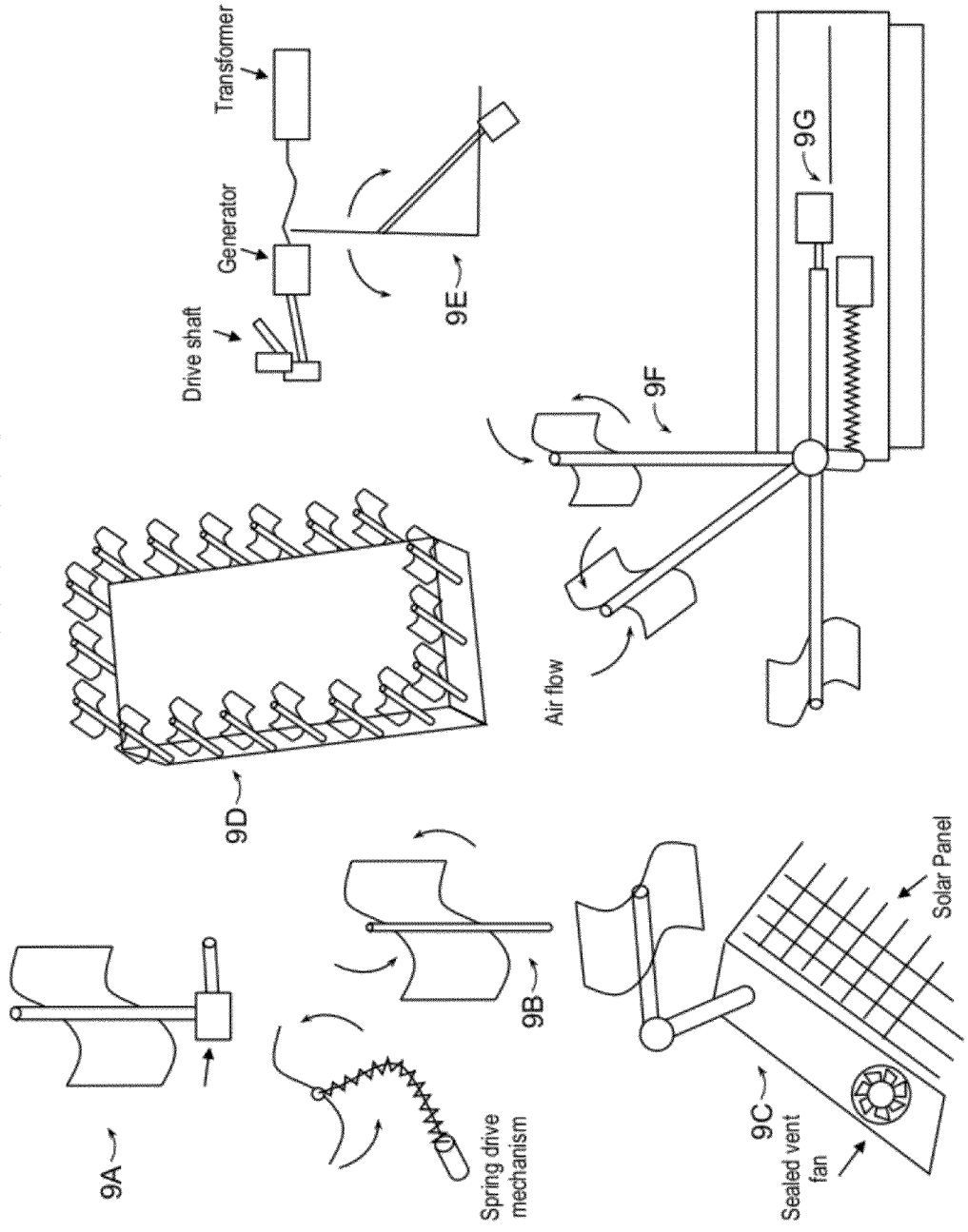

FIG. 9 is an enlarged illustration view of the terrestrial based solar panel wind turbine communication server appliance node wind turbine mechanism.

FIG. 9A is an enlarged illustration view of the plastic or aluminum all ways of wind direction wind blade.

FIG. 9B is an enlarged illustration view of the air flow from any direction.

FIG. 9C is an enlarged illustration view of the folding wind turbine apparatus with sealed vent fan mechanism.

FIG. 9D is an enlarged illustration view of the mini wind turbines fully extended for maximum electricity generation.

FIG. 9E is an enlarged illustration view of the servo tilting mechanism controlled by main server for adjusting the shadow off the solar panel area.

FIG. 9F is an enlarged illustration view of the tilt and store mechanism of the mini wind turbine apparatus.

FIG. 9G is an enlarged illustration view of the coil and magnetic electric generator connected to the mini wind turbine mechanism.

Figure 10:
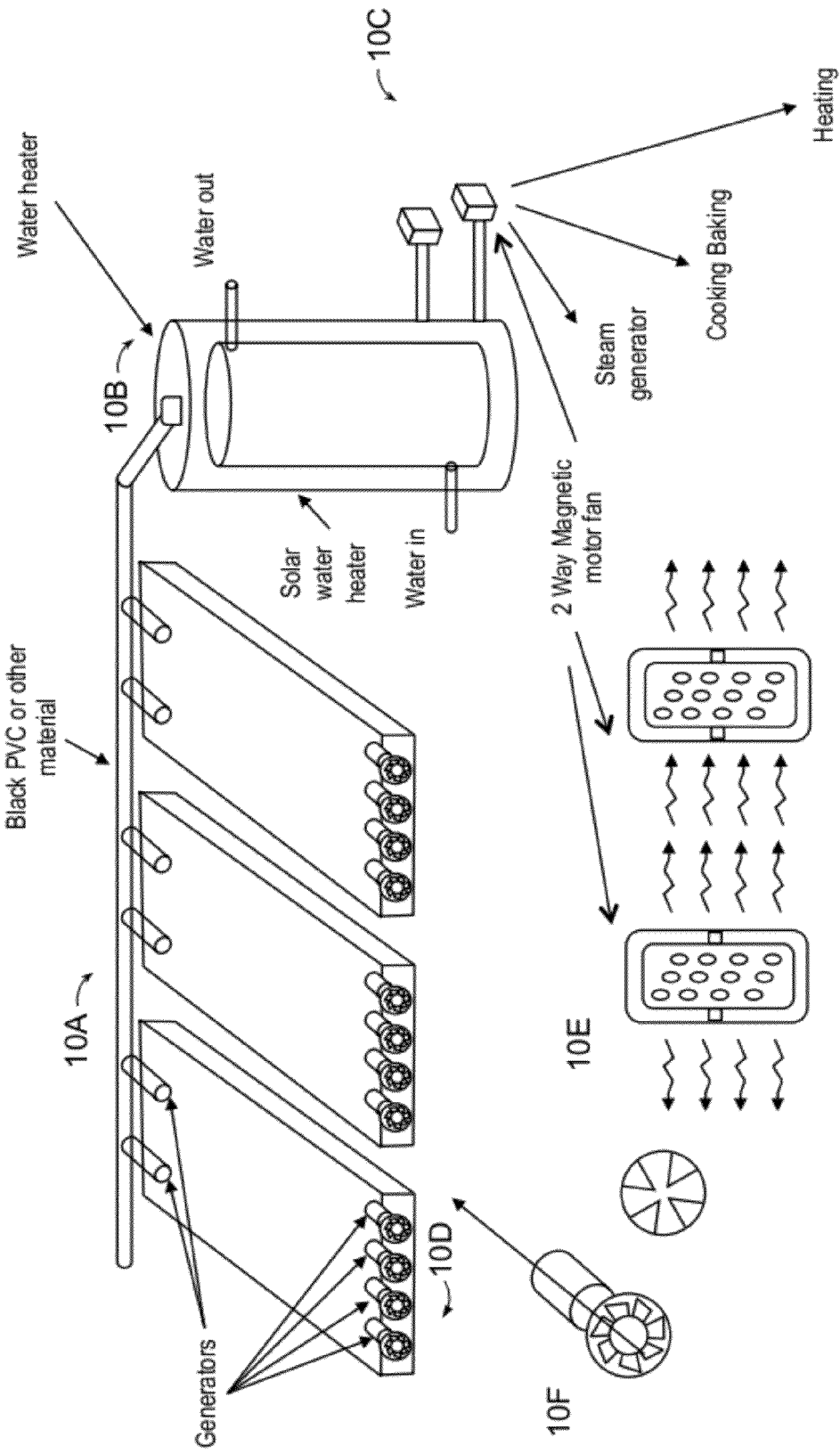

FIG. 10 is an illustration view of the cooling mechanism for terrestrial based solar panel wind turbine communication server appliance nodes in cluster.

FIG. 10A is an illustration view of the black bottom and clear top thermal generation pipe system apparatus.

FIG. 10B is an illustration view of the solar water heater mechanism.

FIG. 10C is an illustration view of the no voltage or low voltage with electric override mechanism vent fan system as it flows to steam generator, cooking or baking unit, or heating areas.

FIG. 10D is an illustration view of the magnetic fan generators or electric override motors connected to the moisture sealed vent covers.

FIG. 10E is an illustration view of the 2 way magnetic fan with electric override apparatus for heating generation, and back flow for heating solar panel wind turbine communication server appliance nodes in winter for defrosting.

FIG. 10F is an illustration view of the moisture seal mechanism for input of air into the server node mechanism.

Figure 11:
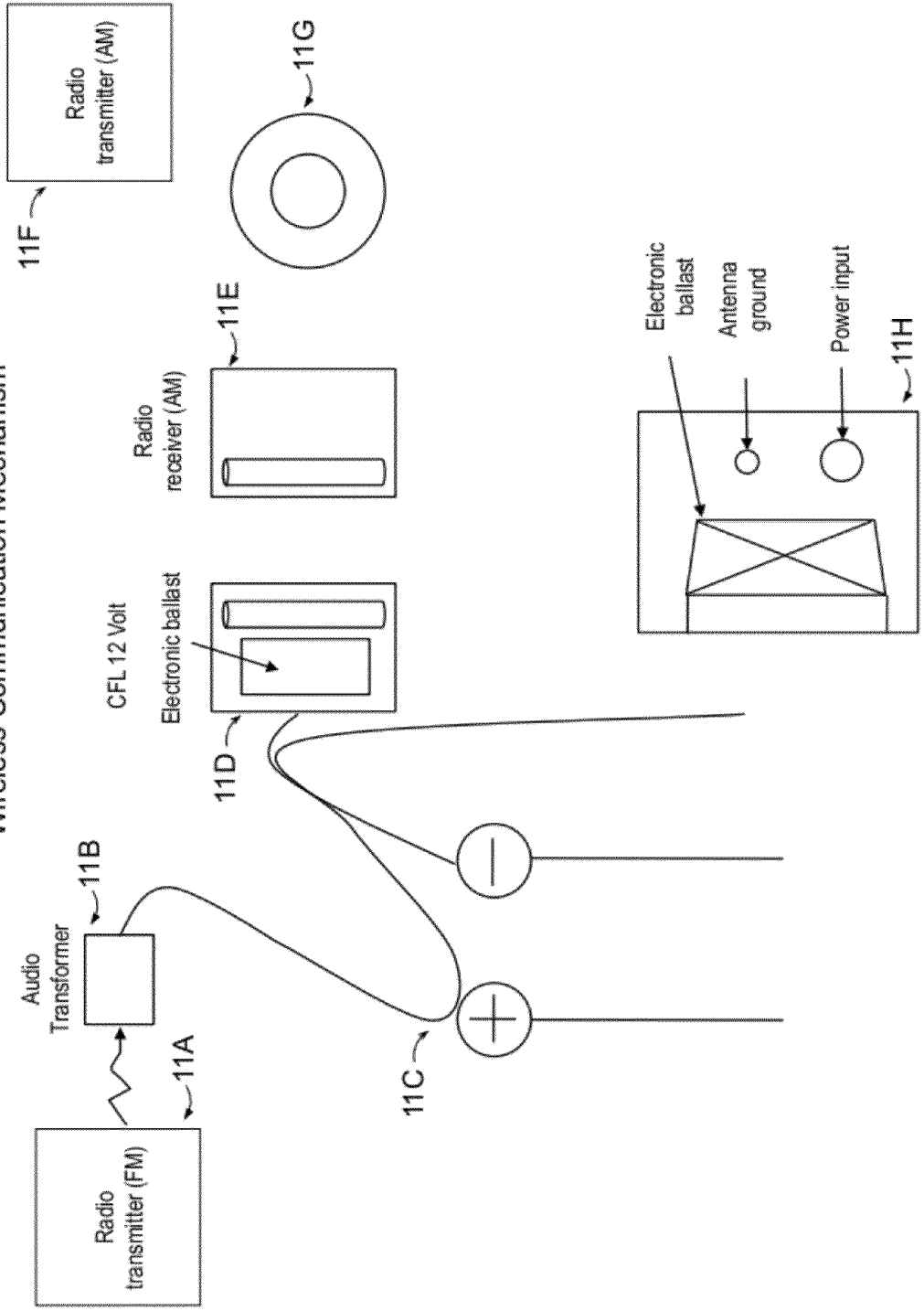

FIG. 11 is an alternative embodiment of the apparatus for wireless energy transfer from the terrestrial based solar panel wind turbine communication server appliance node with wireless communication mechanism.

FIG. 11A is an alternative embodiment of the apparatus for wireless energy transfer that shows the radio transmitter or VOIP unit for lo cell communications.

FIG. 11B is an alternative embodiment of the apparatus for wireless energy transfer that shows the audio transformer mechanism.

FIG. 11C is an alternative embodiment of the apparatus for wireless energy transfer that shows plus and minus positive and negative DC electricity into the apparatus.

FIG. 11D is an alternative embodiment of the apparatus for wireless energy transfer that shows 12 volt electronic ballast and transmitter coil.

FIG. 11E is an alternative embodiment of the apparatus for wireless energy transfer that shows receiver coil FIG. 11F is an alternative embodiment of the apparatus for wireless energy transfer that shows radio receiver, mobile device, wireless device, smart device, artificial intelligence device, and/or robot.

FIG. 11G is an alternative embodiment of the apparatus for wireless energy transfer that shows transformer, battery, 100 volt led bulb, or anything that needs electricity.

11H Illustrates the electronic ballast as related to the antenna ground and power input for wireless energy transfer for the transmission to the receiver unit.

Figure 12:
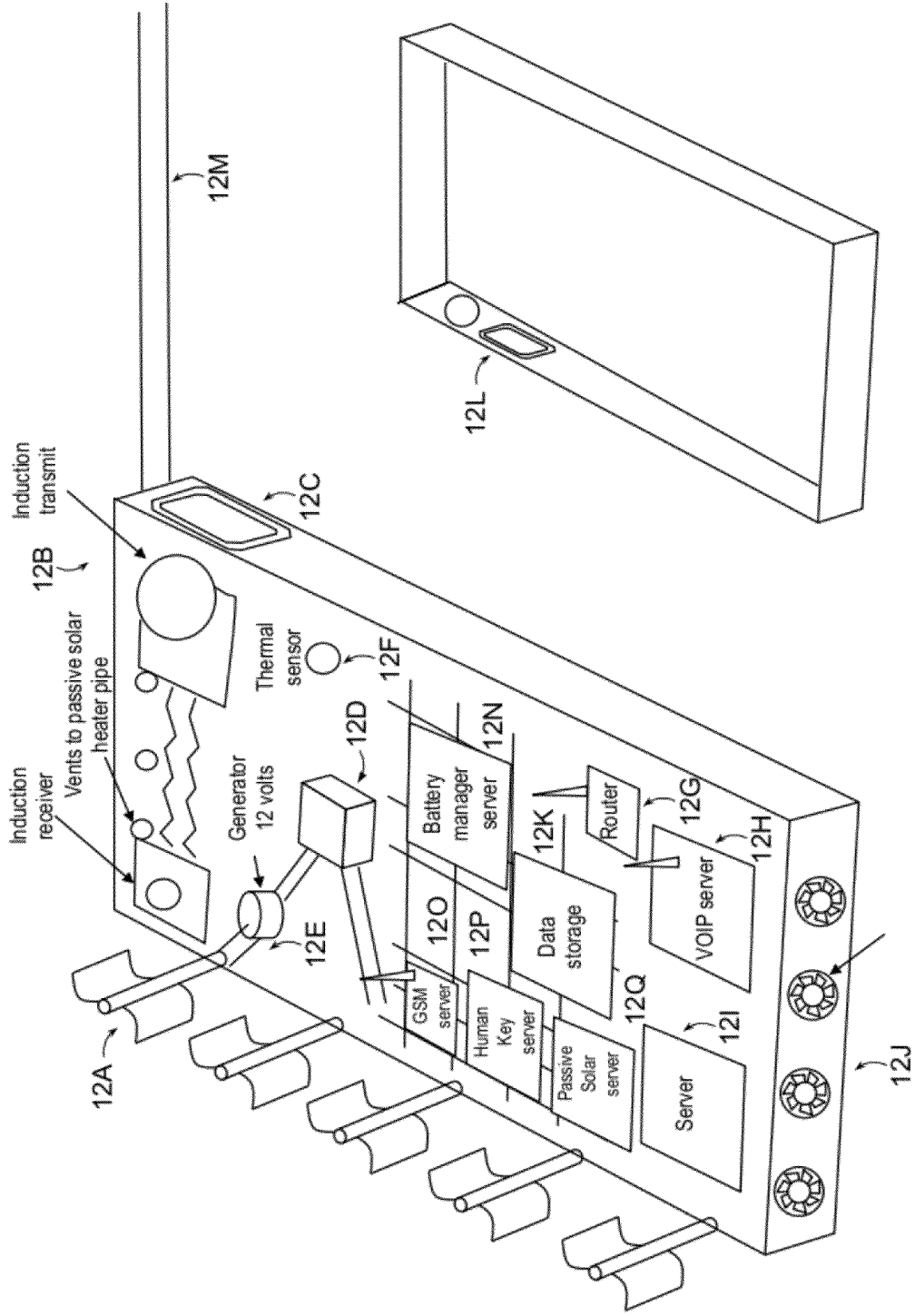

FIG. 12 is a cross sectional diagram, of the wireless VOIP terrestrial based solar panel wind turbine communication server appliance node apparatus according to an embodiment of the present invention.

FIG. 12A is a cross sectional diagram, that shows wind power generator for nighttime electricity generation apparatus according to an embodiment of the present invention.

FIG. 12B is a cross sectional diagram, that shows vents from solar panel wind turbine communication server appliance node to passive solar heater pipe apparatus according to an embodiment of the present invention.

FIG. 12C is a cross sectional diagram, that shows transmitter energy coil apparatus according to an embodiment of the present invention.

FIG. 12D is a cross sectional diagram that shows transformer and internal thermal sensor area apparatus according to an embodiment of the present invention.

FIG. 12E is a cross sectional diagram, that shows magnetic generator connected to mini wind turbines apparatus according to an embodiment of the present invention.

FIG. 12F is a cross sectional diagram, that shows the solar panel surface above the solar panel wind turbine communication server appliance node components apparatus according to an embodiment of the present invention.

FIG. 12G is a cross sectional diagram that shows the solar panel wind turbine communication server appliance node communication router apparatus according to an embodiment of the present invention.

FIG. 12H is a cross sectional diagram, that shows the solar panel wind turbine communication server appliance node communication VOIP server apparatus according to an embodiment of the present invention.

FIG. 12I is a cross sectional diagram, that shows the solar panel wind turbine communication server appliance node low voltage main server apparatus according to an embodiment of the present invention.

FIG. 12J is a cross sectional diagram, that shows the solar panel wind turbine communication server appliance node low voltage input fans apparatus according to an embodiment of the present invention.

FIG. 12K is a cross sectional diagram, that shows the solar panel wind turbine communication server appliance node data storage apparatus according to an embodiment of the present invention.

FIG. 12L is a cross sectional diagram that shows the solar panel wind turbine communication server appliance node receiver coil apparatus according to an embodiment of the present invention.

FIG. 12M is a cross sectional diagram, that shows the solar panel wind turbine communication server appliance node passive solar heater smart vent tube apparatus according to an embodiment of the present invention having a FIG. 12N is a cross sectional diagram, that shows the solar panel wind turbine communication server appliance node battery manager server mechanism.

FIG. 12O is a cross sectional diagram, that shows the solar panel wind turbine communication server appliance node GSM server mechanism board.

FIG. 12P is a cross sectional diagram, that shows the solar panel wind turbine communication server appliance node protect anything Prot2 human key server mechanism.

FIG. 12Q is a cross sectional diagram, that shows the solar panel wind turbine communication server appliance node passive solar server management mechanism.

Figure 13:
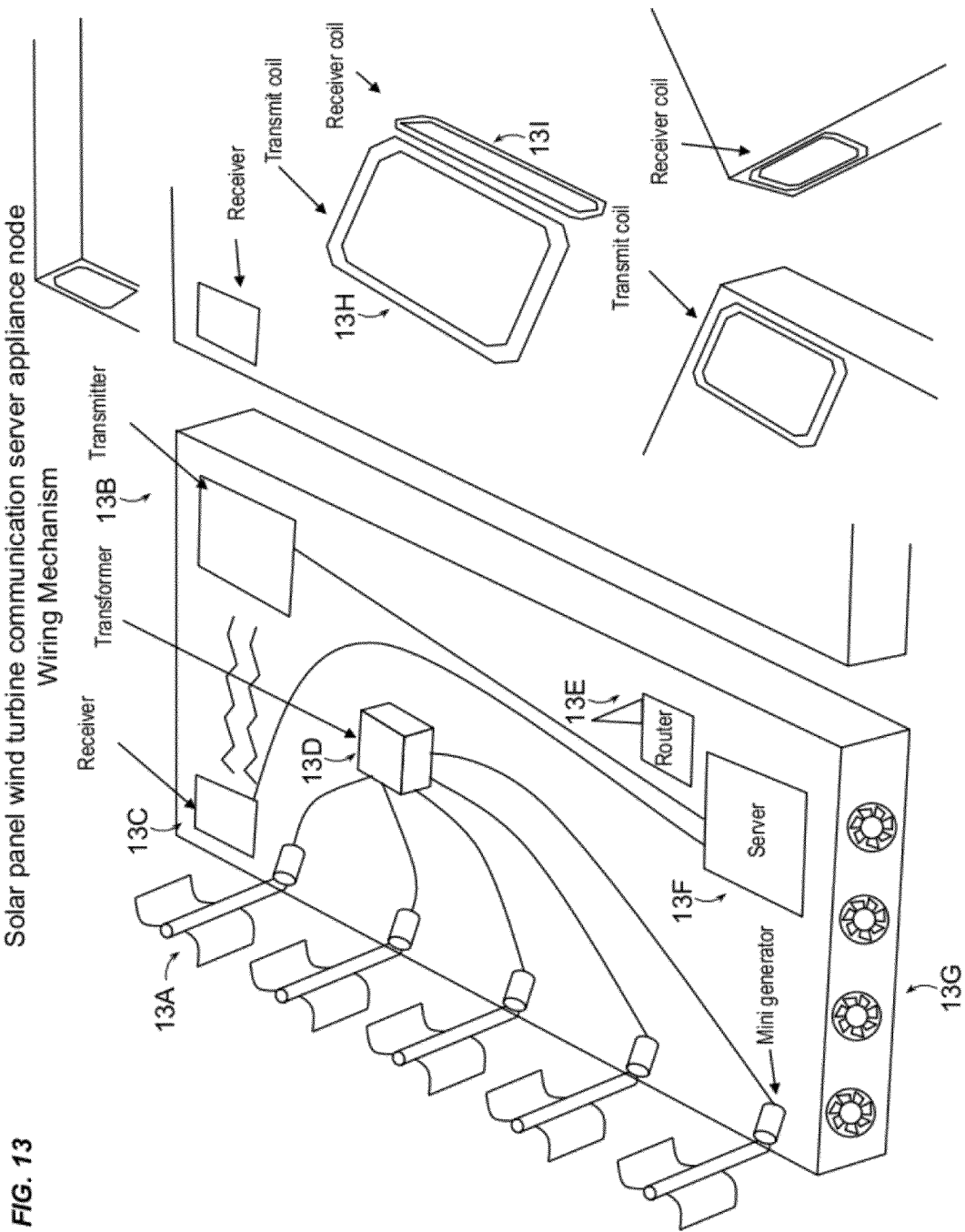

FIG. 13 is an enlarged view of the solar server wiring mechanism.

FIG. 13A is an enlarged view of the solar server wiring mechanism connected to the mini wind turbines mechanism.

FIG. 13B is an enlarged view of the solar server wiring mechanism connected transmitter coil mechanism.

FIG. 13C is an enlarged view of the solar server wiring mechanism connected receiver coil mechanism.

FIG. 13D is an enlarged view of the solar server wiring mechanism connected to the mini wind turbines mechanism and connected to transformer.

FIG. 13E is an enlarged view of the solar server wiring mechanism connected router mechanism.

FIG. 13F is an enlarged view of the solar server wiring mechanism connected main server mechanism.

FIG. 13G is an enlarged view of the solar server wiring mechanism connected sealed vent fans mechanism.

FIG. 13H is an enlarged view of the solar server wiring mechanism connected square transmitter coil mechanism.

FIG. 13I is an enlarged view of the solar server wiring mechanism connected square receiver coil mechanism.

Figure 14:
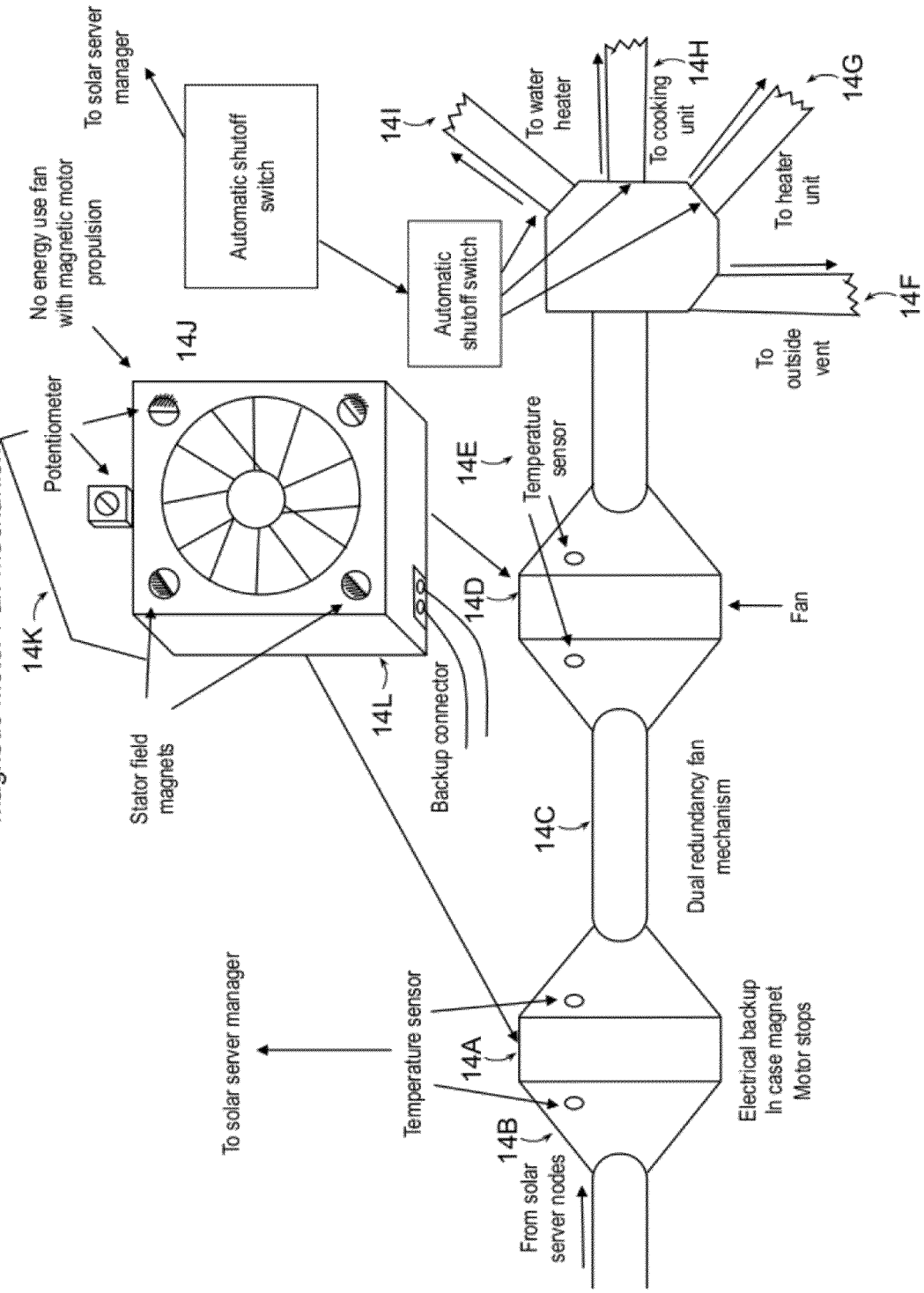

FIG. 14 is an illustration of the terrestrial based solar panel wind turbine communication server appliance node magnetic motor apparatus.

FIG. 14A is an illustration of the apparatus which shows the magnetic motor with electrical backup mechanism.

FIG. 14B is an illustration of the apparatus which shows the thermal sensors mechanism.

FIG. 14C is an illustration of the apparatus which shows the passive solar pipe mechanism.

FIG. 14D is an illustration of the apparatus which shows the second redundant magnetic motor with electrical backup mechanism.

FIG. 14E is an illustration of the apparatus which shows the thermal sensor mechanism.

FIG. 14F is an illustration of the apparatus which shows the control cutoff valve pipe to outside vent mechanism controlled by solar panel wind turbine communication server appliance node sensing unit manager mechanism.

FIG. 14G is an illustration of the apparatus which shows the control cutoff valve pipe to heater unit mechanism controlled by solar panel wind turbine communication server appliance node sensing unit manager mechanism.

FIG. 14H is an illustration of the apparatus which shows the control cutoff valve pipe to cooking unit mechanism controlled by solar panel wind turbine communication server appliance node sensing unit manager mechanism.

FIG. 14I is an illustration of the apparatus which shows the control cutoff valve pipe to water heater mechanism controlled by solar panel wind turbine communication server appliance node sensing unit manager mechanism.

FIG. 14J is an illustration of the apparatus which shows the magnetic motor mechanism.

FIG. 14K is an illustration of the apparatus which shows the stator and potentiometer components of the magnetic motor mechanism.

FIG. 14L is an illustration of the apparatus which shows the backup electrical connector components of the magnetic motor mechanism.

Figure 15:
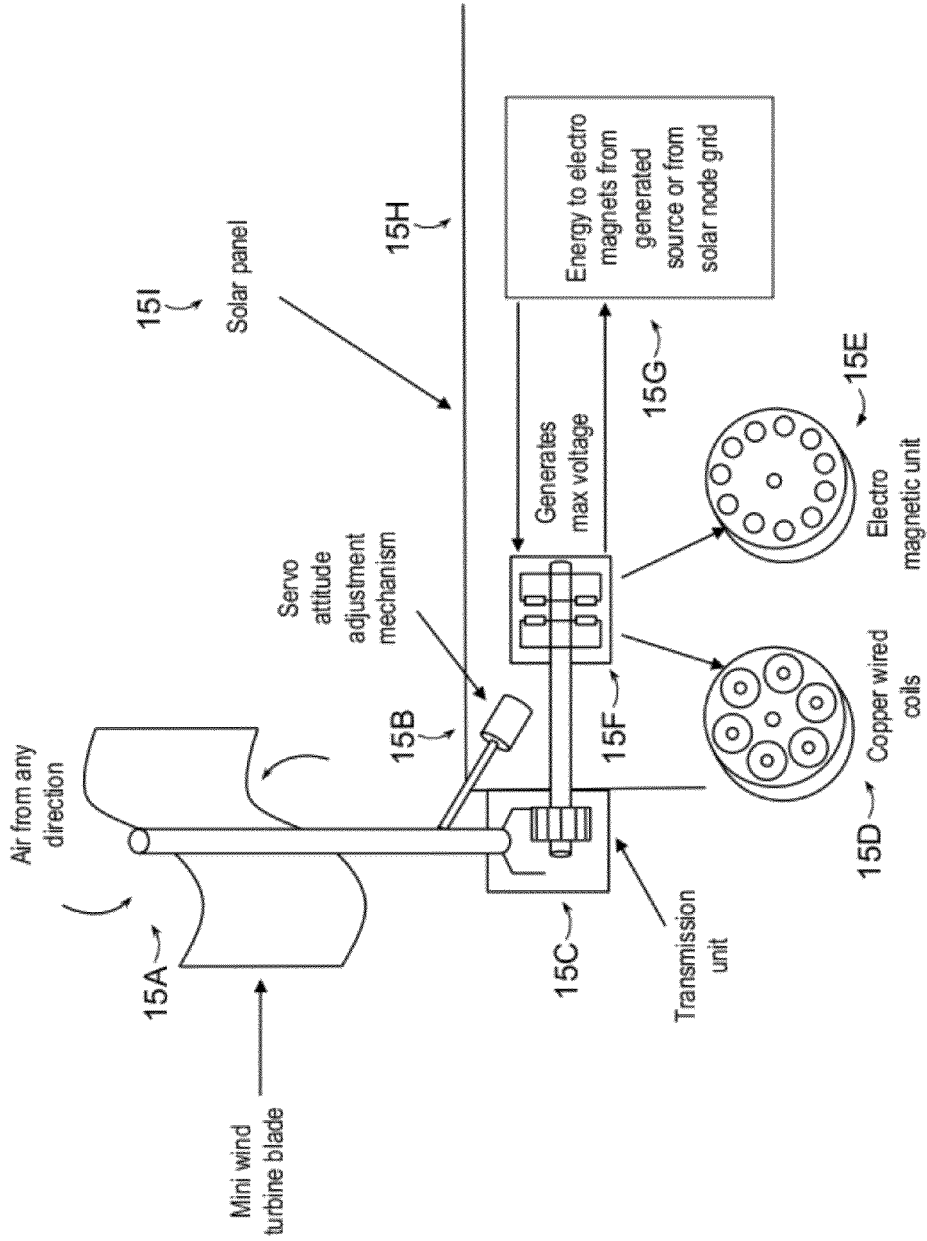

FIG. 15 is an illustration diagram representative of terrestrial based solar panel wind turbine communication server appliance node wind turbine mechanism.

FIG. 15A is an illustration diagram representative of mini wind turbine blade for universal wind from any direction mechanism.

FIG. 15B is an illustration diagram representative of mini wind turbine blade servo attitude adjustment mechanism.

FIG. 15C is an illustration diagram representative of mini wind turbine blade gear transmission mechanism.

FIG. 15D is an illustration diagram representative of mini wind turbine blade copper generator wired coils mechanism.

FIG. 15E is an illustration diagram representative of mini wind turbine blade magnetic coils mechanism.

FIG. 15F is an illustration diagram representative of mini wind turbine blade copper generator mechanism.

FIG. 15G is an illustration diagram representative of 100 volts generated

FIG. 15H is an illustration diagram representative of mini wind turbine blade copper generator energy to electro magnets from generated source or from solar node grid mechanism.

FIG. 15I is an illustration diagram representative of surface of the solar panel wind turbine communication server appliance node panel mechanism.

Figure 16:
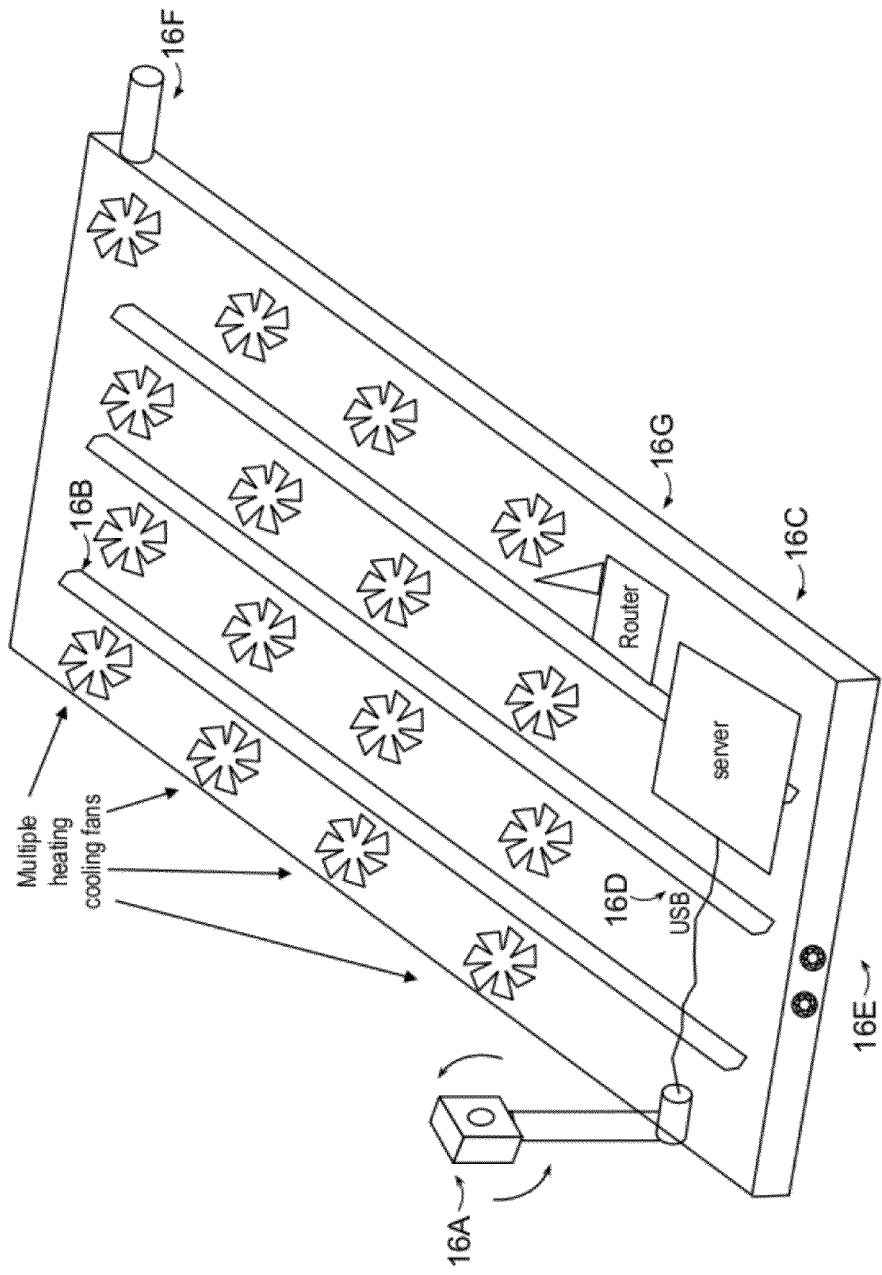

FIG. 16 is a conceptual illustration representative of the terrestrial based solar panel wind turbine communication server appliance node security cam & thermal belt sensing mechanism.

FIG. 16A is a conceptual illustration representative of maintenance security cam for viewing the whole cluster of nodes.

FIG. 16B is a conceptual illustration representative of thermal, gaseous, light sensor, belt mechanism.

FIG. 16C is a conceptual illustration representative of main server mechanism.

FIG. 16D is a conceptual illustration representative of USB connector from cam to main server mechanism.

FIG. 16E is a conceptual illustration representative of moisture resistant input vents.

FIG. 16F is a conceptual illustration representative of cooling vent into the passive solar panel wind turbine communication server appliance node pipe system mechanism.

FIG. 16G is a conceptual illustration representative of communication router mechanism.

Figure 17:
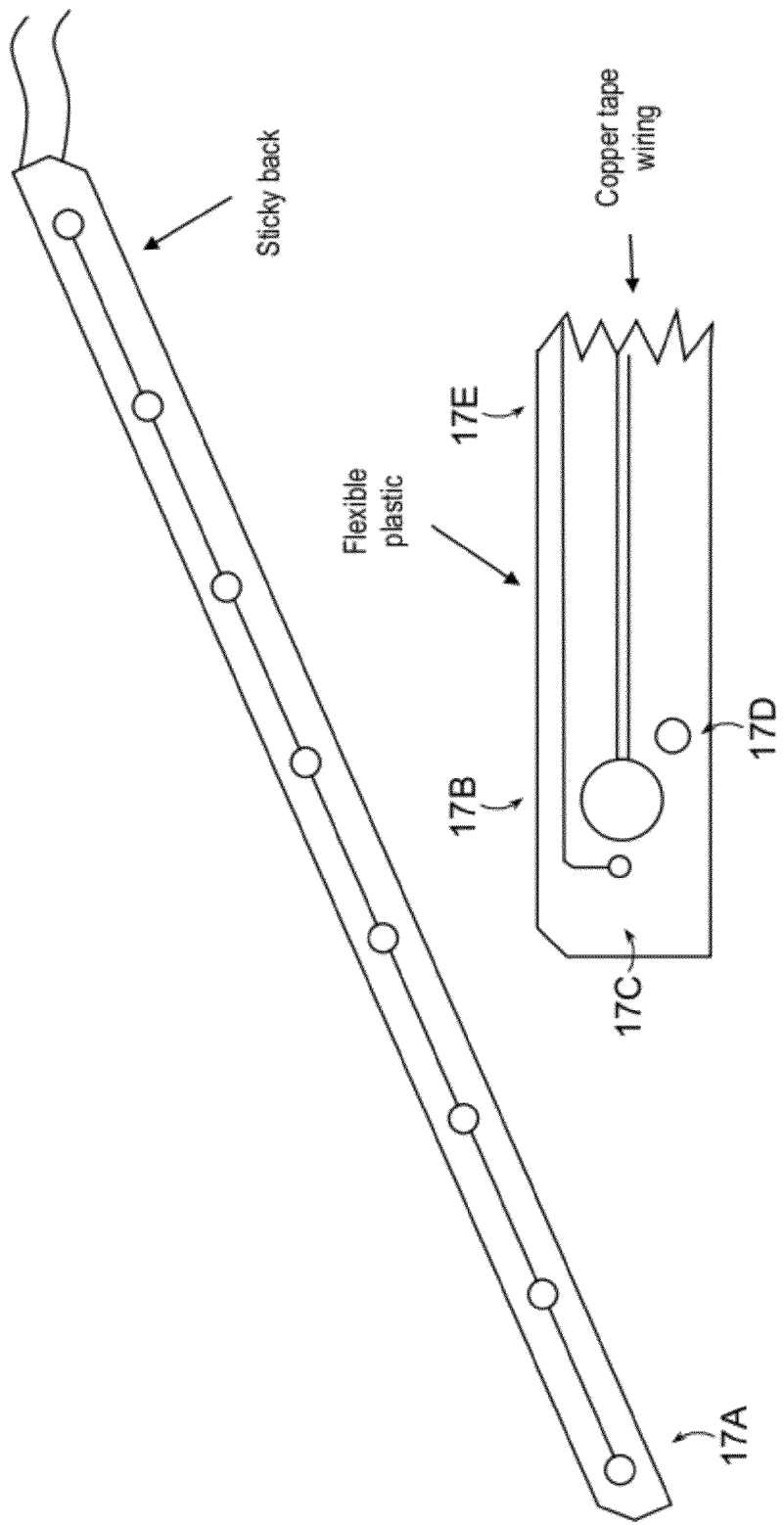

FIG. 17 is a conceptual diagram illustrating a terrestrial based solar panel wind turbine communication server appliance node thermal belt sensing mechanism in an embodiment of the present invention.

FIG. 17A is a conceptual diagram illustrating a thermal belt sensor mechanism that gives temperature at the specific point in the mechanism in an embodiment of the present invention.

FIG. 17B is a conceptual diagram illustrating a thermal belt sensor mechanism that gives gaseous reading at the specific point in the mechanism in an embodiment of the present invention.

FIG. 17C is a conceptual diagram illustrating a thermal belt sensor mechanism that gives temperature at the specific point in the mechanism in an embodiment of the present invention.

FIG. 17D is a conceptual diagram illustrating a thermal belt sensor mechanism that gives light sensor at the specific point in the mechanism in an embodiment of the present invention.

FIG. 17E is a conceptual diagram illustrating a thermal belt sensor mechanism that gives flexible plastic with copper embedded wiring at the specific point in the mechanism in an embodiment of the present invention.

Figure 18:
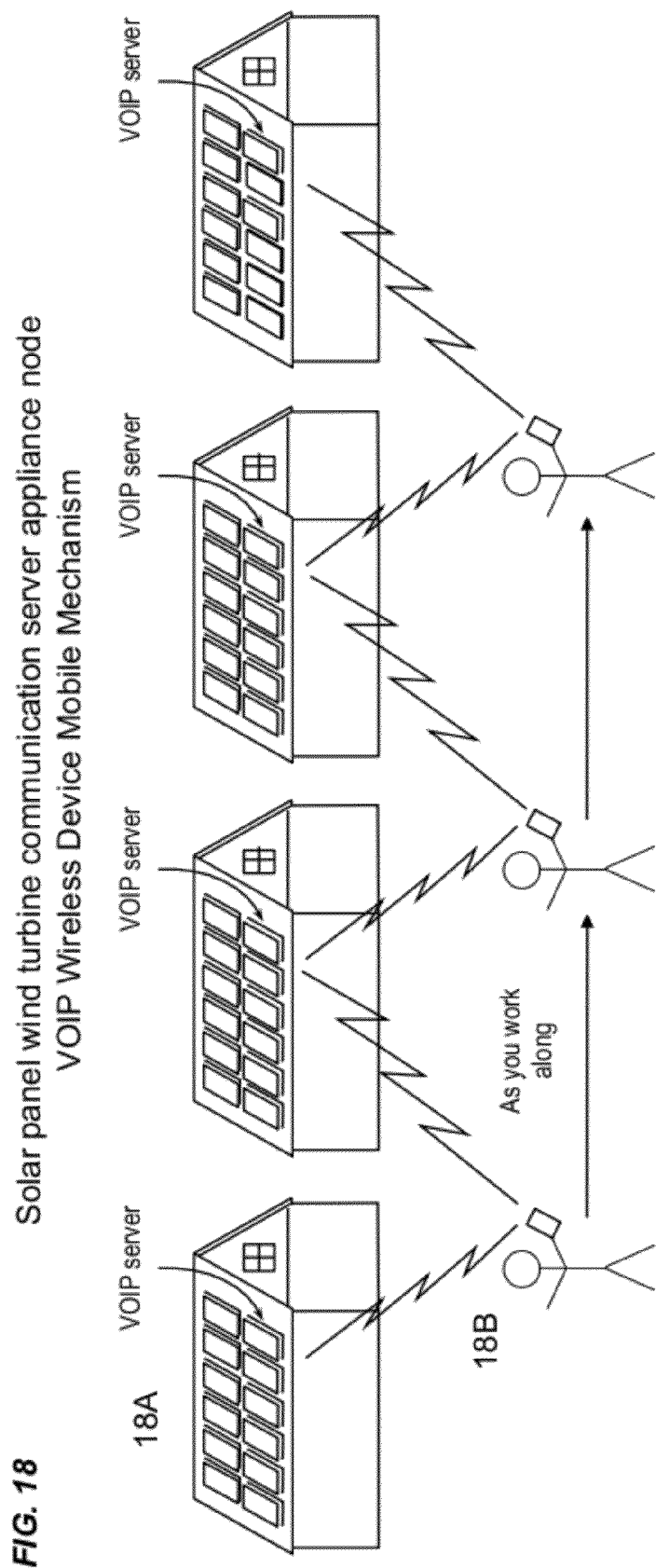

FIG. 18 is a conceptual diagram illustrating a method and mechanism for terrestrial based solar panel wind turbine communication server appliance node VOIP wireless device mobile cell phone mechanism in an embodiment of the present invention.

FIG. 18A is a conceptual diagram illustrating a method and mechanism for many clustered solar panel wind turbine communication server appliance nodes making a network of solar panel wind turbine communication server appliance node clusters each with a voice over internet protocol server for continuous wireless communication in a mobile device in embodiment of the present invention.

FIG. 18B is a conceptual diagram illustrating a method and mechanism for walking along near the solar panel wind turbine communication server appliance node clusters and connecting to the network continuously in embodiment of the present invention.

Figure 19:
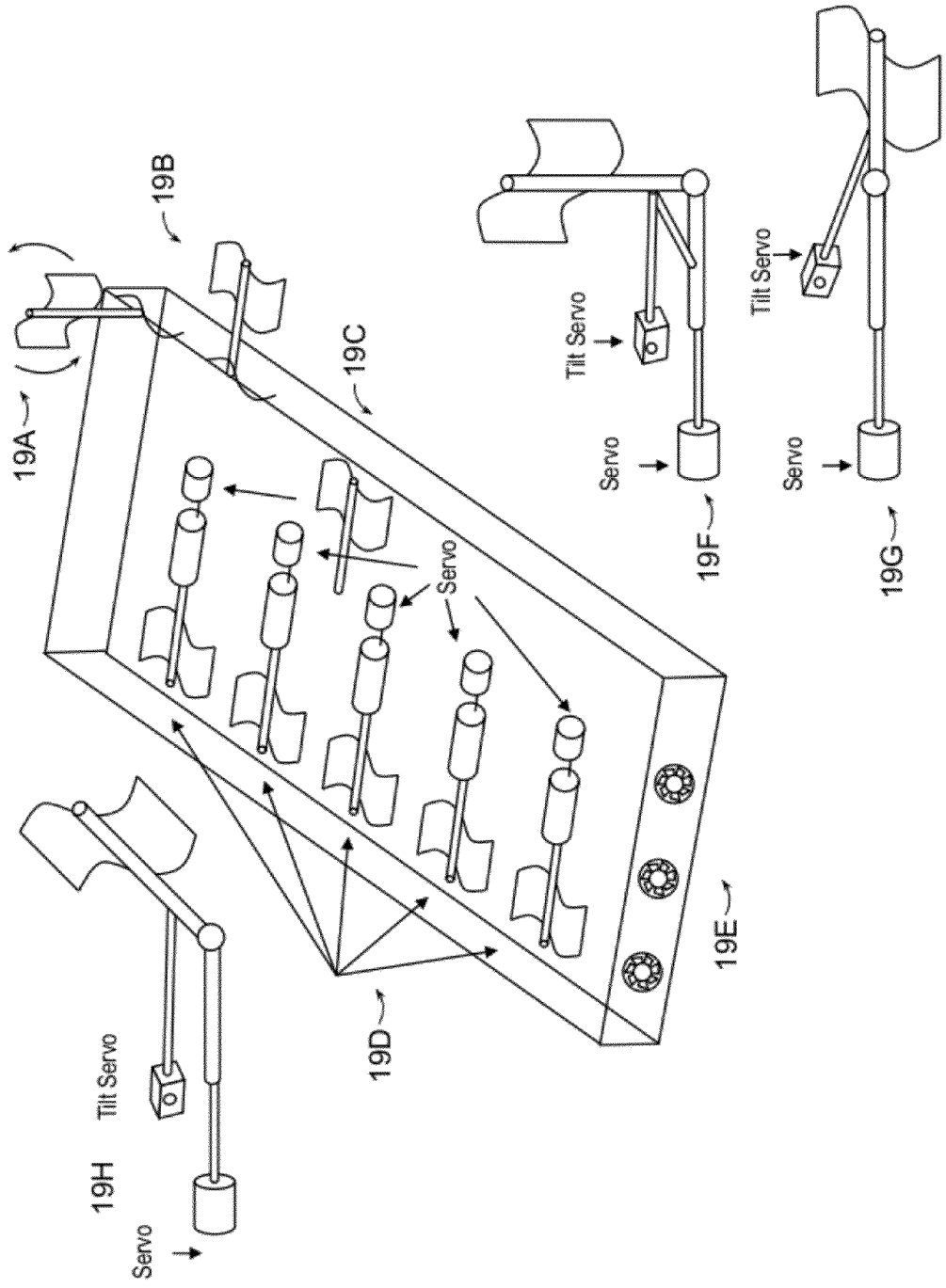

FIG. 19 is a conceptual diagram illustrating a method and mechanism for mini wind turbine terrestrial based solar panel wind turbine communication server appliance node retractable mechanism according to another embodiment of the present invention.

FIG. 19A is a conceptual diagram illustrating a method and mechanism for mini wind turbine in full use in another embodiment of the present invention.

Figure 20:
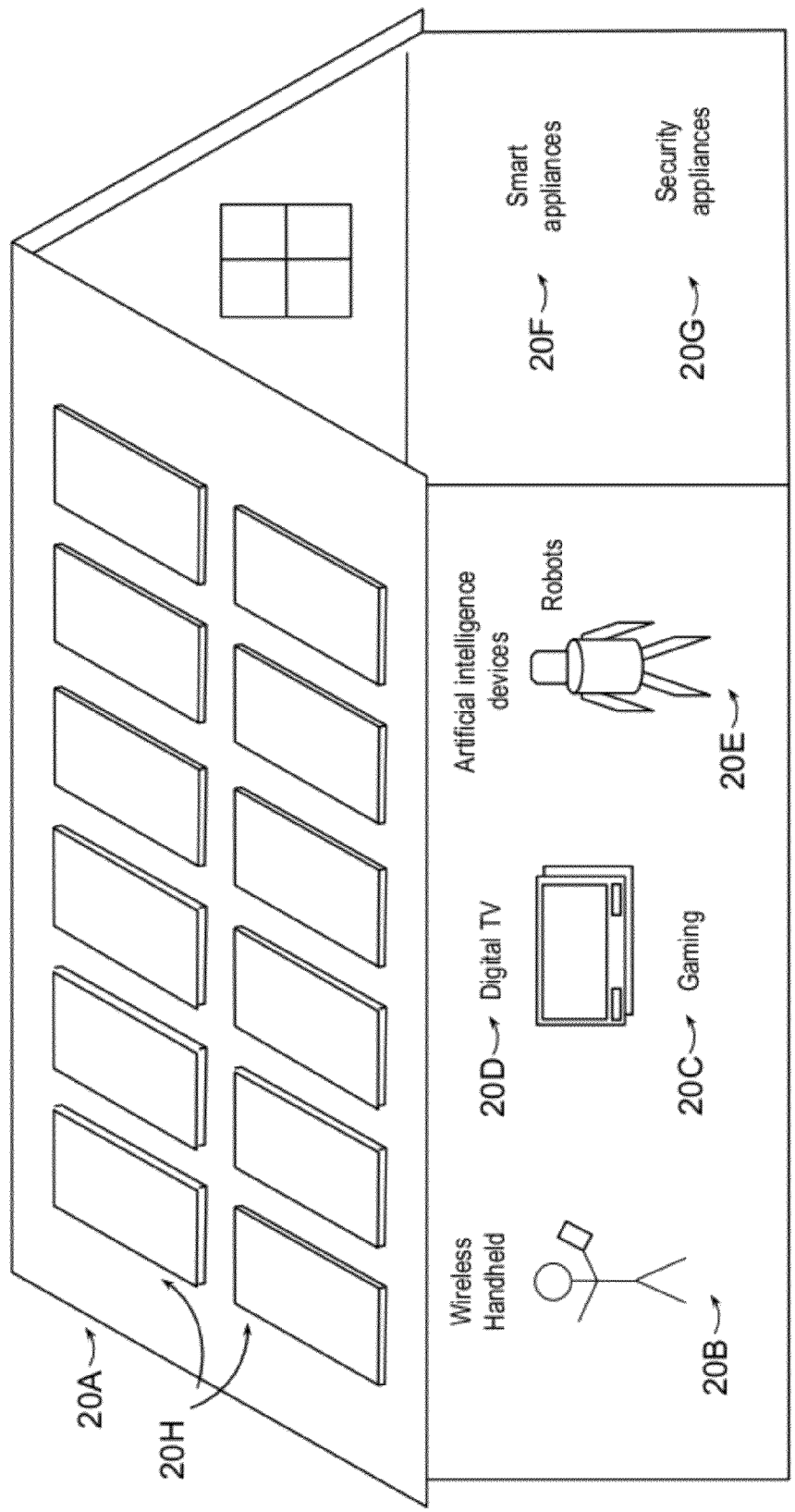

FIG. 19B is a conceptual diagram illustrating a method and mechanism for mini wind turbine in retracted mode due to rough weather in another embodiment of the present invention FIG. 19C is a conceptual diagram illustrating a method and mechanism for mini wind turbine in retracted into the solar panel wind turbine communication server appliance node unit for inclement weather protection in another embodiment of the present invention FIG. 19D is a conceptual diagram illustrating a method and mechanism for mini wind turbines fully retracted in another embodiment of the present invention FIG. 19E is a conceptual diagram illustrating a method and mechanism for mini wind turbines retracted with vents in another embodiment of the present invention FIG. 19F is a conceptual diagram illustrating a method and mechanism for mini wind turbine in use with tilt servo and generator retractor mechanism in another embodiment of the present invention FIG. 19G is a conceptual diagram illustrating a method and mechanism for mini wind turbine in retractor mode with servo retraction mode use in another embodiment of the present invention FIG. 19H is a conceptual diagram illustrating a method and mechanism for mini wind turbine in full use showing tilt mini wind turbines to decrease shadows on solar panels during different times of day in another embodiment of the present invention FIG. 20 is a conceptual diagram illustrating a method and mechanism for terrestrial based solar panel wind turbine communication server appliance node wireless or wired remote transfer of information to smart devices, robots, artificial intelligent agents mechanism in another embodiment of the present invention.

FIG. 20A is a conceptual diagram illustrating a method and mechanism for each solar panel wind turbine communication server appliance node is a server and can be used for parallel processing as a supercomputer cluster in the living and working space below plus remotely wirelessly or wired for use in entertainment or information use in another embodiment of the present invention.

FIG. 20B is a conceptual diagram illustrating a method and mechanism for each solar panel wind turbine communication server appliance node is a server and can be used for parallel processing as a supercomputer cluster in the living and working space below plus remotely wirelessly or wired for use in entertainment or information with wireless handheld devices in another embodiment of the present invention.

FIG. 20C is a conceptual diagram illustrating a method and mechanism for each solar panel wind turbine communication server appliance node is a server and can be used for parallel processing as a supercomputer cluster in the living and working space below plus remotely wirelessly or wired for use in entertainment or information gaming in another embodiment of the present invention.

FIG. 20D is a conceptual diagram illustrating a method and mechanism for each solar panel wind turbine communication server appliance node is a server and can be used for parallel processing as a supercomputer cluster in the living and working space below plus remotely wirelessly or wired for use in entertainment or information digital TV 3D or high definition TV in another embodiment of the present invention.

FIG. 20E is a conceptual diagram illustrating a method and mechanism for each solar panel wind turbine communication server appliance node is a server and can be used for parallel processing as a supercomputer cluster in the living and working space below plus remotely wirelessly or wired for use in entertainment or information artificial intelligence, robots in another embodiment of the present invention.

FIG. 20F is a conceptual diagram illustrating a method and mechanism for each solar panel wind turbine communication server appliance node is a server and can be used for parallel processing as a supercomputer cluster in the living and working space below plus remotely wirelessly or wired for use in entertainment or information smart appliances in another embodiment of the present invention.

FIG. 20G is a conceptual diagram illustrating a method and mechanism for each solar panel wind turbine communication server appliance node is a server and can be used for parallel processing as a supercomputer cluster in the living and working space below plus remotely wirelessly or wired for use in entertainment or information security appliances in another embodiment of the present invention.

FIG. 20H is a conceptual diagram illustrating a method and mechanism for each solar panel wind turbine communication server appliance node is a server and can be used for parallel processing as a supercomputer cluster in the living and working space below plus remotely wirelessly or wired for use in entertainment or information utilizing the supercomputer aspects of the solar panel wind turbine communication server appliance node cluster for research remotely in another embodiment of the present invention.

Figure 21:
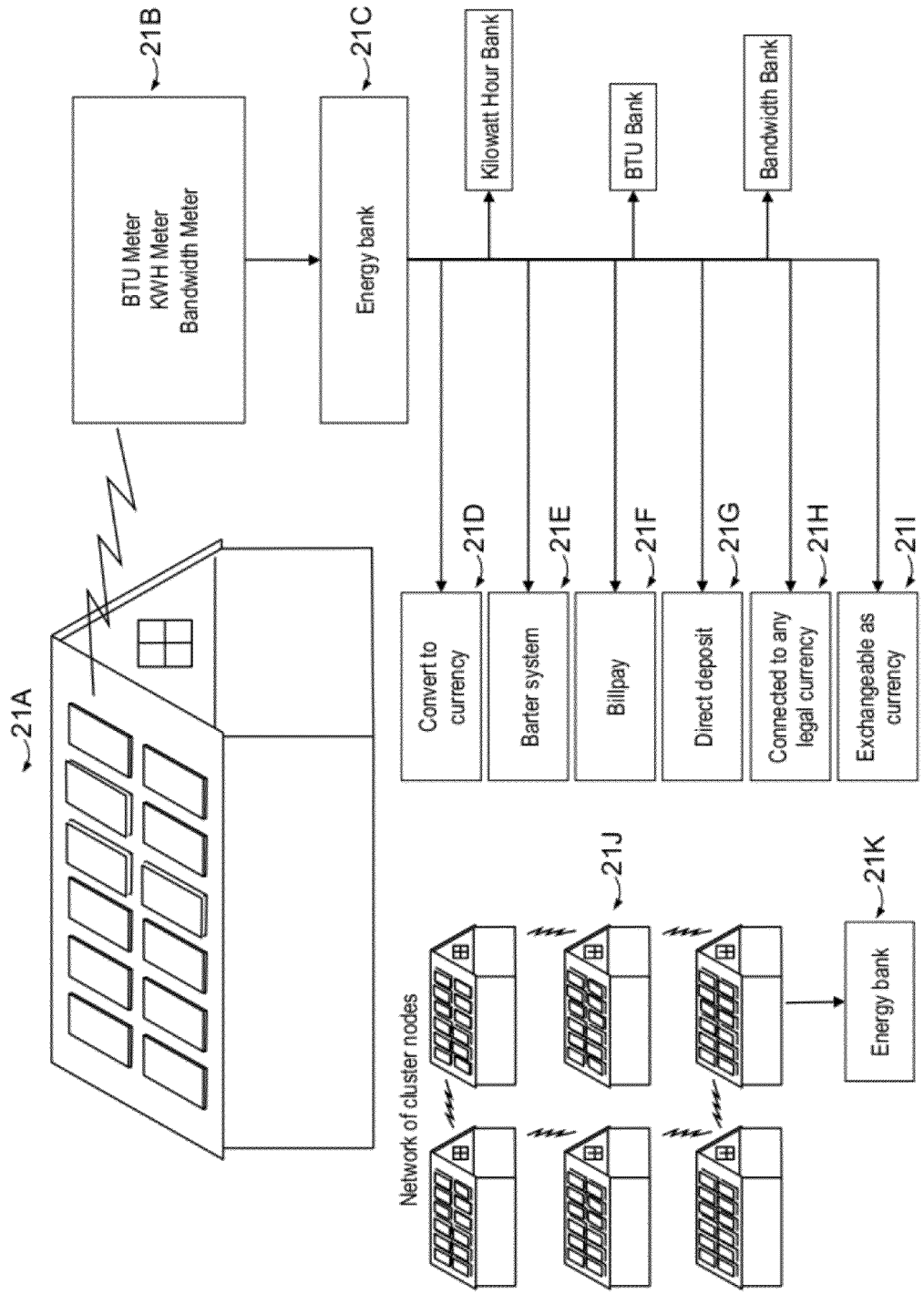

FIG. 21 is a illustration flow chart diagram of apparatus according to one embodiment of the present invention having a terrestrial based solar panel wind turbine communication server appliance node network energy bank method and mechanism.

FIG. 21A is a illustration flow chart diagram of apparatus according to one embodiment of the present invention having a cluster of solar panel wind turbine communication server appliance nodes mechanism connected to energy bank mechanism.

FIG. 21B is a illustration flow chart diagram of apparatus according to one embodiment of the present invention having a virtual metering BTU Meter, KILOWATT HOURS Meter, and Bandwidth Meter mechanism connected to energy bank mechanism.

FIG. 21C is a illustration flow chart diagram of apparatus according to one embodiment of the present invention having an energy bank method and mechanism.

FIG. 21D is a illustration flow chart diagram of apparatus according to one embodiment of the present invention having ability to convert to currencies connected to energy bank mechanism.

FIG. 21E is a illustration flow chart diagram of apparatus according to one embodiment of the present invention having ability to have a barter system connected to energy bank mechanism.

FIG. 21F is a illustration flow chart diagram of apparatus according to one embodiment of the present invention having a bill pay system connected to energy bank mechanism.

FIG. 21G is a illustration flow chart diagram of apparatus according to one embodiment of the present invention having a direct deposit system connected to energy bank mechanism.

FIG. 21H is a illustration flow chart diagram of apparatus according to one embodiment of the present invention having ability to connect and attach to any legal currency connected to energy bank mechanism.

FIG. 21I is a illustration flow chart diagram of apparatus according to one embodiment of the present invention having ability to be exchangeable as currency connected to energy bank mechanism.

FIG. 21J is a illustration flow chart diagram of apparatus according to one embodiment of the present invention having a network of solar server cluster nodes connected to energy bank mechanism.

FIG. 21K is a illustration flow chart diagram of apparatus according to one embodiment of the present invention having an energy bank mechanism.

Figure 22:
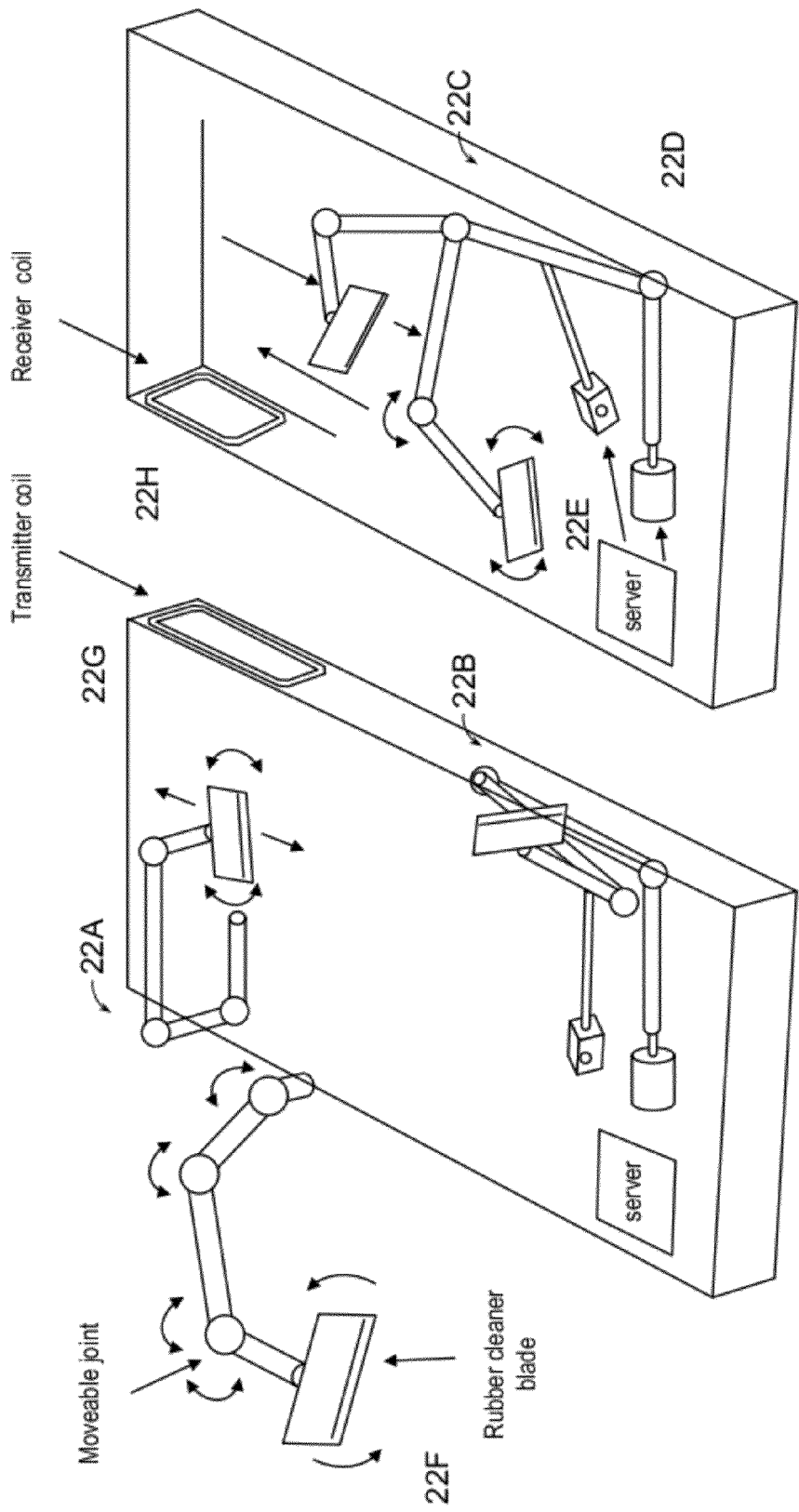

FIG. 22 is a conceptual diagram illustrating the terrestrial based solar panel wind turbine communication server appliance node retractable robotic cleaner mechanism.

FIG. 22A is a conceptual diagram illustrating flexible robotic cleaner arm that can rotate or go any direction to clear debris or heavy snow from surface of solar panel wind turbine communication server appliance node panel mechanism.

FIG. 22B is a conceptual diagram illustrating flexible robotic cleaner arm that can rotate or go any direction to clear debris or heavy snow from surface of solar panel wind turbine communication server appliance node panel in retracted mode mechanism.

FIG. 22C is a conceptual diagram illustrating flexible robotic cleaner arm that can rotate or go any direction to clear debris or heavy snow from surface of solar panel wind turbine communication server appliance node panel in use mechanism.

FIG. 22D is a conceptual diagram illustrating flexible robotic cleaner arm that can rotate or go any direction to clear debris or heavy snow from surface of solar panel wind turbine communication server appliance node panel connected to main server for control locally or wireless, remotely mechanism.

FIG. 22E is a conceptual diagram illustrating control for robotic arm through main server unit mechanism.

FIG. 22F is a conceptual diagram illustrating flexible robotic cleaner arm that can rotate or go any direction to clear debris or heavy snow from surface of solar panel wind turbine communication server appliance node panel with rubber cleaner scraper blade and all ways movable joint mechanism.

FIG. 22G is a conceptual diagram illustrating energy transmitter coil mechanism.

FIG. 22H is a conceptual diagram illustrating energy receiver coil mechanism.

Figure 23:
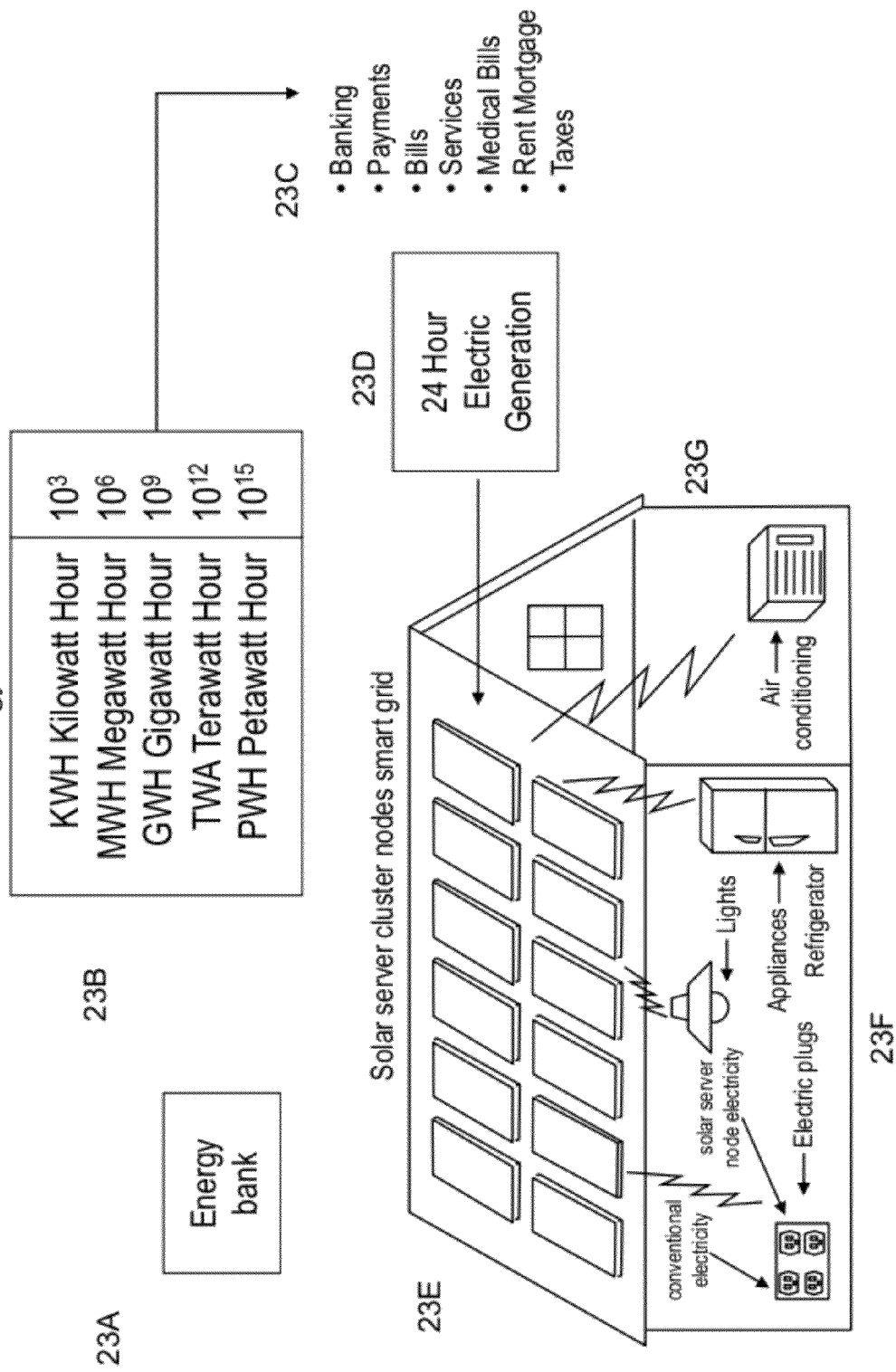

FIG. 23 is an flow chart and illustration view of terrestrial based solar panel wind turbine communication server appliance node cluster to energy bank method and mechanism.

FIG. 23A is an flow chart and illustration view of energy bank method and mechanism.

FIG. 23B is an flow chart and illustration view of measurement banks in KILOWATT HOURS, MWH, GWH, TWH, PWH meters mechanism.

FIG. 23C is an flow chart and illustration view of how one can do banking, payments, bills, services, medical bills, rent mortgages, taxes with the virtual bank mechanism.

FIG. 23D is an flow chart and illustration view of solar panel wind turbine communication server appliance nodes connected to the energy bank for automatic 24 hour electric generation and deposits mechanism.

FIG. 23E is an flow chart and illustration view of solar server cluster nodes smart grid mechanism.

FIG. 23F is an flow chart and illustration view of connected wirelessly to electric plugs, lights, appliances, air conditioning method and mechanism.

FIG. 23G is an flow chart and illustration view of where additional funds generated from selling energy back to the conventional grid and power companies mechanism.

Figure 24:
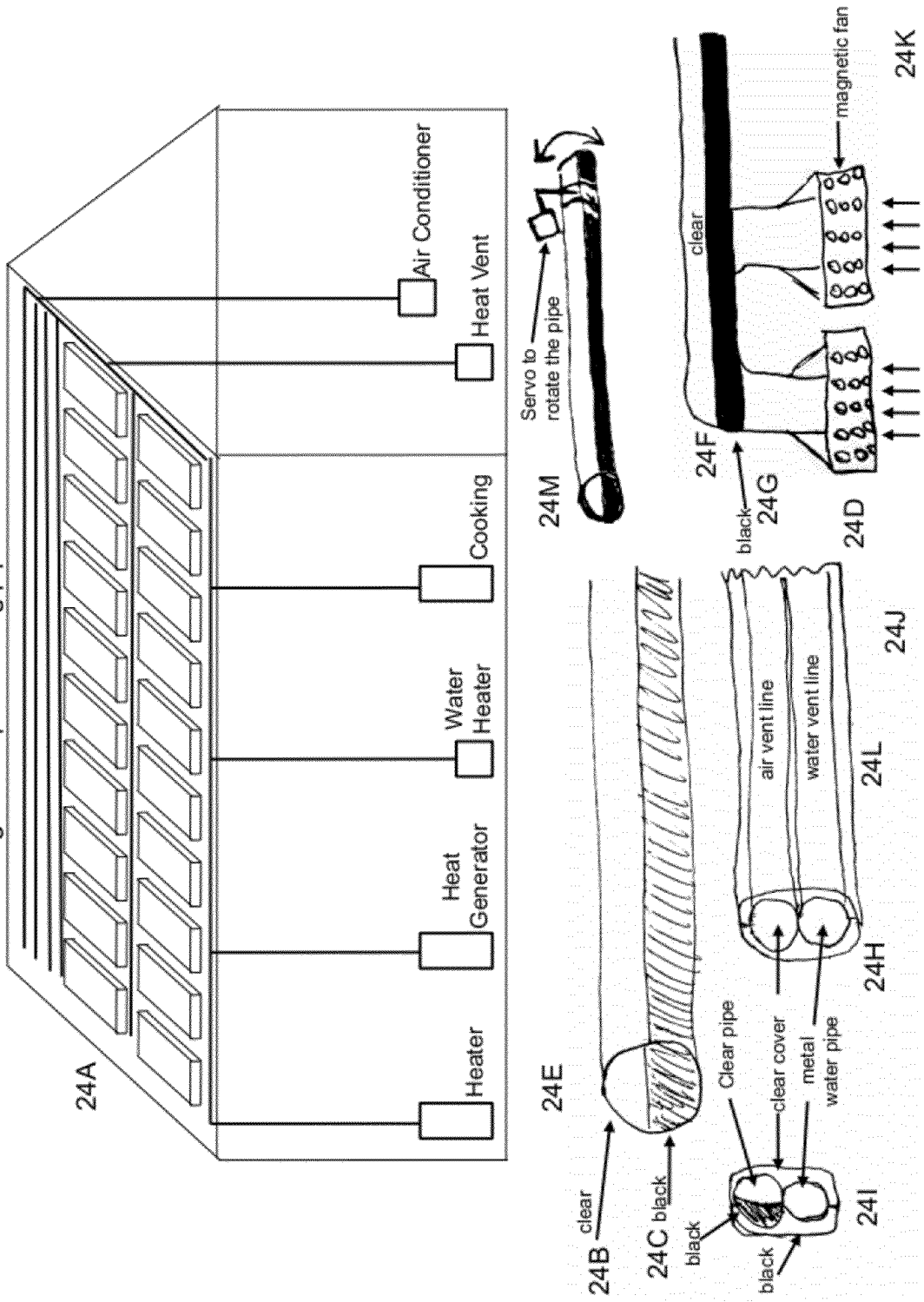

FIG. 24 is a cross sectional diagram, of the terrestrial based solar panel wind turbine communication server appliance node network cooling and super heating passive solar pipe apparatus according to an embodiment of the present invention.

FIG. 24A is a cross sectional diagram, shows the black base with clear top tubing for passive solar heat generation running through multiple connections to the solar panel wind turbine communication server appliance node cluster grid apparatus according to an embodiment of the present invention, the pipe lines to the different needs of the space below connected to the heater, heat generator, water heater, cooking, heat vent and air conditioner.

FIG. 24B is a cross sectional diagram, of the clear part of the tubing mechanism apparatus according to an embodiment of the present invention.

FIG. 24C is a cross sectional diagram, of the black heat absorption area of the tubing mechanism apparatus according to an embodiment of the present invention.

FIG. 24D is a cross sectional diagram, of the magnetic fans apparatus according to an embodiment of the present invention.

FIG. 24E is a cross sectional diagram, of the mechanism showing all piping rotation systems and magnetic vent fans are controlled by the main server with thermal sensor strip apparatus according to an embodiment of the present invention.

FIG. 24F is a cross sectional diagram, of the clear and black passive solar tubing apparatus according to an embodiment of the present invention having a FIG. 24G is a cross sectional diagram, of the clear black separation apparatus according to an embodiment of the present invention.

FIG. 24H is a cross sectional diagram, of the snap on clear container for the winter air vent piping and water line piping apparatus according to an embodiment of the present invention.

FIG. 24I is a cross sectional diagram, of the side view of piping apparatus where pipes can be rotated inside the winter heating black bottom container and clear winter cover, with air pipe and water pipe according to an embodiment of the present invention.

FIG. 24J is a cross sectional diagram, of where in the winter the mechanism can take heat to each room, and to the water heater for hot water and cooking apparatus according to an embodiment of the present invention.

FIG. 24K is a cross sectional diagram, of where in the summer can divert main heat to electric heat generator for electric air conditioning cooling and the rest to the water heater apparatus according to an embodiment of the present invention.

Figure 25:
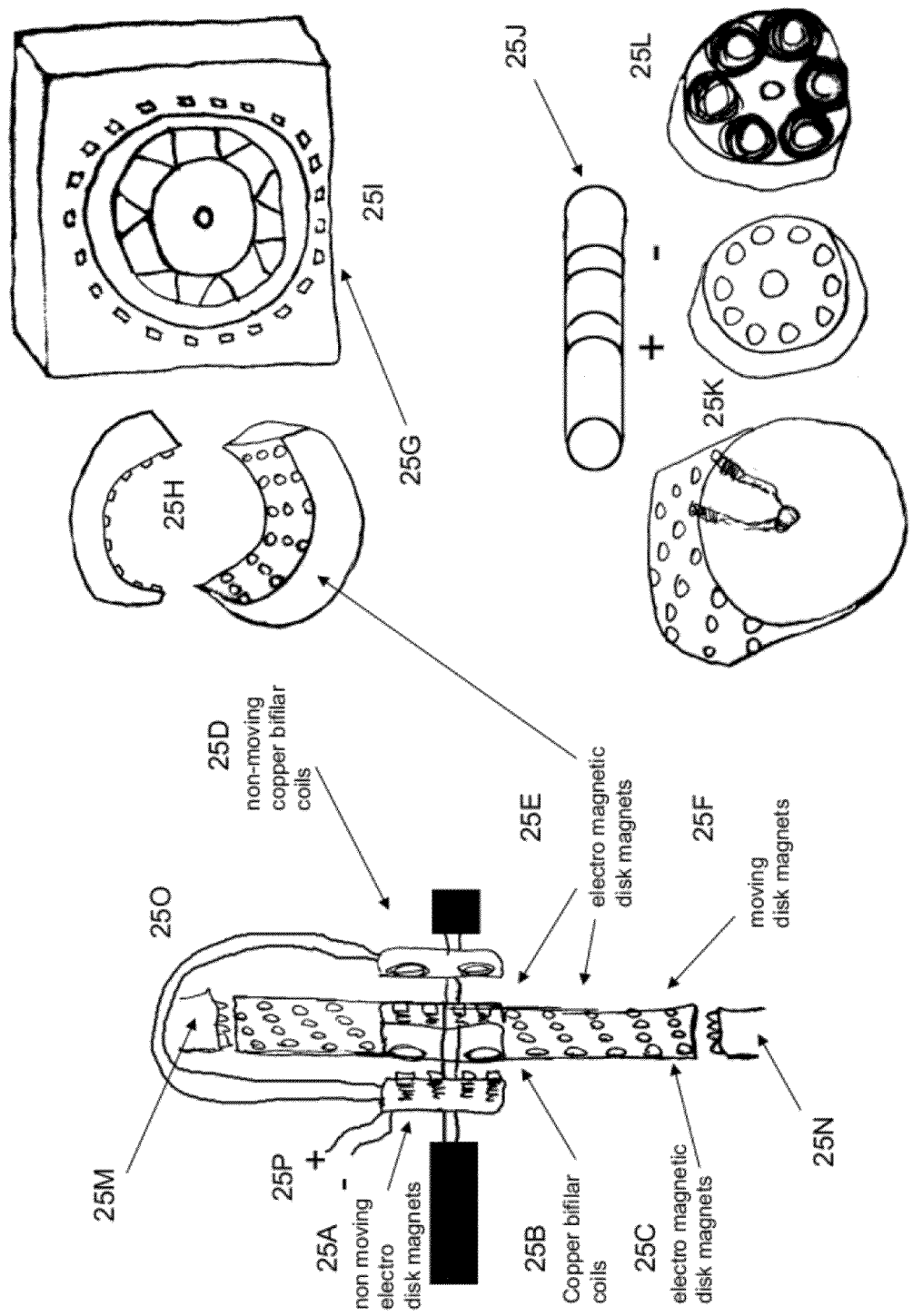

FIG. 24L is a cross sectional diagram, of where snap on cover for additional winter heat, snap off cover for lower heat needs in summer apparatus according to an embodiment of the present invention having a FIG. 24M is a cross sectional diagram, of where piping can actually turn from dark to clear for increased heat and turn from clear to dark for decreased heat with a servo that is controlled by the main server, for optimum heat dispersal at different points of the solar panel wind turbine communication server appliance node mechanism apparatus according to an embodiment of the present invention having a FIG. 25 describes the solar panel wind turbine communication server appliance node network cooling and super heating magnetic motor fan mechanism FIG. 25A is a cross sectional diagram, of the non moving electromagnetic mechanism.

FIG. 25B is a cross sectional diagram, of the copper bifilar coils apparatus.

FIG. 25C is a cross sectional diagram, of the electromagnetic disk magnets mechanism.

FIG. 25D is a cross sectional diagram, of the non moving copper bifilar coils apparatus.

FIG. 25E is a cross sectional diagram, of the electromagnetic disk magnets mechanism.

FIG. 25F is a cross sectional diagram, of the moving disk magnets mechanism.

FIG. 25G is a cross sectional diagram, of the fan housing for magnetic energy motor ventilator apparatus.

FIG. 25H is a cross sectional diagram, of the electromagnetic disk magnets clamp for motor starter mechanism.

FIG. 25I is a cross sectional diagram, of the front fan housing mechanism.

FIG. 25J is a cross sectional diagram, of the plus and minus contact for center rotor electromagnetic disk magnets electricity provided for the turning center disk magnets power supply.

FIG. 25K is a cross sectional diagram, of the center rotor electromagnetic disk wired connected to center rotor mechanism.

FIG. 25L is a cross sectional diagram, of the electromagnetic disk generator mechanism and the copper bifilar coils generator mechanism FIG. 25M is a cross sectional diagram, of the non moving disk magnets clamp starter mechanism.

FIG. 25N is a cross sectional diagram, of the non moving disk magnets clamp starter mechanism.

FIG. 25O is a cross sectional diagram, of the wiring plus and minus harness connected from generator bifilar coils to electromagnetic generator mechanism for power to the electro magnets.

FIG. 25P is a cross sectional diagram, of the extra electricity generated is sent to the grid, energy bank, or used by user.

Figure 26:
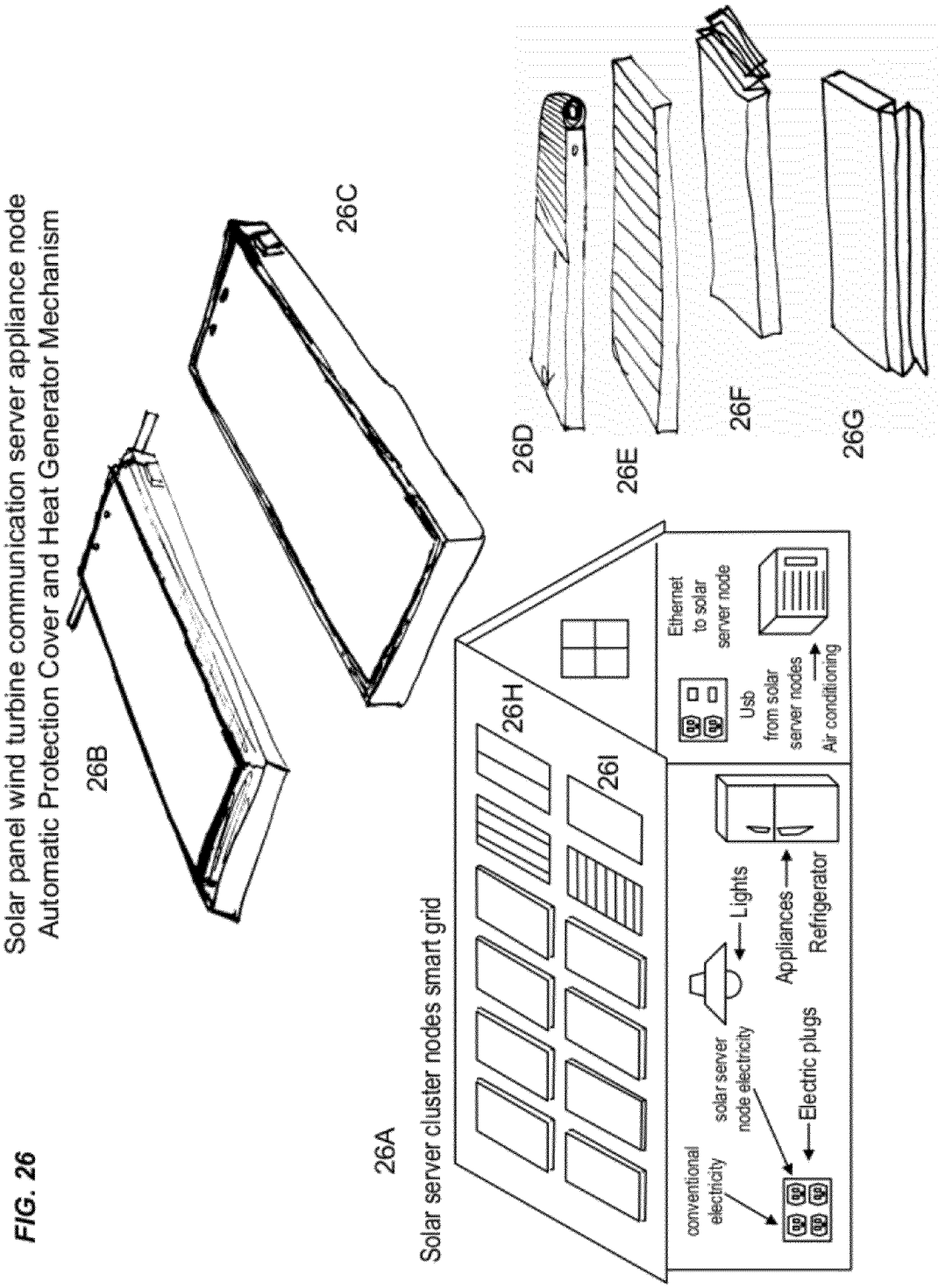

FIG. 26 is a conceptual diagram illustrating a method and mechanism for the solar panel wind turbine communication server appliance node automatic protection cover and heat generator mechanism.

FIG. 26A is a conceptual diagram illustrating a method and mechanism that describes the solar server cluster nodes smart grid with examples of the covering system on a house mechanism.

FIG. 26B is a conceptual diagram illustrating a method and mechanism that shows the inflated flexible side mechanism with the clear thick Plexiglas or glass top cover for creating heat or automatically protecting the surface of the solar panel or solar panel node mechanism.

FIG. 26C is a conceptual diagram illustrating a method and mechanism that shows the retracted mode with the glass or Plexiglas flat on the surface, and no air space between the clear materials.

FIG. 26D is a conceptual diagram illustrating a method and mechanism that shows thee roll top style cover mechanism.

FIG. 26E is a conceptual diagram illustrating a method and mechanism that shows the fully covered retractable style mechanism.

FIG. 26F is a conceptual diagram illustrating a method and mechanism that shows the cover retracted at top of solar panel or solar panel node mechanism.

FIG. 26G is a conceptual diagram illustrating a method and mechanism that shows the cover retracted at side of solar panel or solar panel node mechanism.

FIG. 26H is a conceptual diagram illustrating a method and mechanism that shows the embedded solar panel or node with a 2 panel cover sliding cover or 4 panel retracting cover mechanism.

FIG. 26I is a conceptual diagram illustrating a method and mechanism that shows the embedded solar panel retracting mechanism or permanently mounted inside roof and clear glass, or Plexiglas protective covering, built into a skylight as a standalone solar panel wind turbine communication server appliance node with a skylight mechanism.

Figure 27:
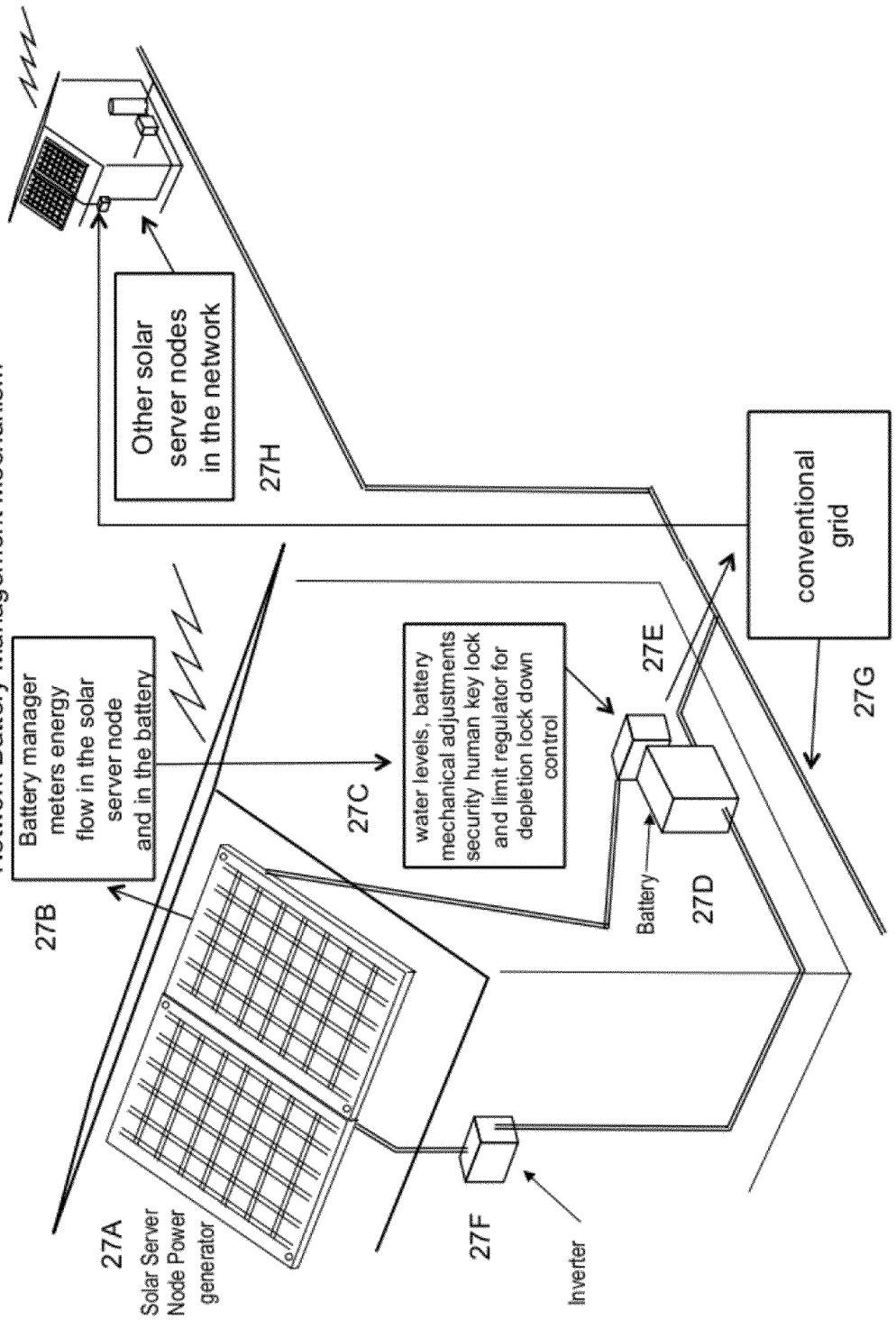

FIG. 27 is a conceptual diagram illustrating a method and mechanism that shows solar panel wind turbine communication server appliance node network battery management mechanism.

FIG. 27A is a conceptual diagram illustrating a method and mechanism that shows the solar panel wind turbine communication server appliance node power generator mechanism.

FIG. 27B is a conceptual diagram illustrating a method and mechanism that shows how Battery manager meters energy flow in the solar panel wind turbine communication server appliance node and in the battery mechanism.

FIG. 27C is a conceptual diagram illustrating a method and mechanism that shows apparatus that controls water levels, battery mechanical adjustments security human key lock and limit regulator for depletion lock down control mechanism.

FIG. 27D is a conceptual diagram illustrating a method and mechanism that shows the battery storage mechanism FIG. 27E is a conceptual diagram illustrating a method and mechanism that shows the flow of electricity to the grid.

FIG. 27F is a conceptual diagram illustrating a method and mechanism that shows the solar panel wind turbine communication server appliance node cluster inverter mechanism.

FIG. 27G is a conceptual diagram illustrating a method and mechanism that shows the conventional grid.

FIG. 27H is a conceptual diagram illustrating a method and mechanism that shows other solar panel wind turbine communication server appliance node clusters in the network that get shared electricity.

Figure 28:
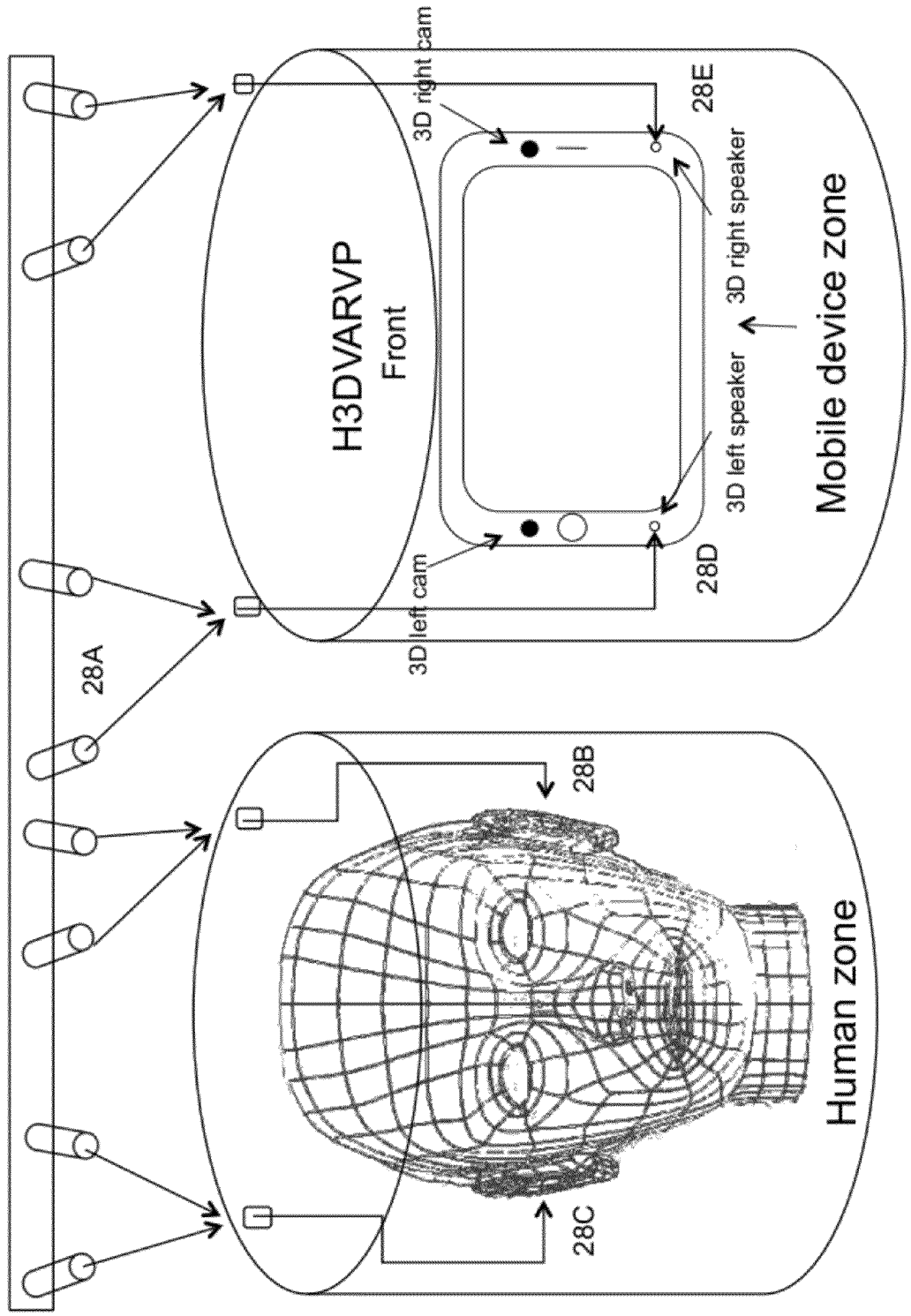

FIG. 28 is a conceptual diagram illustrating a method and mechanism that shows Solar panel wind turbine communication server appliance node audio to human ear and mobile receiver targeted zones mechanism.

FIG. 28A is a conceptual diagram illustrating a method and mechanism that shows the solar panel wind turbine communication server appliance node lasers for audio transmission to spatial point.

FIG. 28B is a conceptual diagram illustrating a method and mechanism that shows audio transmission to spatial point zone near left ear.

FIG. 28C is a conceptual diagram illustrating a method and mechanism that shows audio transmission spatial point zone near right ear.

FIG. 28D is a conceptual diagram illustrating a method and mechanism that shows audio transmission to spatial point zone near 3D left speaker of mobile phone.

FIG. 28E is a conceptual diagram illustrating a method and mechanism that shows audio transmission to spatial point zone near 3D right speaker of mobile phone.

Figure 29:
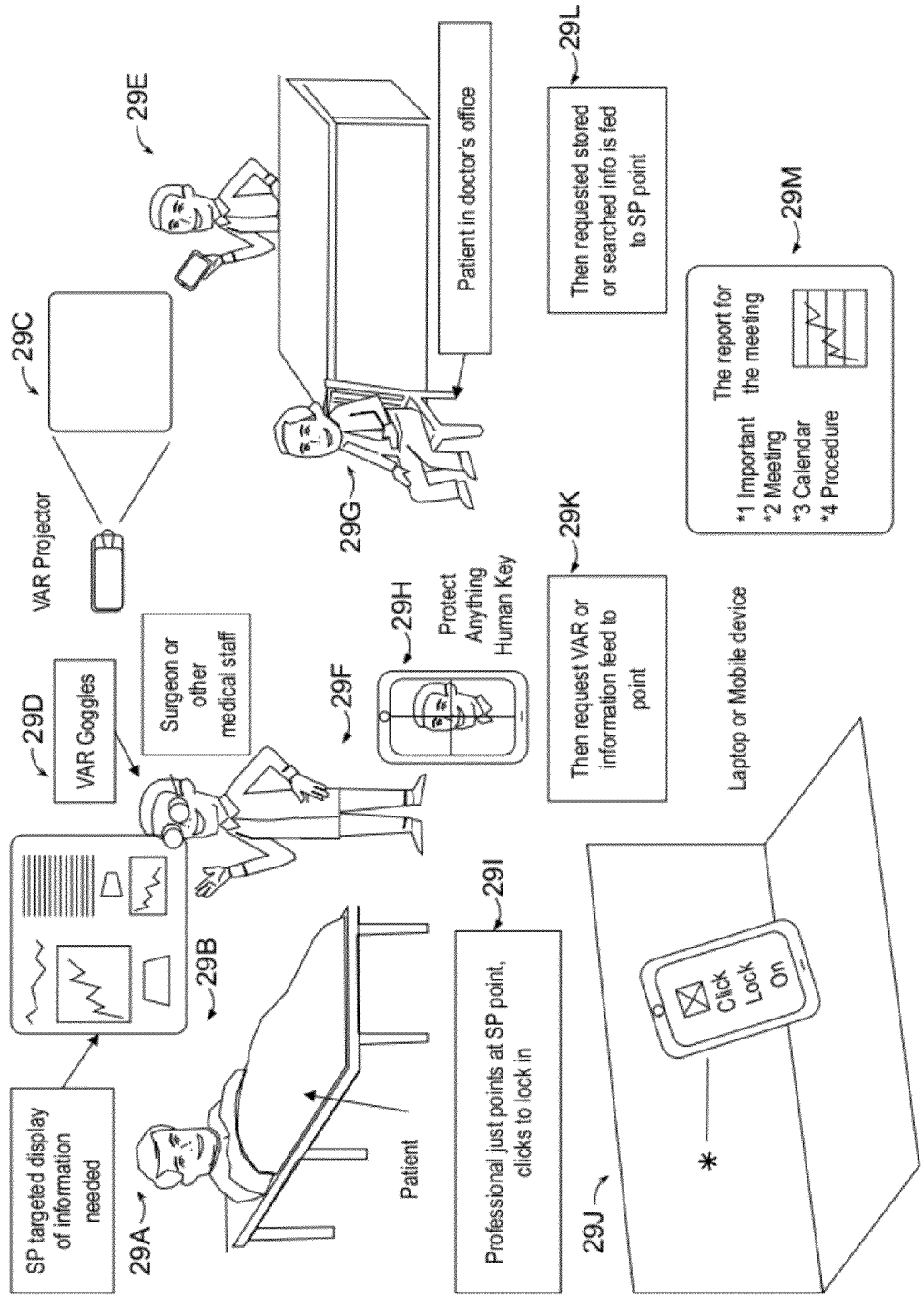

FIG. 29 is a conceptual diagram illustrating a method and mechanism that shows Solar panel wind turbine communication server appliance node network professional lawyer, accountant, institutional, medical SP point with Virtual Augmented reality display related to patients' records, surgical procedures, medical references.

FIG. 29A describes How Data is processed through Protect Anything Human Key and professional mechanism for lawyer, accountant, institutional, medical, SP target point with virtual augmented reality display related to patient records, surgical procedures, and medical references and shows patient laying on the bed.

FIG. 29B describes How Data is processed through Protect Anything Human Key and professional mechanism for lawyer, accountant, institutional, medical, SP target point with virtual augmented reality display related to patient records, surgical procedures, and medical references and shows SP targeted display of information needed with charts and text, images, video and surgeon or other medical staff with VAR goggles.

FIG. 29C describes How Data is processed through Protect Anything Human Key and professional mechanism for lawyer, accountant, institutional, medical, SP target point with virtual augmented reality display related to patient records, surgical procedures, and medical references and shows a VAR. Projector for a meeting.

FIG. 29D describes How Data is processed through Protect Anything Human Key and professional mechanism for lawyer, accountant, institutional, medical, SP target point with virtual augmented reality display related to patient records, surgical procedures, and medical references and shows in goggles you can have data broadcast to it for usability.

FIG. 29E describes How Data is processed through Protect Anything Human Key and professional mechanism for lawyer, accountant, institutional, medical, SP target point with virtual augmented reality display related to patient records, surgical procedures, and medical references and shows can interact with virtual augmented reality project or mobile image on screen in mobile device.

FIG. 29F describes How Data is processed through Protect Anything Human Key and professional mechanism for lawyer, accountant, institutional, medical, SP target point with virtual augmented reality display related to patient records, surgical procedures, and medical references and shows patient and doctors office looking at virtual augmented reality protection of charts.

FIG. 29G describes How Data is processed through Protect Anything Human Key and professional mechanism for lawyer, accountant, institutional, medical, SP target point with virtual augmented reality display related to patient records, surgical procedures, and medical references and shows where you have to use the Protect Anything Human Key identification system to be able to read your charts medical financial or whatever that way your charts and information goes with you wherever you go.

FIG. 29H describes How Data is processed through Protect Anything Human Key and professional mechanism for lawyer, accountant, institutional, medical, SP target point with virtual augmented reality display related to patient records, surgical procedures, and medical references and shows the professional chess points at any SP target point clicks to lock in target for display.

FIG. 29I describes How Data is processed through Protect Anything Human Key and professional mechanism for lawyer, accountant, institutional, medical, SP target point with virtual augmented reality display related to patient records, surgical procedures, and medical references and shows.

FIG. 29J describes How Data is processed through Protect Anything Human Key and professional mechanism for lawyer, accountant, institutional, medical, SP target point with virtual augmented reality display related to patient records, surgical procedures, and medical references and shows mobile device with can microphone and crosshairs you target then click lock on.

FIG. 29K describes How Data is processed through Protect Anything Human Key and professional mechanism for lawyer, accountant, institutional, medical, SP target point with virtual augmented reality display related to patient records, surgical procedures, and medical references and shows then request virtual augmented reality media for information feed or broadcast to that point.

FIG. 29L describes How Data is processed through Protect Anything Human Key and professional mechanism for lawyer, accountant, institutional, medical, SP target point with virtual augmented reality display related to patient records, surgical procedures, and medical references and shows than the requested stored or searched information is fed or broadcast to SP target point.

FIG. 29M describes How Data is processed through Protect Anything Human Key and professional mechanism for lawyer, accountant, institutional, medical, SP target point with virtual augmented reality display related to patient records, surgical procedures, and medical references and shows the media being viewed.

Figure 30:
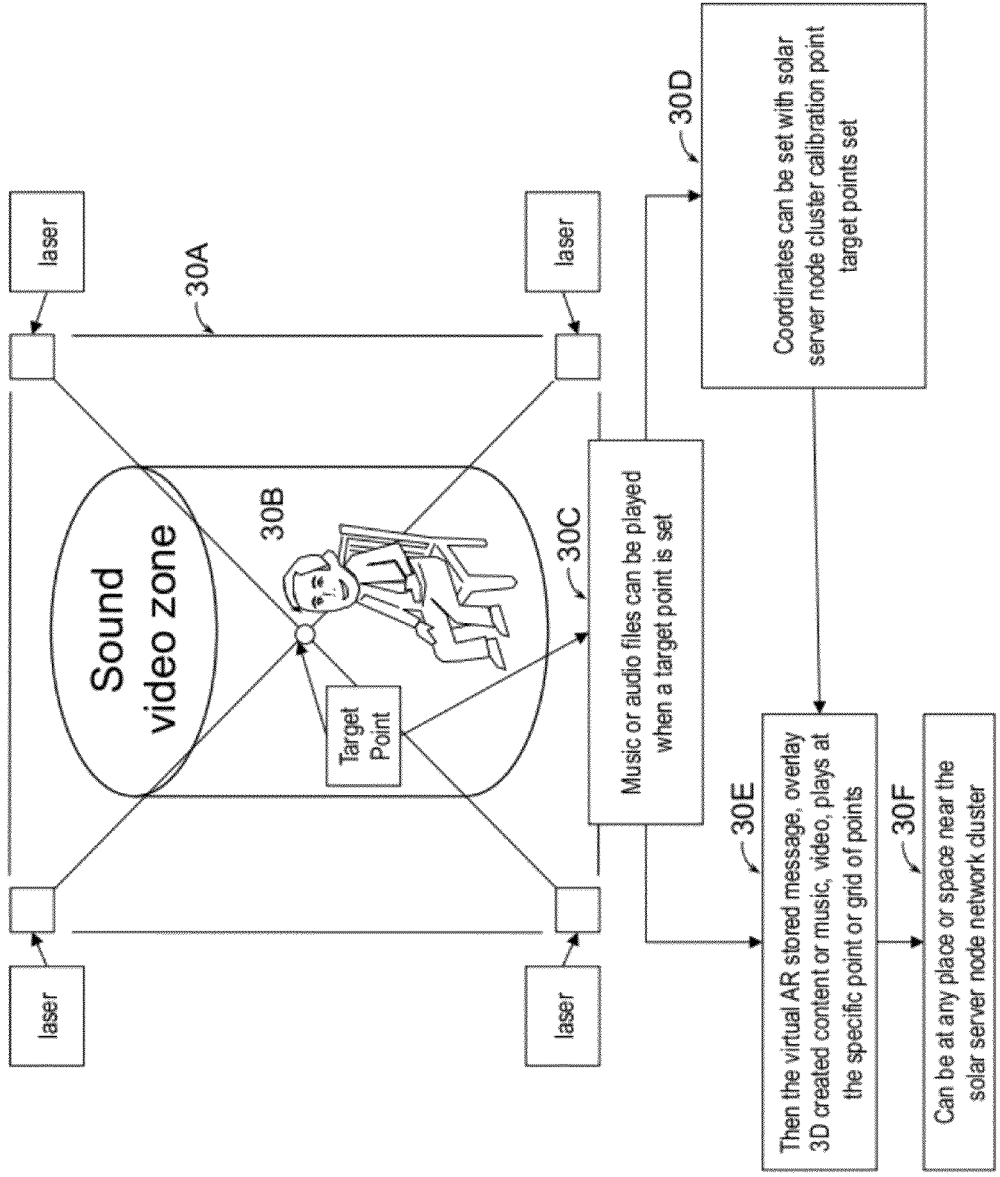

FIG. 30 is a conceptual diagram illustrating a method and mechanism that shows Solar panel wind turbine communication server appliance node network infrared laser light waves transformed to audio sound waves at spatial point target zone FIG. 30A is a conceptual diagram illustrating a method and mechanism that shows Infrared laser connected to the solar panel wind turbine communication server appliance node network.

FIG. 30B is a conceptual diagram illustrating a method and mechanism that shows sound video zone point target with person hearing and viewing video.

FIG. 30C is a conceptual diagram illustrating a method and mechanism that shows where music or audio files can be played when a target point is set.

FIG. 30D is a conceptual diagram illustrating a method and mechanism that shows where coordinates can be set with solar panel wind turbine communication server appliance node cluster calibration point target points set.

FIG. 30E is a conceptual diagram illustrating a method and mechanism that shows where Then the virtual AR stored message, overlay 3D created content or music, video, plays at the specific point or grid of points.

FIG. 30F is a conceptual diagram illustrating a method and mechanism that shows where can be at any place or space near the solar panel wind turbine communication server appliance node network cluster.

Figure 31:
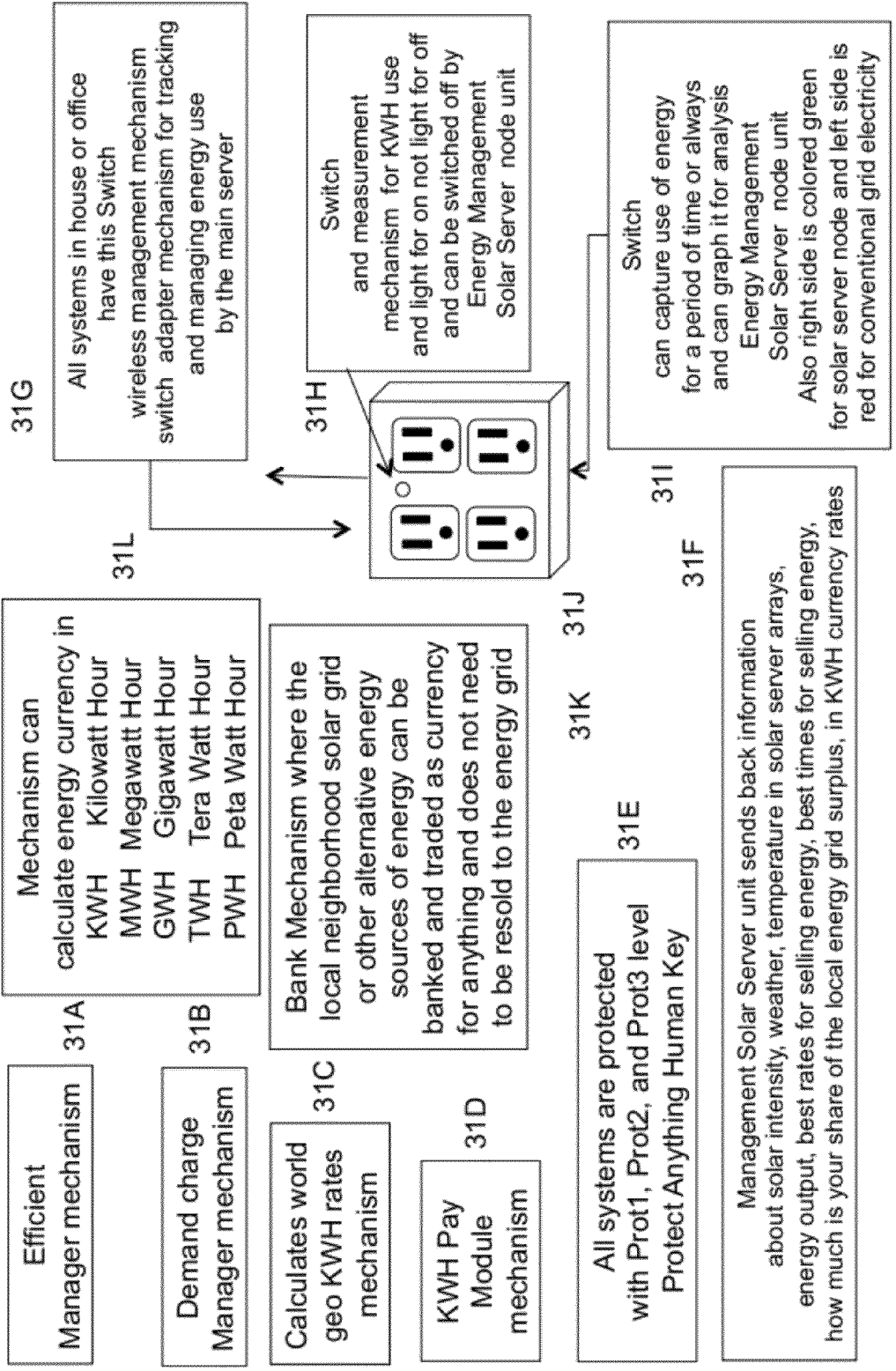

FIG. 31 describes Kilowatt Hour Bank payment system mechanism, with Protect Anything Human Key Identification Mechanism and the Kilowatt Hour mechanism pricing comparison.

FIG. 31A describes Kilowatt Hour Bank payment system mechanism, with Protect Anything Human Key Identification Mechanism and the Solar panel wind turbine communication server appliance node network Kilowatt Hour pricing comparison to product registry mechanism and shows the Solar panel wind turbine communication server appliance node network energy Efficient Manager mechanism.

FIG. 31B describes Kilowatt Hour Bank payment system mechanism, with Protect Anything Human Key Identification Mechanism and the Solar panel wind turbine communication server appliance node network Kilowatt Hour pricing comparison to product registry mechanism and shows the Demand charge Manager Mechanism.

FIG. 31C describes Kilowatt Hour Bank payment system mechanism, with Protect Anything Human Key Identification Mechanism and the Solar panel wind turbine communication server appliance node network Kilowatt Hour pricing comparison to product registry mechanism and shows the Calculates world geo KILOWATT HOURS rates mechanism.

FIG. 31D describes Kilowatt Hour Bank payment system mechanism, with Protect Anything Human Key Identification Mechanism and the Solar panel wind turbine communication server appliance node network Kilowatt Hour pricing comparison to product registry mechanism and shows the KILOWATT HOURS Pay Module mechanism.

FIG. 31E describes Kilowatt Hour Bank payment system mechanism, with Protect Anything Human Key Identification Mechanism and the Solar panel wind turbine communication server appliance node network Kilowatt Hour pricing comparison to product registry mechanism and shows that all energy systems are protected with Prot1, Prot2, and Prot3 level Protect Anything Human Key.

FIG. 31F describes Kilowatt Hour Bank payment system mechanism, with Protect Anything Human Key Identification Mechanism and the Solar panel wind turbine communication server appliance node network Kilowatt Hour pricing comparison to product registry mechanism and shows the Solar panel wind turbine communication server appliance node network energy Management Solar Server unit sends back information about solar intensity, weather, temperature in solar server arrays, energy output, best rates for selling energy, best times for selling energy, how much is your share of the local energy grid surplus, in KILOWATT HOURS currency rates.

FIG. 31G describes Kilowatt Hour Bank payment system mechanism, with Protect Anything Human Key Identification Mechanism and the Solar panel wind turbine communication server appliance node network Kilowatt Hour pricing comparison to product registry mechanism and shows that All systems in house or office have the Solar panel wind turbine communication server appliance node network wireless management switch adapter mechanism for tracking and managing energy use by the main Solar panel wind turbine communication server appliance node network energy server.

FIG. 31H describes Kilowatt Hour Bank payment system mechanism, with Protect Anything Human Key Identification Mechanism and the Solar panel wind turbine communication server appliance node network Kilowatt Hour pricing comparison to product registry mechanism and shows the Solar panel wind turbine communication server appliance node network energy Switch adapter and measurement mechanism for KILOWATT HOURS use and light for on not light for off and can be switched off by Solar panel wind turbine communication server appliance node network Energy Management Solar Server unit.

FIG. 31I describes Kilowatt Hour Bank payment system mechanism, with Protect Anything Human Key Identification Mechanism and the Solar panel wind turbine communication server appliance node network Kilowatt Hour pricing comparison to product registry mechanism and shows the Solar panel wind turbine communication server appliance node network energy Switch adapter can capture use of energy for a period of time or always and can graph it for analysis Solar panel wind turbine communication server appliance node network Energy Management Solar Server unit.

FIG. 31J describes Kilowatt Hour Bank payment system mechanism, with Protect Anything Human Key Identification Mechanism and the Solar panel wind turbine communication server appliance node network Kilowatt Hour pricing comparison to product registry mechanism and shows the Solar panel wind turbine communication server appliance node network energy Switch adapter.

FIG. 31K describes Kilowatt Hour Bank payment system mechanism, with Protect Anything Human Key Identification Mechanism and the Solar panel wind turbine communication server appliance node network Kilowatt Hour pricing comparison to product registry mechanism and shows the Solar panel wind turbine communication server appliance node network energy Bank Mechanism where the local neighborhood solar grid energy or other alternative energy sources of energy can be banked and traded as currency for anything and does not need to be resold to the energy grid.

FIG. 31L describes Kilowatt Hour Bank payment system mechanism, with Protect Anything Human Key Identification Mechanism and the Solar panel wind turbine communication server appliance node network Kilowatt Hour pricing comparison to product registry mechanism and shows where energy in the Solar panel wind turbine communication server appliance node network energy system can calculate energy currency in KILOWATT HOURS Kilowatt Hour, or larger amounts for industry like MWH Megawatt Hour, GWH Gig watt Hour, TWH Tera Watt Hour, PWH Peta Watt Hour.

FIG. 32 describes H3DVARVP Protect Anything Human Key Identification Mechanism.

FIG. 32A describes left audio input into H3DVARVP.
FIG. 32B describes right audio input into H3DVARVP.
FIG. 32C describes left video input into H3DVARVP.
FIG. 32D describes right video input into H3DVARVP.
FIG. 32E describes H3DVARVP built into mobile device for recording video.

FIG. 33 describes H3DVARVP mechanism with Protect Anything Human Key Identification Mechanism, and Virtual Augmented Reality Data Mechanism.

FIG. 33A describes H3DVARV mechanism with Protect Anything Human Key Identification Mechanism, and Solar panel wind turbine communication server appliance node network Virtual Augmented Reality Data Mechanism and shows the Protect Anything Human Key Server.

FIG. 33B describes H3DVARV mechanism with Protect Anything Human Key Identification Mechanism, and Solar panel wind turbine communication server appliance node network Virtual Augmented Reality Data Mechanism and shows where the Protect Anything Human Key Server Calculates and analyzes from 6 files coming from H3DVARV Mechanism and gives positive or negative identity of people and objects.

FIG. 33C describes H3DVARV mechanism with Protect Anything Human Key Identification Mechanism, and Solar panel wind turbine communication server appliance node network Virtual Augmented Reality Data Mechanism and shows the Solar panel wind turbine communication server appliance node network Server takes the 6 files from the H3DVARV mechanism and assembles virtual augment reality 3D video audio and 3D content.

FIG. 33D describes H3DVARV mechanism with Protect Anything Human Key Identification Mechanism, and Solar panel wind turbine communication server appliance node network Virtual Augmented Reality Data Mechanism and shows the Left video file from the H3DVARV mechanism for analysis, 3D VAR creation, or 3D video creation.

FIG. 33E describes H3DVARV mechanism with Protect Anything Human Key Identification Mechanism, and Solar panel wind turbine communication server appliance node network Virtual Augmented Reality Data Mechanism and shows the Right video file from the H3DVARV mechanism for analysis 3D VAR creation, or 3D video creation.

FIG. 33F describes H3DVARV mechanism with Protect Anything Human Key Identification Mechanism, and Solar panel wind turbine communication server appliance node network Virtual Augmented Reality Data Mechanism and shows the Left audio file from the H3DVARV mechanism for analysis 3D VAR creation, or 3D video creation.

FIG. 33G describes H3DVARV mechanism with Protect Anything Human Key Identification Mechanism, and Solar panel wind turbine communication server appliance node network Virtual Augmented Reality Data Mechanism and shows the Right audio file from the H3DVARV mechanism for analysis 3D VAR creation, or 3D video creation.

FIG. 33H describes H3DVARV mechanism with Protect Anything Human Key Identification Mechanism, and Solar panel wind turbine communication server appliance node network Virtual Augmented Reality Data Mechanism and shows the Left audio plus video file combined at the Solar panel wind turbine communication server appliance node network or Protect Anything server for analysis, 3D VAR creation, or 3D video creation.

FIG. 33I describes H3DVARV mechanism with Protect Anything Human Key Identification Mechanism, and Solar panel wind turbine communication server appliance node network Virtual Augmented Reality Data Mechanism and shows the Right audio plus video file combined at the Solar panel wind turbine communication server appliance node network or Protect Anything server for analysis, 3D VAR creation, or 3D video creation.

FIG. 34 describes Protect Anything Human Key 3D Human Video Audio Stereo Viewing and Recording Internal Mechanism.

FIG. 34A describes Solar panel wind turbine communication server appliance node network Protect Anything H3DVARV 3D Human Video Audio Stereo Viewing and Recording Internal Mechanism and shows where a person looks into the lenses to view from the LCD display screen the left and right 3D view point in the H3DVARV mechanism for viewing and recording.

FIG. 34B describes Solar panel wind turbine communication server appliance node network Protect Anything H3DVARV 3D Human Video Audio Stereo Viewing and Recording Internal Mechanism and shows the 2 3D Viewer Lens.

FIG. 34C describes Solar panel wind turbine communication server appliance node network Protect Anything H3DVARV 3D Human Video Audio Stereo Viewing and Recording Internal Mechanism and shows the 2 LCD Displays Left and right.

FIG. 34D describes Solar panel wind turbine communication server appliance node network Protect Anything H3DVARV 3D Human Video Audio Stereo Viewing and Recording Internal Mechanism and shows the world view from the H3DVARV device mechanism.

FIG. 34E describes Solar panel wind turbine communication server appliance node network Protect Anything H3DVARV 3D Human Video Audio Stereo Viewing and Recording Internal Mechanism and shows the 2 3D Cams (D) that can be broadcast to the (C) LCD display screen with the viewing lens for viewing.

FIG. 34F describes Solar panel wind turbine communication server appliance node network Protect Anything H3DVARV 3D Human Video Audio Stereo Viewing and Recording Internal Mechanism and shows the 3D VAR overlaid on (D) that can be broadcast to the (C) LCD display screen with the viewing lens for viewing.

FIG. 34G describes Solar panel wind turbine communication server appliance node network Protect Anything H3DVARV 3D Human Video Audio Stereo Viewing and Recording Internal Mechanism and shows the Solar panel wind turbine communication server appliance node network that can be broadcast to the (C) LCD display screen with the viewing lens for viewing.

FIG. 34H describes Solar panel wind turbine communication server appliance node network Protect Anything H3DVARV 3D Human Video Audio Stereo Viewing and Recording Internal Mechanism and shows the 3D files that can be broadcast to the (C) LCD display screen with the viewing lens for viewing.

FIG. 34I describes Solar panel wind turbine communication server appliance node network Protect Anything H3DVARV 3D Human Video Audio Stereo Viewing and Recording Internal Mechanism and shows the right mike that is 3D stereo.

FIG. 34J describes Solar panel wind turbine communication server appliance node network Protect Anything H3DVARV 3D Human Video Audio Stereo Viewing and Recording Internal Mechanism and shows the left mike that is 3D stereo.

FIG. 34K describes Solar panel wind turbine communication server appliance node network Protect Anything H3DVARV 3D Human Video Audio Stereo Viewing and Recording Internal Mechanism and shows the right mike that is 3D stereo being stored in file 1 and a left mike that is 3D stereo being stored in file 2.

FIG. 34L describes Solar panel wind turbine communication server appliance node network Protect Anything H3DVARV 3D Human Video Audio Stereo Viewing and Recording Internal Mechanism and shows the right mike that is 3D stereo, being stored in file 1, and a left mike that is 3D stereo, being stored in file 2, and both files being utilized for Protect Anything or Solar panel wind turbine communication server appliance node network secure server processing or live distribution.

FIG. 34M describes solar panel wind turbine communication server appliance node network Protect Anything H3DVARV 3D Human Video Audio Stereo Viewing and Recording Internal Mechanism and shows where the aggregated audio from the 3D stereo microphones is streamed to Protect Anything or Solar panel wind turbine communication server appliance node network secure servers for processing or live distribution.

FIG. 35 describes Protect Anything Human Key 3D Human Video Audio Stereo Viewing and Recording Independent Mechanism.

FIG. 35A describes Solar panel wind turbine communication server appliance node network Protect Anything H3DVARV 3D Human Video Audio Stereo Viewing and Recording Independent Mechanism and shows the world is 3D video recorded and streamed to Protect Anything Human Key server for sign up or sign in or to Solar panel wind turbine communication server appliance node network for 3D Video creation or 3D internal creation a front view of a mobile device display screen with H3DVARV 3D left cam and 3D right cam and H3DVARV 3D left right split screen.

FIG. 35B describes Solar panel wind turbine communication server appliance node network Protect Anything H3DVARV 3D Human Video Audio Stereo Viewing and Recording Independent Mechanism and shows the Front 3D Cam Side Independent Camera.

FIG. 35C describes Solar panel wind turbine communication server appliance node network Protect Anything H3DVARV 3D Human Video Audio Stereo Viewing and Recording Independent Mechanism and shows the USB cable for connecting to devices or can be used with wireless connection to mobile devices, computers and laptops.

FIG. 35D describes Solar panel wind turbine communication server appliance node network Protect Anything H3DVARV 3D Human Video Audio Stereo Viewing and Recording Independent Mechanism and shows the movable adjustable independent viewer lenses left right up down.

FIG. 35E describes Solar panel wind turbine communication server appliance node network Protect Anything H3DVARV 3D Human Video Audio Stereo Viewing and Recording Independent Mechanism and shows the USB connector.

FIG. 35F describes Solar panel wind turbine communication server appliance node network Protect Anything H3DVARV 3D Human Video Audio Stereo Viewing and Recording Independent Mechanism and shows the Back 3D Viewer Side Independent Camera.

FIG. 35G describes Solar panel wind turbine communication server appliance node network Protect Anything H3DVARV 3D Human Video Audio Stereo Viewing and Recording Independent Mechanism and shows 3D offline earphone Left.

FIG. 35H describes Solar panel wind turbine communication server appliance node network Protect Anything H3DVARV 3D Human Video Audio Stereo Viewing and Recording Independent Mechanism and shows 3D offline earphone Right.

FIG. 35I describes Solar panel wind turbine communication server appliance node network Protect Anything H3DVARV 3D Human Video Audio Stereo Viewing and Recording Independent Mechanism and shows the 3D offline viewer right.

FIG. 35J describes Solar panel wind turbine communication server appliance node network Protect Anything H3DVARV 3D Human Video Audio Stereo Viewing and Recording Independent Mechanism and shows the 3D offline earphone right.

FIG. 35K describes Solar panel wind turbine communication server appliance node network Protect Anything H3DVARV 3D Human Video Audio Stereo Viewing and Recording Independent Mechanism and shows the 3D offline microphone Right.

FIG. 35L describes Solar panel wind turbine communication server appliance node network Protect Anything H3DVARV 3D Human Video Audio Stereo Viewing and Recording Independent Mechanism and shows 3D offline microphone Left.

FIG. 35M describes Solar panel wind turbine communication server appliance node network Protect Anything H3DVARV 3D Human Video Audio Stereo Viewing and Recording Independent Mechanism and shows the 3D right cam.

FIG. 35N describes Solar panel wind turbine communication server appliance node network Protect Anything H3DVARV 3D Human Video Audio Stereo Viewing and Recording Independent Mechanism and shows the 3D left cam lenses adjustable or static.

FIG. 35O describes Solar panel wind turbine communication server appliance node network Protect Anything H3DVARV 3D Human Video Audio Stereo Viewing and Recording Independent Mechanism and shows how the mechanism includes the independent H3DVARV device that can be goggles, are titanium light weight glasses for viewing and recording 3D video and 3D audio.

FIG. 35P describes Solar panel wind turbine communication server appliance node network Protect Anything H3DVARV 3D Human Video Audio Stereo Viewing and Recording Independent Mechanism and shows the 3D independent viewer.

FIG. 35Q describes Solar panel wind turbine communication server appliance node network Protect Anything H3DVARV 3D Human Video Audio Stereo Viewing and Recording Independent Mechanism and shows the 3D independent viewer.

FIG. 36 describes Protect Anything Human Key 3D Human Video Audio Stereo Viewing and Recording Mechanism.

FIG. 36A describes Solar panel wind turbine communication server appliance node network Protect Anything H3DVARV 3D Human Video Audio Stereo Viewing and Recording Mechanism and shows the world is 3D video recorded and streamed to Protect Anything Human Key server for sign up or sign in or to Solar panel wind turbine communication server appliance node network for 3D Video creation or 3D internal creation a front view of a mobile device display screen with H3DVARV 3D left cam and 3D right cam and H3DVARV 3D left right split screen.

FIG. 36B describes Solar panel wind turbine communication server appliance node network Protect Anything H3DVARV 3D Human Video Audio Stereo Viewing and Recording Mechanism and shows a mobile phone or device with H3DVARV viewing lenses to view through mechanism.

FIG. 36C describes Solar panel wind turbine communication server appliance node network Protect Anything H3DVARV 3D Human Video Audio Stereo Viewing and Recording Mechanism and shows a laptop with Protect Anything Human Key sign in registration utilizing the H3DVARV 3D Viewing recording mechanism.

FIG. 36D describes Solar panel wind turbine communication server appliance node network Protect Anything H3DVARV 3D Human Video Audio Stereo Viewing and Recording Mechanism and shows the back of a laptop or display for viewing through the H3DVARV mechanism with the 3D viewer right mechanism.

FIG. 36E describes Solar panel wind turbine communication server appliance node network Protect Anything H3DVARV 3D Human Video Audio Stereo Viewing and Recording Mechanism and shows the laptop configured with the H3DVARV mechanism for viewing and recording video audio.

FIG. 36F describes Solar panel wind turbine communication server appliance node network Protect Anything H3DVARV 3D Human Video Audio Stereo Viewing and Recording Mechanism and shows the front laptop display with the H3DVARV mechanism for 3D cams and 3D stereo microphones for recording.

FIG. 36G describes Solar panel wind turbine communication server appliance node network Protect Anything H3DVARV 3D Human Video Audio Stereo Viewing and Recording Mechanism and shows the 3D left cam adjustable or static.

FIG. 36H describes Solar panel wind turbine communication server appliance node network Protect Anything H3DVARV 3D Human Video Audio Stereo Viewing and Recording Mechanism and shows the 3D stereo speaker right.

FIG. 36I describes Solar panel wind turbine communication server appliance node network Protect Anything H3DVARV 3D Human Video Audio Stereo Viewing and Recording Mechanism and shows the 3D right cam.

FIG. 36J describes Solar panel wind turbine communication server appliance node network Protect Anything H3DVARV 3D Human Video Audio Stereo Viewing and Recording Mechanism and shows the 3D stereo microphone right.

FIG. 36K describes Solar panel wind turbine communication server appliance node network Protect Anything H3DVARV 3D Human Video Audio Stereo Viewing and Recording Mechanism and shows FIG. 36L describes Solar panel wind turbine communication server appliance node network Protect Anything H3DVARV 3D Human Video Audio Stereo Viewing and Recording Mechanism and shows the 3D stereo speaker right.

FIG. 36M describes Solar panel wind turbine communication server appliance node network Protect Anything H3DVARV 3D Human Video Audio Stereo Viewing and Recording Mechanism and shows the 3D stereo headphone jack right.

FIG. 36N describes Solar panel wind turbine communication server appliance node network Protect Anything H3DVARV 3D Human Video Audio Stereo Viewing and Recording Mechanism and shows the 3D stereo headphone jack left.

FIG. 36O describes Solar panel wind turbine communication server appliance node network Protect Anything H3DVARV 3D Human Video Audio Stereo Viewing and Recording Mechanism and shows the Adjustable viewer lenses left right up down.

FIG. 36P describes Solar panel wind turbine communication server appliance node network Protect Anything H3DVARV 3D Human Video Audio Stereo Viewing and Recording Mechanism and shows the Adjustable 3D viewer left lens.

FIG. 36Q describes Solar panel wind turbine communication server appliance node network Protect Anything H3DVARV 3D Human Video Audio Stereo Viewing and Recording Mechanism and shows the 3D viewer right lens.

FIG. 37 is a conceptual diagram illustrating a method and mechanism that shows solar panel wind turbine communication server appliance node retractable wind turbine generator mechanism.

FIG. 37A is a conceptual diagram illustrating a method and mechanism that shows solar panel wind turbine communication server appliance node mechanism.

FIG. 37B is a conceptual diagram illustrating a method and mechanism that shows stator copper wired coils generator mechanism.

FIG. 37C is a conceptual diagram illustrating a method and mechanism that shows the electromagnetic or non electromagnetic magnet unit rotor generator mechanism.

FIG. 37D is a conceptual diagram illustrating a method and mechanism that shows the multiple generators encased in the wind turbine shaft.

FIG. 37E is a conceptual diagram illustrating a method and mechanism that shows the top magnetic rotor for the generator mechanism.

FIG. 37F is a conceptual diagram illustrating a method and mechanism that shows the middle stator coils mechanism of the generator mechanism.

FIG. 37G is a conceptual diagram illustrating a method and mechanism that shows the bottom magnetic rotor for the generator mechanism.

FIG. 37H is a conceptual diagram illustrating a method and mechanism that shows the wind vane mechanism that folds into ball or oval egg shape for storage, and opens for use and spinning the magnetic rotors in the wind turbine.

FIG. 37I is a conceptual diagram illustrating a method and mechanism that shows the thermal cooling area, and wiring collar area for wires to go into the main solar panel wind turbine communication server appliance node mechanism box.

FIG. 37J is a conceptual diagram illustrating a method and mechanism that shows the servo for raising and lowering the wind vanes connected to the gears on the wind vane assembly.

FIG. 37K is a conceptual diagram illustrating a method and mechanism that shows the control server that links to sensing information for decisions about opening or closing the wind vane assembly for protection and wind generation of electricity in the mechanism.

FIG. 37L is a conceptual diagram illustrating a method and mechanism that shows the input area that is waterproof and sealed for the connector to the wind turbine generator mechanism.

FIG. 38 is a conceptual diagram illustrating a method and mechanism that shows solar panel wind turbine communication server appliance node retractable wind turbine generator mechanism.

FIG. 38A is a conceptual diagram illustrating a method and mechanism that shows closed retracted and stored wind turbine vane blades in a ball or egg shape reducing wind resistance.

FIG. 38B is a conceptual diagram illustrating a method and mechanism that shows wind vanes open for electricity generation.

FIG. 38C is a conceptual diagram illustrating a method and mechanism that shows the generator housing shaft mechanism where the multiple generator disks are protected from dust and moisture in the mechanism.

FIG. 38D is a conceptual diagram illustrating a method and mechanism that shows retracted wind turbine vane blades in storage protected position attached on the mechanism.

Figure 39:
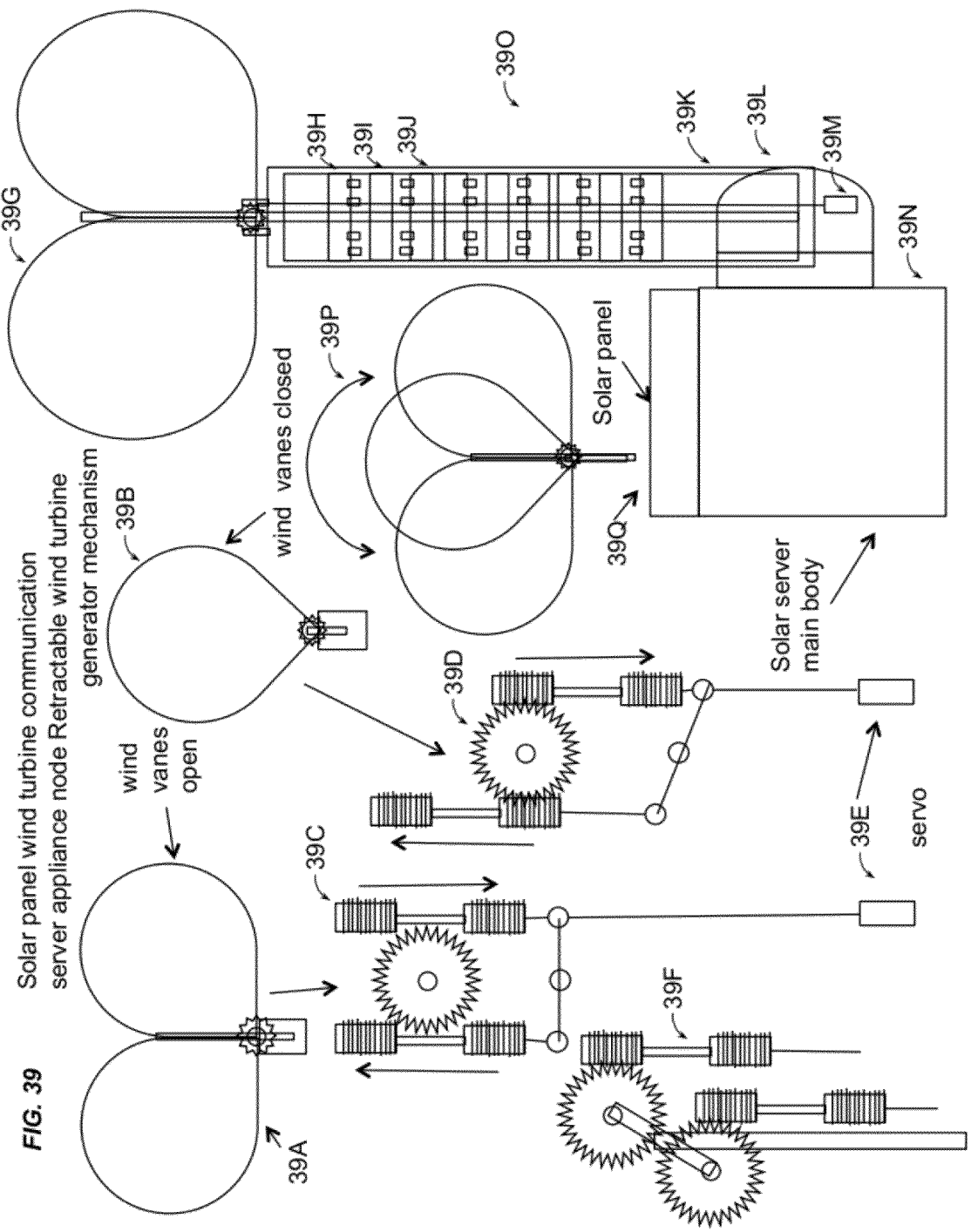

FIG. 39 is a conceptual diagram illustrating a method and mechanism that shows solar panel wind turbine communication server appliance node retractable wind turbine generator mechanism.

FIG. 39A is a conceptual diagram illustrating a method and mechanism that shows the wind turbine generator mechanism wind vanes open mechanism.

FIG. 39B is a conceptual diagram illustrating a method and mechanism that shows wind turbine generator mechanism wind vanes closed mechanism.

FIG. 39C is a conceptual diagram illustrating a method and mechanism that shows the gear movement mechanism for the opening of the wind vanes in the wind turbine generator mechanism utilizing the servo managed by the solar main server manager.

FIG. 39D is a conceptual diagram illustrating a method and mechanism that shows the gear movement mechanism for the closing of the wind vanes in the wind turbine generator mechanism utilizing the servo managed by the solar main server manager.

FIG. 39E is a conceptual diagram illustrating a method and mechanism that shows the servo that controls the opening and closing of the wind vanes.

FIG. 39F is a conceptual diagram illustrating a method and mechanism that shows the shaft connected to the gear system of the wind vane with the gear system that creates non friction use mode.

FIG. 39G is a conceptual diagram illustrating a method and mechanism that shows wind vanes in generation mode.

FIG. 39H is a conceptual diagram illustrating a method and mechanism that shows magnetic top rotors of the wind turbine.

FIG. 39I is a conceptual diagram illustrating a method and mechanism that shows magnetic coils stator middle rotors of the wind turbine.

FIG. 39J is a conceptual diagram illustrating a method and mechanism that shows magnetic bottom rotors of the wind turbine.

FIG. 39K is a conceptual diagram illustrating a method and mechanism that shows the air thermal sensing area and ventilation cooling area of the wind turbine main housing shaft.

FIG. 39L is a conceptual diagram illustrating a method and mechanism that shows the connector area connected to the solar panel wind turbine communication server appliance node mechanism.

FIG. 39M is a conceptual diagram illustrating a method and mechanism that shows servo for closing and opening wind vane.

FIG. 39N is a conceptual diagram illustrating a method and mechanism that shows the solar server main body where the lowering and raising servo is located for lowering and raising the wind vane mechanism.

FIG. 39O is a conceptual diagram illustrating a method and mechanism that shows the wind vane turbine shaft and mechanism.

FIG. 39P is a conceptual diagram illustrating a method and mechanism that shows where the wind vanes retract to an egg shape or ball shape for wind or other protection of the wind vane system and mechanism.

FIG. 39Q is a conceptual diagram illustrating a method and mechanism that shows the solar panel of the solar panel wind turbine communication server appliance node mechanism.

The invention claimed is:

1. A solar panel and wind turbine hybrid apparatus in combination with a computer server, comprising in combination one or more solar panels and one or more wind turbines for generating electrical energy;

a computer server connected to the solar panels and wind turbines for the purpose of creating, processing, serving, managing, storing, maximizing, and monetizing the electrical generation;

an appliance providing voice over internet protocol (VOIP) cell connection connected to the computer server connected to the solar panels and wind turbines;

the appliance is accessed using a human key identification for authentication and protecting access to the computer server connected to the solar panels and wind turbines;

an hour metering and banking manager connected to the solar panels and wind turbines;

a battery metering and manager server;

a cooling system manager;

a thermal sensor;

servers controlling management for use with conventional power and communication grid or independently off the conventional power and communication grid;

a cooling and heating apparatus that is connected to solar heaters and generators for energy creation and water and space heating and cooling;

a solar transparent material wiper for clearing a solar arrays surface from obstructions;

a solar panel protection cover and heat generator which can automatically retract;

the cover provides side or top or bottom or underneath storage;

an infrared top or bottom solar panel for nighttime or non-optimal solar light energy generation when the cover is utilized or stored; and the infrared top or bottom solar panel is mounted on top of a solar panel.

2. The apparatus of claim 1, wherein the infrared top or bottom solar panel is automatically inflated to create passive solar heat which is piped or ducted into a cooling system line.

3. The apparatus of claim 1, wherein the infrared top or bottom solar panel can retract or be permanently mounted within a roof with a sliding infrared solar panel cover for night time and inclement weather energy generation.

4. A solar panel and wind turbine hybrid apparatus in combination with a computer server, comprising in combination one or more solar panels and one or more wind turbines for generating electrical energy;

a computer server connected to the solar panels and wind turbines for the purpose of creating, processing, serving, managing, storing, maximizing, and monetizing the electrical generation;

an appliance providing voice over internet protocol (VOIP) cell connection connected to the computer server connected to the solar panels and wind turbines;

the appliance is accessed using a human key identification for authentication and protecting access to the computer server connected to the solar panels and wind turbines;

an hour metering and banking manager connected to the solar panels and wind turbines;

a battery metering and manager server;

a cooling system manager;

a thermal sensor;

servers controlling management for use with conventional power and communication grid or independently off the conventional power and communication grid;

a cooling and heating apparatus that is connected to solar heaters and generators for energy creation and water and space heating and cooling;

a solar transparent material wiper for clearing a solar arrays surface from obstructions;

a solar panel protection cover and heat generator which can automatically retract;

the cover provides side or top or bottom or underneath storage;

a solar panel built into a skylight creating electricity, collecting light for lighting the space below, and passive heating apparatus; and a lighting, energy, and heating measurements and control apparatus built into a solar panel wind turbine communication server appliance node.

5. The apparatus of claim 4, wherein the skylight is mounted into the roof, side, or surface of a building;

the skylight includes an inflatable flexible sided cushion with a top plastic or glass surface that automatically inflates with an air pump; and the skylight is retractable for non-heating accumulation and protection of the one or more solar panels.

6. A solar panel and wind turbine hybrid apparatus in combination with a computer server, comprising in combination one or more solar panels and one or more wind turbines for generating electrical energy;

a computer server connected to the solar panels and wind turbines for the purpose of creating, processing, serving, managing, storing, maximizing, and monetizing the electrical generation;

an appliance providing voice over internet protocol (VOIP) cell connection connected to the computer server connected to the solar panels and wind turbines;

the appliance is accessed using a human key identification for authentication and protecting access to the computer server connected to the solar panels and wind turbines;

an hour metering and banking manager connected to the solar panels and wind turbines;

a battery metering and manager server;

a cooling system manager;

a thermal sensor;

servers controlling management for use with conventional power and communication grid or independently off the conventional power and communication grid;

a cooling and heating apparatus that is connected to solar heaters and generators for energy creation and water and space heating and cooling;

a solar transparent material wiper for clearing a solar arrays surface from obstructions;

a solar panel wind turbine communication server with an appliance node for voice over internet protocol (VOIP) cell connection;

a solar panel wind turbine communication server appliance node is a separate receiver and transmitter that is networked into one or more parallel server cluster nodes;

solar panel wind turbine communication server appliance nodes are installed at a specific spatial point target location for remote identification, security identification tracking and analysis, and diagnostic purposes;

each of the solar panel wind turbine communication server appliance nodes are connected to a hour energy bank;

the solar panel wind turbine communication server appliance nodes forming an interactive network backbone grid, which is connected to an advertising VOIP communication network and the hour energy bank which permits users to participate in any excess revenue generated from surplus energy delivered back to the conventional power and communication grid; and a metering system implemented throughout a solar panel wind turbine communication server appliance node network attached to any real property or public space to meter the thermal units, kilowatt hours and transactions between the network and the hour energy bank.

7. The apparatus of claim 6, further comprising in combination a belt apparatus for sensing all five human senses; and one or more gaseous, thermal, optical, pressure, and weather sensors at specific spatial points and remotely from any networked wired or wireless device that is connected to a server for the purpose of monitoring, and tracking and providing useful information and data via VOIP, with video.

8. The apparatus of claim 6, further comprising in combination
a wireless energy transmission and receiving transformer;
one or more data servers; and
wireless data transmission routers combined in one solar server array of nodes with communication between a solar panel and a wind turbine communication server appliance node and one or more solar panel wind turbine communication server appliance nodes.

9. A solar panel and wind turbine hybrid apparatus in combination with a computer server, comprising in combination
one or more solar panels and one or more wind turbines for generating electrical energy;
a computer server connected to the solar panels and wind turbines for the purpose of creating, processing, serving, managing, storing, maximizing, and monetizing the electrical generation;
an appliance providing voice over internet protocol (VOIP) cell connection connected to the computer server connected to the solar panels and wind turbines;
the appliance is accessed using a human key identification for authentication and protecting access to the computer server connected to the solar panels and wind turbines;
an hour metering and banking manager connected to the solar panels and wind turbines;
a battery metering and manager server;
a cooling system manager;
a thermal sensor;
servers controlling management for use with conventional power and communication grid or independently off the conventional power and communication grid;
a cooling and heating apparatus that is connected to solar heaters and generators for energy creation and water and space heating and cooling;
a solar transparent material wiper for clearing a solar arrays surface from obstructions;
a solar panel wind turbine communication server appliance having separate control signals for diagnosing problems;
a camera for reporting to a monitoring station with a camera view of a field or rooftop solar panel wind turbine communication server appliance; and
a solar server array or unit having an automatic or manual mechanical cleaner system and heater with multi camera systems and sensors for keeping the surface of the solar panel wind turbine communication server appliance clean and clear of obstructions.

10. A solar panel and wind turbine hybrid apparatus in combination with a computer server, comprising in combination
one or more solar panels and one or more wind turbines for generating electrical energy;
a computer server connected to the solar panels and wind turbines for the purpose of creating, processing, serving, managing, storing, maximizing, and monetizing the electrical generation;
an appliance providing voice over internet protocol (VOIP) cell connection connected to the computer server connected to the solar panels and wind turbines;
the appliance is accessed using a human key identification for authentication and protecting access to the computer server connected to the solar panels and wind turbines;
an hour metering and banking manager connected to the solar panels and wind turbines;
a battery metering and manager server;
a cooling system manager;
a thermal sensor;
servers controlling management for use with conventional power and communication grid or independently off the conventional power and communication grid;
a cooling and heating apparatus that is connected to solar heaters and generators for energy creation and water and space heating and cooling;
a solar transparent material wiper for clearing a solar arrays surface from obstructions;
a cooling heating piping apparatus that has a clear top and a black reflective bottom surface that can be rotated;
the rotating piping apparatus allows a cover to be placed over water and air pipes to increase heat generation;
the poping apparatus can be rotated into clear or shaded dark for temperature control by a main server thermal manager;
a magnetic motor with a built in generator apparatus for ventilation of the one or more wind turbines;
one or more batteries networked cluster attached to a parallel solar server networked grid to receive, store, and send energy to the conventional power and communication grid, or to a computer server connected to the solar panels and wind turbines;
a meter attached to the batteries to measure the kilowatt hours that are used or that energy delivered to and used by the conventional power and communication grid or an independent solar wind power grid; and
a battery manager that is controlled by a battery manager server.

11. A solar panel and wind turbine hybrid apparatus in combination with a computer server, comprising in combination
one or more solar panels and one or more wind turbines for generating electrical energy;
a computer server connected to the solar panels and wind turbines for the purpose of creating, processing, serving, managing, storing, maximizing, and monetizing the electrical generation;
an appliance providing voice over internet protocol (VOIP) cell connection connected to the computer server connected to the solar panels and wind turbines;
the appliance is accessed using a human key identification for authentication and protecting access to the computer server connected to the solar panels and wind turbines;
an hour metering and banking manager connected to the solar panels and wind turbines;
a battery metering and manager server;
a cooling system manager;
a thermal sensor;
servers controlling management for use with conventional power and communication grid or independently off the conventional power and communication grid;
a cooling and heating apparatus that is connected to solar heaters and generators for energy creation and water and space heating and cooling;
a solar transparent material wiper for clearing a solar arrays surface from obstructions;
a wind turbine apparatus with a plurality of multiple generators that convert mechanical energy into electrical energy for multiple electricity generation assembled into one assembly or multiple assemblies on a shaft connected to a servo adjustable wind vane;

whereby the wind vane is adjustable for an open position while generating electricity, and a closed ball position for storage and inclement weather protection with wires for transmission of electricity going down a double insulated shaft into a solar panel wind turbine for transmission electricity to a main box or nearby collector;

a ventilator and thermal gaseous sensor built into the multiple wind turbines attached to the solar panel wind turbine for measuring and keeping turbine shaft at optimum temperature; and a servo built into the solar panel wind turbine that controls automatic storage and use position for the wind turbines that is controlled by a group of microcontrollers in a main server unit and that is connected to information related to weather, and internal sensing devices for decisions to raise the wind turbines, or lower the wind turbines for storage to be out of the way and not blocking light with shadows on solar panels at different times of the day or night or storage for protection of the wind turbines during high winds or inclement weather, and raised for the generation of electricity utilizing wind.

12. A solar panel and wind turbine hybrid apparatus in combination with a computer server, comprising in combination one or more solar panels and one or more wind turbines for generating electrical energy;

a computer server connected to the solar panels and wind turbines for the purpose of creating, processing, serving, managing, storing, maximizing, and monetizing the electrical generation;

an appliance providing voice over internet protocol (VOIP) cell connection connected to the computer server connected to the solar panels and wind turbines;

the appliance is accessed using a human key identification for authentication and protecting access to the computer server connected to the solar panels and wind turbines;

an hour metering and banking manager connected to the solar panels and wind turbines;

a battery metering and manager server;

a cooling system manager;

a thermal sensor;

servers controlling management for use with conventional power and communication grid or independently off the conventional power and communication grid;

a cooling and heating apparatus that is connected to solar heaters and generators for energy creation and water and space heating and cooling;

a solar transparent material wiper for clearing a solar arrays surface from obstructions;

a multiple gear, single lever, single shaft pull system that automatically converts wind vanes on the wind turbines into a round or oval shaped ball for storage and protection; and pulled by a servo that either opens or closes the wind vanes on the wind turbines for use or storage that is connected into a retraction apparatus and managed by the server connected to the solar panels and wind turbines with wind speed, sensors for temperature, gaseous analysis, and weather information for decisions to retract or raise the wind vanes on the wind turbines for energy creation or storage for protection from inclement weather.

* * * * *